United States Patent
Chemel

(10) Patent No.: US 10,264,652 B2
(45) Date of Patent: Apr. 16, 2019

(54) METHODS, SYSTEMS, AND APPARATUS FOR INTELLIGENT LIGHTING

(71) Applicant: Digital Lumens, Inc., Boston, MA (US)

(72) Inventor: Brian J. Chemel, Marblehead, MA (US)

(73) Assignee: Digital Lumens, Inc., Boston, MA (US)

(*) Notice: Subject to any disclaimer, the term of this patent is extended or adjusted under 35 U.S.C. 154(b) by 0 days.

(21) Appl. No.: 15/094,559

(22) Filed: Apr. 8, 2016

(65) Prior Publication Data
US 2016/0360594 A1 Dec. 8, 2016

Related U.S. Application Data

(63) Continuation of application No. PCT/US2014/060095, filed on Oct. 10, 2014.
(Continued)

(51) Int. Cl.
*H05B 37/02* (2006.01)
*H05B 33/08* (2006.01)
*G06K 7/10* (2006.01)

(52) U.S. Cl.
CPC ..... *H05B 37/0227* (2013.01); *H05B 33/0854* (2013.01); *H05B 33/0872* (2013.01);
(Continued)

(58) Field of Classification Search
CPC ............ H05B 37/0227; H05B 37/0218; H05B 37/0245; H05B 37/029; H05B 33/0854;
(Continued)

(56) References Cited

U.S. PATENT DOCUMENTS

| 2,899,541 A | 8/1957 | De Mauro |
| D185,410 S | 6/1959 | Bodian |

(Continued)

FOREIGN PATENT DOCUMENTS

| CN | 1873908 A | 12/2006 |
| JP | 2005-073133 | 3/1993 |

(Continued)

OTHER PUBLICATIONS

Supplementary European Search Report dated Nov. 28, 2016 in European Application No. Ep 14 79 1232, 6 pages.
(Continued)

*Primary Examiner* — Tung X Le
*Assistant Examiner* — Borna Alaeddini
(74) *Attorney, Agent, or Firm* — Shaun P. Montana

(57) ABSTRACT

Intelligent lighting systems include lighting fixtures communicatively coupled to processors and memory to provide efficient, highly responsive, and custom-tailored lighting to meet the needs and preferences of a given user or application. A gateway device provides connectivity linking lighting fixtures to the cloud to enhance data collection, analysis, and lighting control. Configuration profiles along with identification sensing provide object-specific and person-specific lighting conditions within intelligent lighting system environments. Configuration, control, monitoring, and reporting related to intelligent lighting systems are simplified with cloud-based and mobile apps compared to legacy lighting system technologies.

24 Claims, 26 Drawing Sheets

Related U.S. Application Data

(60) Provisional application No. 61/983,235, filed on Apr. 23, 2014, provisional application No. 61/889,368, filed on Oct. 10, 2013.

(52) U.S. Cl.
CPC ..... *H05B 37/0245* (2013.01); *H05B 37/0272* (2013.01); *G06K 7/10366* (2013.01); *H05B 37/0218* (2013.01); *Y02B 20/48* (2013.01)

(58) Field of Classification Search
CPC .............. H05B 33/0872; H05B 37/0272; Y02B 20/48; Y02B 20/46; F21V 23/0471
See application file for complete search history.

(56) References Cited

U.S. PATENT DOCUMENTS

| | | |
|---|---|---|
| D191,530 S | 10/1961 | Zurawski |
| D200,548 S | 3/1965 | Reeves |
| 4,194,181 A | 3/1980 | Brundage |
| 4,217,646 A | 8/1980 | Caltagirone et al. |
| 4,277,691 A | 7/1981 | Lunn |
| 4,298,922 A | 11/1981 | Hardwick |
| 4,558,275 A | 12/1985 | Borowy et al. |
| 4,755,920 A | 7/1988 | Tinley |
| 4,772,825 A | 9/1988 | Tabor et al. |
| 4,780,731 A | 10/1988 | Creutzmann et al. |
| D300,471 S | 3/1989 | Szymanek |
| 4,873,469 A | 10/1989 | Young et al. |
| 5,055,985 A | 10/1991 | Fabbri |
| 5,144,222 A | 9/1992 | Herbert |
| 5,293,097 A | 3/1994 | Elwell |
| 5,323,334 A | 6/1994 | Meyers et al. |
| 5,430,356 A | 7/1995 | Ference et al. |
| 5,455,487 A | 10/1995 | Mix et al. |
| 5,489,827 A | 2/1996 | Xia |
| 5,521,852 A | 5/1996 | Hibbs et al. |
| 5,521,853 A | 5/1996 | Hibbs et al. |
| D374,301 S | 10/1996 | Kleffman |
| 5,566,084 A | 10/1996 | Cmar |
| 5,572,237 A | 11/1996 | Crooks et al. |
| 5,572,239 A | 11/1996 | Jaegar |
| 5,640,792 A | 6/1997 | Smith et al. |
| 5,655,833 A | 8/1997 | Raczynski |
| 5,668,446 A | 9/1997 | Baker |
| 5,739,639 A | 4/1998 | Johnson |
| 5,753,983 A | 5/1998 | Dickie et al. |
| 5,764,146 A | 6/1998 | Baldwin et al. |
| 5,895,986 A | 4/1999 | Walters et al. |
| 5,914,865 A | 6/1999 | Barbehenn et al. |
| 5,945,993 A | 8/1999 | Fleischmann |
| 5,971,597 A | 10/1999 | Baldwin et al. |
| 6,016,038 A | 1/2000 | Mueller et al. |
| 6,025,679 A | 2/2000 | Harper et al. |
| 6,028,396 A | 2/2000 | Morrissey, Jr. et al. |
| 6,028,597 A | 2/2000 | Ryan et al. |
| 6,035,266 A | 3/2000 | Williams et al. |
| 6,092,913 A | 7/2000 | Edwards, Jr. |
| 6,097,419 A | 8/2000 | Morris et al. |
| 6,113,137 A | 9/2000 | Mizutani et al. |
| 6,118,230 A | 9/2000 | Fleischmann |
| 6,150,774 A | 11/2000 | Mueller et al. |
| 6,151,529 A | 11/2000 | Batko |
| 6,160,359 A | 12/2000 | Fleischmann |
| 6,166,496 A | 12/2000 | Lys et al. |
| 6,211,626 B1 | 4/2001 | Lys et al. |
| 6,257,735 B1 | 7/2001 | Baar |
| D447,266 S | 8/2001 | Verfuerth |
| 6,292,901 B1 | 9/2001 | Lys et al. |
| 6,340,868 B1 | 1/2002 | Lys et al. |
| 6,359,555 B1 | 3/2002 | Williams |
| 6,370,489 B1 | 4/2002 | Williams et al. |
| D457,667 S | 5/2002 | Piepgras et al. |
| D457,669 S | 5/2002 | Piepgras et al. |
| D457,974 S | 5/2002 | Piepgras et al. |
| 6,384,722 B1 | 5/2002 | Williams |
| 6,388,399 B1 | 5/2002 | Eckel et al. |
| 6,393,381 B1 | 5/2002 | Williams et al. |
| D458,395 S | 6/2002 | Piepgras et al. |
| D460,735 S | 7/2002 | Verfuerth |
| 6,415,205 B1 | 7/2002 | Myron et al. |
| 6,415,245 B2 | 7/2002 | Williams et al. |
| 6,428,183 B1 | 8/2002 | McAlpin |
| D463,059 S | 9/2002 | Verfuerth |
| D463,610 S | 9/2002 | Piepgras et al. |
| 6,452,339 B1 | 9/2002 | Morrissey et al. |
| 6,452,340 B1 | 9/2002 | Morrissey, Jr. et al. |
| 6,456,960 B1 | 9/2002 | Williams et al. |
| 6,459,919 B1 | 10/2002 | Lys et al. |
| 6,466,190 B1 | 10/2002 | Evoy |
| 6,467,933 B2 | 10/2002 | Baar |
| 6,486,790 B1 | 11/2002 | Perlo et al. |
| D468,035 S | 12/2002 | Blanc et al. |
| 6,491,412 B1 | 12/2002 | Bowman et al. |
| 6,517,218 B2 | 2/2003 | Hochstein |
| 6,528,954 B1 | 3/2003 | Lys et al. |
| 6,548,967 B1 | 4/2003 | Dowling et al. |
| 6,577,080 B2 | 6/2003 | Lys et al. |
| 6,585,396 B1 | 7/2003 | Verfuerth |
| 6,604,062 B2 | 8/2003 | Williams et al. |
| 6,608,453 B2 | 8/2003 | Morgan et al. |
| D479,826 S | 9/2003 | Verfuerth et al. |
| 6,624,597 B2 | 9/2003 | Dowling et al. |
| 6,641,284 B2 | 11/2003 | Stopa et al. |
| 6,652,119 B1 | 11/2003 | Barton |
| D483,332 S | 12/2003 | Verfuerth |
| 6,710,588 B1 | 3/2004 | Verfuerth et al. |
| 6,714,895 B2 | 3/2004 | Williams et al. |
| 6,717,376 B2 | 4/2004 | Lys et al. |
| 6,720,745 B2 | 4/2004 | Lys et al. |
| 6,724,180 B1 | 4/2004 | Verfuerth et al. |
| D491,678 S | 6/2004 | Piepgras |
| D492,042 S | 6/2004 | Piepgras |
| 6,746,274 B1 | 6/2004 | Verfuerth |
| 6,748,299 B1 | 6/2004 | Motoyama |
| 6,758,580 B1 | 7/2004 | Verfuerth |
| D494,700 S | 8/2004 | Hartman et al. |
| 6,774,584 B2 | 8/2004 | Lys et al. |
| 6,774,619 B1 | 8/2004 | Verfuerth et al. |
| 6,777,891 B2 | 8/2004 | Lys et al. |
| 6,781,329 B2 | 8/2004 | Mueller et al. |
| 6,788,011 B2 | 9/2004 | Mueller et al. |
| 6,791,458 B2 | 9/2004 | Baldwin |
| 6,798,341 B1 | 9/2004 | Eckel et al. |
| 6,801,003 B2 | 10/2004 | Schanberger et al. |
| 6,806,659 B1 | 10/2004 | Mueller et al. |
| 6,807,516 B2 | 10/2004 | Williams et al. |
| 6,841,944 B2 | 1/2005 | Morrissey et al. |
| 6,869,204 B2 | 3/2005 | Morgan et al. |
| 6,883,929 B2 | 4/2005 | Dowling |
| 6,888,322 B2 | 5/2005 | Dowling et al. |
| 6,888,323 B1 | 5/2005 | Null et al. |
| 6,892,168 B2 | 5/2005 | Williams et al. |
| 6,909,921 B1 | 6/2005 | Bilger |
| 6,933,627 B2 | 8/2005 | Wilhelm |
| 6,936,978 B2 | 8/2005 | Morgan et al. |
| 6,964,502 B1 | 11/2005 | Verfuerth |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,002,546 B1 | 2/2006 | Stuppi et al. |
| D518,218 S | 3/2006 | Roberge et al. |
| 7,014,336 B1 | 3/2006 | Ducharme et al. |
| 7,019,276 B2 | 3/2006 | Cloutier et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,062,360 B2 | 6/2006 | Fairlie et al. |
| 7,064,498 B2 | 6/2006 | Dowling et al. |
| 7,093,952 B2 | 8/2006 | Ono et al. |
| 7,113,541 B1 | 9/2006 | Lys et al. |

(56) References Cited

U.S. PATENT DOCUMENTS

| | | |
|---|---|---|
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,160,140 B1 | 1/2007 | Mrakovich et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| D538,462 S | 3/2007 | Verfuerth et al. |
| 7,186,003 B2 | 3/2007 | Dowling et al. |
| 7,187,141 B2 | 3/2007 | Mueller et al. |
| 7,190,121 B2 | 3/2007 | Rose et al. |
| 7,199,531 B2 | 4/2007 | Loughrey |
| 7,202,613 B2 | 4/2007 | Morgan et al. |
| 7,204,622 B2 | 4/2007 | Dowling et al. |
| 7,220,015 B2 | 5/2007 | Dowling |
| 7,220,018 B2 | 5/2007 | Crabb et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,236,366 B2 | 6/2007 | Chen |
| 7,242,152 B2 | 7/2007 | Dowling et al. |
| 7,248,239 B2 | 7/2007 | Dowling et al. |
| D548,868 S | 8/2007 | Roberge et al. |
| 7,253,566 B2 | 8/2007 | Lys et al. |
| 7,255,457 B2 | 8/2007 | Ducharme et al. |
| 7,256,554 B2 | 8/2007 | Lys |
| 7,256,556 B2 | 8/2007 | Lane et al. |
| 7,274,160 B2 | 9/2007 | Mueller et al. |
| 7,274,975 B2 | 9/2007 | Miller |
| 7,300,192 B2 | 11/2007 | Mueller et al. |
| D557,817 S | 12/2007 | Verfuerth |
| 7,303,300 B2 | 12/2007 | Dowling et al. |
| 7,308,296 B2 | 12/2007 | Lys et al. |
| 7,309,965 B2 | 12/2007 | Dowling et al. |
| 7,311,423 B2 | 12/2007 | Frecska et al. |
| D560,469 S | 1/2008 | Bartol et al. |
| D562,494 S | 2/2008 | Piepgras |
| 7,333,903 B2 | 2/2008 | Walters et al. |
| 7,344,279 B2 | 3/2008 | Mueller et al. |
| 7,344,296 B2 | 3/2008 | Matsui et al. |
| 7,348,736 B2 | 3/2008 | Piepgras et al. |
| D566,323 S | 4/2008 | Piepgras et al. |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,929 B2 | 4/2008 | Mueller et al. |
| 7,379,981 B2 | 5/2008 | Elliott et al. |
| 7,385,359 B2 | 6/2008 | Dowling et al. |
| 7,387,405 B2 | 6/2008 | Ducharme et al. |
| 7,391,335 B2 | 6/2008 | Mubaslat et al. |
| 7,401,942 B1 | 7/2008 | Verfuerth et al. |
| 7,411,489 B1 | 8/2008 | Elwell et al. |
| 7,427,840 B2 | 9/2008 | Morgan et al. |
| 7,445,354 B2 | 11/2008 | Aoki et al. |
| 7,453,217 B2 | 11/2008 | Lys et al. |
| 7,470,055 B2 | 12/2008 | Hacker et al. |
| 7,482,565 B2 | 1/2009 | Morgan et al. |
| 7,482,764 B2 | 1/2009 | Morgan et al. |
| 7,495,671 B2 | 2/2009 | Chemel et al. |
| 7,501,768 B2 | 3/2009 | Lane et al. |
| 7,502,034 B2 | 3/2009 | Chemel et al. |
| 7,506,993 B2 | 3/2009 | Kain et al. |
| 7,507,001 B2 | 3/2009 | Kit |
| 7,518,319 B2 | 4/2009 | Konno et al. |
| 7,520,634 B2 | 4/2009 | Ducharme et al. |
| D592,786 S | 5/2009 | Bisberg et al. |
| 7,529,594 B2 | 5/2009 | Walters et al. |
| D593,697 S | 6/2009 | Liu et al. |
| 7,543,956 B2 | 6/2009 | Piepgras et al. |
| 7,546,167 B2 | 6/2009 | Walters et al. |
| 7,546,168 B2 | 6/2009 | Walters et al. |
| 7,550,931 B2 | 6/2009 | Lys et al. |
| 7,550,935 B2 | 6/2009 | Lys et al. |
| D595,894 S | 7/2009 | Verfuerth et al. |
| 7,563,006 B1 | 7/2009 | Verfuerth et al. |
| 7,571,063 B2 | 8/2009 | Howell et al. |
| 7,572,028 B2 | 8/2009 | Mueller et al. |
| 7,575,338 B1 | 8/2009 | Verfuerth |
| 7,598,681 B2 | 10/2009 | Lys et al. |
| 7,598,684 B2 | 10/2009 | Lys et al. |
| 7,598,686 B2 | 10/2009 | Lys et al. |
| 7,603,184 B2 | 10/2009 | Walters et al. |
| 7,619,370 B2 | 11/2009 | Chemel et al. |
| D606,697 S | 12/2009 | Verfuerth et al. |
| D606,698 S | 12/2009 | Verfuerth et al. |
| 7,628,506 B2 | 12/2009 | Verfuerth et al. |
| 7,638,743 B2 | 12/2009 | Bartol et al. |
| 7,642,730 B2 | 1/2010 | Dowling et al. |
| 7,646,029 B2 | 1/2010 | Mueller et al. |
| 7,659,674 B2 | 2/2010 | Mueller et al. |
| 7,660,892 B2 | 2/2010 | Choong et al. |
| 7,703,951 B2 | 4/2010 | Piepgras et al. |
| D617,028 S | 6/2010 | Verfuerth et al. |
| D617,029 S | 6/2010 | Verfuerth et al. |
| 7,744,251 B2 | 6/2010 | Liu et al. |
| 7,746,003 B2 | 6/2010 | Verfuerth et al. |
| 7,753,568 B2 | 7/2010 | Hu et al. |
| 7,761,260 B2 | 7/2010 | Walters et al. |
| 7,762,861 B2 | 7/2010 | Verfuerth et al. |
| D621,410 S | 8/2010 | Verfuerth et al. |
| D621,411 S | 8/2010 | Verfuerth et al. |
| 7,766,518 B2 | 8/2010 | Piepgras et al. |
| 7,777,427 B2 | 8/2010 | Stalker, III |
| 7,780,310 B2 | 8/2010 | Verfuerth et al. |
| 7,783,390 B2 | 8/2010 | Miller |
| 7,784,966 B2 | 8/2010 | Verfuerth et al. |
| D623,340 S | 9/2010 | Verfuerth et al. |
| 7,792,956 B2 | 9/2010 | Choong et al. |
| 7,809,448 B2 | 10/2010 | Lys et al. |
| 7,824,065 B2 | 11/2010 | Maxik |
| 7,828,465 B2 | 11/2010 | Roberge et al. |
| 7,839,017 B2 | 11/2010 | Huizenga et al. |
| 7,839,295 B2 | 11/2010 | Ries, II |
| 7,845,823 B2 | 12/2010 | Mueller et al. |
| 7,852,017 B1 | 12/2010 | Melanson |
| 7,866,847 B2 | 1/2011 | Zheng |
| D632,006 S | 2/2011 | Verfuerth et al. |
| D632,418 S | 2/2011 | Bisberg et al. |
| 7,878,683 B2 | 2/2011 | Logan et al. |
| 7,911,359 B2 | 3/2011 | Walters et al. |
| 7,924,155 B2 | 4/2011 | Soccoli et al. |
| 7,925,384 B2 | 4/2011 | Huizenga et al. |
| 7,926,974 B2 | 4/2011 | Wung et al. |
| 7,936,561 B1 | 5/2011 | Lin |
| 7,938,558 B2 | 5/2011 | Wilcox et al. |
| 7,959,320 B2 | 6/2011 | Mueller et al. |
| 7,962,606 B2 | 6/2011 | Barron et al. |
| 7,976,188 B2 | 7/2011 | Peng |
| 7,988,335 B2 | 8/2011 | Liu et al. |
| 7,988,341 B2 | 8/2011 | Chen |
| 7,997,762 B2 | 8/2011 | Wang et al. |
| 8,010,319 B2 | 8/2011 | Walters et al. |
| 8,013,281 B2 | 9/2011 | Morgan et al. |
| 8,025,426 B2 | 9/2011 | Mundle et al. |
| 8,033,686 B2 | 10/2011 | Recker et al. |
| 8,035,320 B2 | 10/2011 | Sibert |
| 8,042,968 B2 | 10/2011 | Boyer et al. |
| 8,052,301 B2 | 11/2011 | Zhou et al. |
| 8,061,865 B2 | 11/2011 | Piepgras et al. |
| 8,066,403 B2 | 11/2011 | Sanfilippo et al. |
| 8,067,906 B2 | 11/2011 | Null |
| D650,225 S | 12/2011 | Bartol et al. |
| 8,070,312 B2 | 12/2011 | Verfuerth et al. |
| 8,079,731 B2 | 12/2011 | Lynch et al. |
| 8,080,819 B2 | 12/2011 | Mueller et al. |

(56) References Cited

U.S. PATENT DOCUMENTS

| | | |
|---|---|---|
| 8,096,679 B2 | 1/2012 | Chen et al. |
| 8,101,434 B2 | 1/2012 | Guillien et al. |
| 8,136,958 B2 | 3/2012 | Verfuerth et al. |
| 8,138,690 B2 | 3/2012 | Chemel et al. |
| 8,147,267 B2 | 4/2012 | Oster |
| RE43,456 E | 6/2012 | Verfuerth et al. |
| 8,214,061 B2 | 7/2012 | Westrick, Jr. et al. |
| 8,232,745 B2 | 7/2012 | Chemel et al. |
| 8,237,581 B2 | 8/2012 | Ries, II |
| 8,237,582 B2 | 8/2012 | Ries, II |
| 8,242,927 B2 | 8/2012 | Ries, II |
| 8,260,575 B2 | 9/2012 | Walters et al. |
| 8,265,674 B2 | 9/2012 | Choong et al. |
| 8,275,471 B2 | 9/2012 | Huizenga et al. |
| 8,337,043 B2 | 12/2012 | Verfuerth et al. |
| 8,339,069 B2 | 12/2012 | Chemel et al. |
| 8,344,660 B2 | 1/2013 | Mohan et al. |
| 8,344,665 B2 | 1/2013 | Verfuerth et al. |
| 8,364,325 B2 | 1/2013 | Huizenga et al. |
| 8,368,321 B2 | 2/2013 | Chemel et al. |
| 8,370,483 B2 | 2/2013 | Choong et al. |
| 8,373,362 B2 | 2/2013 | Chemel et al. |
| 8,376,583 B2 | 2/2013 | Wang et al. |
| 8,376,600 B2 | 2/2013 | Bartol et al. |
| 8,406,937 B2 | 3/2013 | Verfuerth et al. |
| 8,415,897 B2 | 4/2013 | Choong et al. |
| 8,422,401 B1 | 4/2013 | Choong et al. |
| 8,445,826 B2 | 5/2013 | Verfuerth |
| 8,450,670 B2 | 5/2013 | Verfuerth et al. |
| 8,466,626 B2 | 6/2013 | Null et al. |
| 8,476,565 B2 | 7/2013 | Verfuerth |
| 8,531,134 B2 | 9/2013 | Chemel et al. |
| 8,536,802 B2 | 9/2013 | Chemel et al. |
| 8,543,249 B2 | 9/2013 | Chemel et al. |
| 8,552,664 B2 | 10/2013 | Chemel et al. |
| 8,586,902 B2 | 11/2013 | Verfuerth |
| 8,593,135 B2 | 11/2013 | Chemel et al. |
| 8,604,701 B2 | 12/2013 | Verfuerth et al. |
| 8,610,376 B2 | 12/2013 | Chemel et al. |
| 8,610,377 B2 | 12/2013 | Chemel et al. |
| 8,700,749 B2 | 4/2014 | Elliott et al. |
| 8,729,833 B2 | 5/2014 | Chemel et al. |
| 8,754,589 B2 | 6/2014 | Chemel et al. |
| 8,755,039 B2 | 6/2014 | Ramer et al. |
| 8,805,550 B2 | 8/2014 | Chemel et al. |
| 8,823,277 B2 | 9/2014 | Chemel et al. |
| 8,841,859 B2 | 9/2014 | Chemel et al. |
| 8,855,019 B2 | 10/2014 | Elliott et al. |
| 8,866,408 B2 | 10/2014 | Chemel et al. |
| 8,954,170 B2 | 2/2015 | Chemel et al. |
| 9,014,829 B2 | 4/2015 | Chemel et al. |
| 9,072,133 B2 | 6/2015 | Chemel et al. |
| 9,125,254 B2 | 9/2015 | Chemel et al. |
| 9,241,392 B2 | 1/2016 | Chemel et al. |
| 9,519,426 B2 | 11/2016 | Chemel et al. |
| 10,009,969 B2 | 6/2018 | Knode et al. |
| 2001/0028227 A1 | 10/2001 | Lys et al. |
| 2001/0055965 A1 | 12/2001 | Delp et al. |
| 2002/0032535 A1 | 3/2002 | Alexander et al. |
| 2002/0036430 A1 | 3/2002 | Welches et al. |
| 2002/0038157 A1 | 3/2002 | Dowling et al. |
| 2002/0047628 A1 | 4/2002 | Morgan et al. |
| 2002/0048169 A1 | 4/2002 | Dowling et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0133270 A1 | 9/2002 | Hung et al. |
| 2002/0134849 A1 | 9/2002 | Disser |
| 2002/0145394 A1 | 10/2002 | Morgan et al. |
| 2002/0152045 A1 | 10/2002 | Dowling et al. |
| 2002/0153851 A1 | 10/2002 | Morgan et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0175642 A1 | 11/2002 | von Kannwurff et al. |
| 2003/0011538 A1 | 1/2003 | Lys et al. |
| 2003/0057886 A1 | 3/2003 | Lys et al. |
| 2003/0057887 A1 | 3/2003 | Dowling et al. |
| 2003/0057888 A1 | 3/2003 | Archenhold et al. |
| 2003/0057890 A1 | 3/2003 | Lys et al. |
| 2003/0063462 A1 | 4/2003 | Shimizu et al. |
| 2003/0076056 A1 | 4/2003 | Schuurmans |
| 2003/0076281 A1 | 4/2003 | Morgan et al. |
| 2003/0097309 A1 | 5/2003 | Gibler et al. |
| 2003/0100837 A1 | 5/2003 | Lys et al. |
| 2003/0100998 A2 | 5/2003 | Brunner et al. |
| 2003/0102675 A1 | 6/2003 | Noethlichs |
| 2003/0123705 A1 | 7/2003 | Stam et al. |
| 2003/0123706 A1 | 7/2003 | Stam et al. |
| 2003/0133292 A1 | 7/2003 | Mueller et al. |
| 2003/0137258 A1 | 7/2003 | Piepgras et al. |
| 2003/0206411 A9 | 11/2003 | Dowling et al. |
| 2003/0214259 A9 | 11/2003 | Dowling et al. |
| 2003/0216971 A1 | 11/2003 | Sick et al. |
| 2003/0222587 A1 | 12/2003 | Dowling et al. |
| 2003/0222603 A1 | 12/2003 | Mogilner et al. |
| 2004/0002792 A1 | 1/2004 | Hoffknecht |
| 2004/0036006 A1 | 2/2004 | Dowling |
| 2004/0052076 A1 | 3/2004 | Mueller et al. |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1 | 6/2004 | Spero |
| 2004/0111638 A1* | 6/2004 | Yadav ............... H04L 63/1408 726/23 |
| 2004/0113044 A1 | 6/2004 | Ishiguchi |
| 2004/0113568 A1 | 6/2004 | Dowling et al. |
| 2004/0119415 A1 | 6/2004 | Lansing et al. |
| 2004/0130909 A1 | 7/2004 | Mueller et al. |
| 2004/0141321 A1 | 7/2004 | Dowling et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0240890 A1 | 12/2004 | Lys et al. |
| 2004/0252501 A1 | 12/2004 | Moriyama et al. |
| 2004/0257007 A1 | 12/2004 | Lys et al. |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0099796 A1 | 5/2005 | Magee |
| 2005/0099824 A1 | 5/2005 | Dowling et al. |
| 2005/0116667 A1 | 6/2005 | Mueller et al. |
| 2005/0125083 A1 | 6/2005 | Kiko |
| 2005/0128751 A1 | 6/2005 | Roberge et al. |
| 2005/0151489 A1 | 7/2005 | Lys et al. |
| 2005/0162101 A1 | 7/2005 | Leong et al. |
| 2005/0174473 A1 | 8/2005 | Morgan et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219872 A1 | 10/2005 | Lys |
| 2005/0231133 A1 | 10/2005 | Lys |
| 2005/0236029 A1 | 10/2005 | Dowling |
| 2005/0236998 A1 | 10/2005 | Mueller et al. |
| 2005/0248299 A1 | 11/2005 | Chemel et al. |
| 2005/0253533 A1 | 11/2005 | Lys et al. |
| 2005/0258765 A1 | 11/2005 | Rodriguez et al. |
| 2005/0275626 A1 | 12/2005 | Mueller et al. |

(56) References Cited

U.S. PATENT DOCUMENTS

| | | |
|---|---|---|
| 2005/0276053 A1 | 12/2005 | Nortrup et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0022214 A1 | 2/2006 | Morgan et al. |
| 2006/0038511 A1 | 2/2006 | Tagawa |
| 2006/0050509 A9 | 3/2006 | Dowling et al. |
| 2006/0076908 A1 | 4/2006 | Morgan et al. |
| 2006/0087843 A1 | 4/2006 | Setomoto et al. |
| 2006/0098077 A1 | 5/2006 | Dowling |
| 2006/0104058 A1 | 5/2006 | Chemel et al. |
| 2006/0106762 A1 | 5/2006 | Caracas et al. |
| 2006/0108935 A1 | 5/2006 | Stevn |
| 2006/0109649 A1 | 5/2006 | Ducharme et al. |
| 2006/0125426 A1 | 6/2006 | Veskovic et al. |
| 2006/0132061 A1 | 6/2006 | McCormick et al. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0160199 A1 | 7/2006 | DiCosimo et al. |
| 2006/0170376 A1 | 8/2006 | Piepgras et al. |
| 2006/0181878 A1 | 8/2006 | Burkholder |
| 2006/0198128 A1 | 9/2006 | Piepgras et al. |
| 2006/0208667 A1 | 9/2006 | Lys et al. |
| 2006/0221606 A1 | 10/2006 | Dowling |
| 2006/0245174 A1 | 11/2006 | Ashdown et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0273741 A1 | 12/2006 | Stalker, III |
| 2006/0276938 A1 | 12/2006 | Miller |
| 2006/0285325 A1 | 12/2006 | Ducharme et al. |
| 2007/0021946 A1 | 1/2007 | Williams et al. |
| 2007/0030716 A1 | 2/2007 | Manolescu |
| 2007/0032990 A1 | 2/2007 | Williams et al. |
| 2007/0040513 A1 | 2/2007 | Cleland et al. |
| 2007/0045407 A1 | 3/2007 | Paul |
| 2007/0047227 A1 | 3/2007 | Ducharme |
| 2007/0064425 A1 | 3/2007 | Frecska et al. |
| 2007/0086754 A1 | 4/2007 | Lys et al. |
| 2007/0086912 A1 | 4/2007 | Dowling et al. |
| 2007/0115658 A1 | 5/2007 | Mueller et al. |
| 2007/0115665 A1 | 5/2007 | Mueller et al. |
| 2007/0143046 A1 | 6/2007 | Budike, Jr. |
| 2007/0145915 A1 | 6/2007 | Roberge et al. |
| 2007/0152797 A1 | 7/2007 | Chemel et al. |
| 2007/0153514 A1 | 7/2007 | Dowling et al. |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0206375 A1 | 9/2007 | Piepgras et al. |
| 2007/0211463 A1 | 9/2007 | Chevalier et al. |
| 2007/0217196 A1 | 9/2007 | Shaner |
| 2007/0228999 A1 | 10/2007 | Kit |
| 2007/0229250 A1 | 10/2007 | Recker et al. |
| 2007/0236156 A1 | 10/2007 | Lys et al. |
| 2007/0237284 A1 | 10/2007 | Lys et al. |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0267978 A1 | 11/2007 | Shteynberg et al. |
| 2007/0273307 A1 | 11/2007 | Westrick et al. |
| 2007/0291483 A1 | 12/2007 | Lys |
| 2008/0001071 A1 | 1/2008 | Lee et al. |
| 2008/0007943 A1 | 1/2008 | Verfuerth et al. |
| 2008/0007944 A1 | 1/2008 | Verfuerth et al. |
| 2008/0012502 A1 | 1/2008 | Lys |
| 2008/0012506 A1 | 1/2008 | Mueller et al. |
| 2008/0030149 A1 | 2/2008 | Callahan |
| 2008/0074059 A1 | 3/2008 | Ahmed |
| 2008/0079568 A1 | 4/2008 | Primous et al. |
| 2008/0089060 A1 | 4/2008 | Kondo et al. |
| 2008/0140231 A1 | 6/2008 | Blackwell et al. |
| 2008/0158878 A1 | 7/2008 | Van Laanen et al. |
| 2008/0164826 A1 | 7/2008 | Lys |
| 2008/0164827 A1 | 7/2008 | Lys |
| 2008/0164854 A1 | 7/2008 | Lys |
| 2008/0170371 A1 | 7/2008 | Lai |
| 2008/0180015 A1 | 7/2008 | Wu et al. |
| 2008/0183081 A1 | 7/2008 | Lys et al. |
| 2008/0183307 A1 | 7/2008 | Clayton et al. |
| 2008/0183316 A1 | 7/2008 | Clayton |
| 2008/0195561 A1 | 8/2008 | Herzig |
| 2008/0204268 A1 | 8/2008 | Dowling et al. |
| 2008/0208651 A1 | 8/2008 | Johnston et al. |
| 2008/0215391 A1 | 9/2008 | Dowling et al. |
| 2008/0246415 A1 | 10/2008 | Chitta et al. |
| 2008/0265799 A1 | 10/2008 | Sibert |
| 2008/0272934 A1 | 11/2008 | Wang et al. |
| 2008/0275802 A1 | 11/2008 | Verfuerth et al. |
| 2008/0278941 A1 | 11/2008 | Logan et al. |
| 2008/0310850 A1 | 12/2008 | Pederson et al. |
| 2009/0000217 A1 | 1/2009 | Verfuerth et al. |
| 2009/0009989 A1 | 1/2009 | Verfuerth et al. |
| 2009/0014625 A1 | 1/2009 | Bartol et al. |
| 2009/0018673 A1 | 1/2009 | Dushane et al. |
| 2009/0021955 A1 | 1/2009 | Kuang et al. |
| 2009/0027932 A1 | 1/2009 | Haines et al. |
| 2009/0034263 A1 | 2/2009 | Stenback et al. |
| 2009/0050908 A1 | 2/2009 | Yuan et al. |
| 2009/0051506 A1 | 2/2009 | Hicksted et al. |
| 2009/0059603 A1 | 3/2009 | Recker et al. |
| 2009/0059915 A1 | 3/2009 | Baker |
| 2009/0066266 A1 | 3/2009 | Jungwirth et al. |
| 2009/0076790 A1 | 3/2009 | Fein et al. |
| 2009/0085494 A1 | 4/2009 | Summerland |
| 2009/0085500 A1 | 4/2009 | Zampini et al. |
| 2009/0122571 A1 | 5/2009 | Simmons et al. |
| 2009/0147507 A1 | 6/2009 | Verfuerth et al. |
| 2009/0160364 A1 | 6/2009 | Ackermann et al. |
| 2009/0189535 A1 | 7/2009 | Verfuerth et al. |
| 2009/0193217 A1 | 7/2009 | Korecki et al. |
| 2009/0243517 A1* | 10/2009 | Verfuerth ........... H05B 37/0272 315/315 |
| 2009/0248217 A1 | 10/2009 | Verfuerth et al. |
| 2009/0267540 A1 | 10/2009 | Chemel et al. |
| 2009/0278472 A1 | 11/2009 | Mills et al. |
| 2009/0278479 A1* | 11/2009 | Platner ............... H05B 37/0245 315/312 |
| 2009/0284184 A1 | 11/2009 | Valois et al. |
| 2009/0299527 A1 | 12/2009 | Huizenga et al. |
| 2009/0299811 A1 | 12/2009 | Verfuerth et al. |
| 2009/0303722 A1 | 12/2009 | Verfuerth et al. |
| 2009/0315485 A1 | 12/2009 | Verfuerth et al. |
| 2009/0323347 A1 | 12/2009 | Zhang et al. |
| 2010/0026479 A1 | 2/2010 | Tran |
| 2010/0034386 A1 | 2/2010 | Choong et al. |
| 2010/0052574 A1 | 3/2010 | Blakeley |
| 2010/0061088 A1 | 3/2010 | Bartol et al. |
| 2010/0109536 A1 | 5/2010 | Jung et al. |
| 2010/0124376 A1 | 5/2010 | Thind |
| 2010/0127634 A1 | 5/2010 | Dowling et al. |
| 2010/0134051 A1 | 6/2010 | Huizenga et al. |
| 2010/0135186 A1 | 6/2010 | Choong et al. |
| 2010/0141153 A1 | 6/2010 | Recker et al. |
| 2010/0148689 A1 | 6/2010 | Morgan et al. |
| 2010/0169249 A1 | 7/2010 | Jhala et al. |
| 2010/0171145 A1 | 7/2010 | Morgan et al. |
| 2010/0171442 A1 | 7/2010 | Draper et al. |
| 2010/0185339 A1 | 7/2010 | Huizenga et al. |
| 2010/0201267 A1 | 8/2010 | Bourquin et al. |
| 2010/0204841 A1 | 8/2010 | Chemel et al. |
| 2010/0207534 A1 | 8/2010 | Dowling et al. |
| 2010/0211443 A1 | 8/2010 | Carrel et al. |
| 2010/0235004 A1 | 9/2010 | Thind |
| 2010/0246168 A1 | 9/2010 | Verfuerth et al. |
| 2010/0246172 A1 | 9/2010 | Liu |
| 2010/0253499 A1 | 10/2010 | Haab et al. |
| 2010/0259931 A1 | 10/2010 | Chemel et al. |
| 2010/0262313 A1 | 10/2010 | Chambers et al. |
| 2010/0264834 A1 | 10/2010 | Gaines et al. |

(56) References Cited

U.S. PATENT DOCUMENTS

| | | |
|---|---|---|
| 2010/0264846 A1* | 10/2010 | Chemel ............... H05B 37/029 315/294 |
| 2010/0270933 A1 | 10/2010 | Chemel et al. |
| 2010/0283605 A1 | 11/2010 | Nevins |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0296285 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302779 A1 | 12/2010 | Chemel et al. |
| 2010/0307075 A1 | 12/2010 | Zampini et al. |
| 2010/0308736 A1 | 12/2010 | Hung et al. |
| 2010/0327766 A1 | 12/2010 | Recker et al. |
| 2011/0001436 A1 | 1/2011 | Chemel et al. |
| 2011/0001438 A1 | 1/2011 | Chemel et al. |
| 2011/0033632 A1 | 2/2011 | Vance et al. |
| 2011/0035404 A1 | 2/2011 | Morgan et al. |
| 2011/0038148 A1 | 2/2011 | Pyle |
| 2011/0043124 A1 | 2/2011 | Johnston et al. |
| 2011/0057581 A1 | 3/2011 | Ashar et al. |
| 2011/0060701 A1 | 3/2011 | Verfuerth et al. |
| 2011/0068702 A1 | 3/2011 | Van De Ven et al. |
| 2011/0084608 A1 | 4/2011 | Lin et al. |
| 2011/0090684 A1 | 4/2011 | Logan et al. |
| 2011/0102052 A1 | 5/2011 | Billingsley et al. |
| 2011/0118890 A1 | 5/2011 | Parsons |
| 2011/0133655 A1 | 6/2011 | Recker et al. |
| 2011/0140611 A1 | 6/2011 | Elek et al. |
| 2011/0140612 A1 | 6/2011 | Mohan et al. |
| 2011/0146669 A1 | 6/2011 | Bartol et al. |
| 2011/0172844 A1 | 7/2011 | Choong et al. |
| 2011/0198977 A1 | 8/2011 | VanderSluis |
| 2011/0204820 A1 | 8/2011 | Tikkanen et al. |
| 2011/0215736 A1 | 9/2011 | Horbst et al. |
| 2011/0216538 A1 | 9/2011 | Logan et al. |
| 2011/0235317 A1 | 9/2011 | Verfuerth et al. |
| 2011/0248171 A1 | 10/2011 | Rueger et al. |
| 2011/0254466 A1 | 10/2011 | Jackson et al. |
| 2011/0279063 A1 | 11/2011 | Wang et al. |
| 2011/0279248 A1 | 11/2011 | Ogawa |
| 2012/0007511 A1 | 1/2012 | Choong et al. |
| 2012/0032599 A1 | 2/2012 | Mohan et al. |
| 2012/0037725 A1 | 2/2012 | Verfuerth |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0044350 A1 | 2/2012 | Verfuerth |
| 2012/0044670 A1 | 2/2012 | Piepgras et al. |
| 2012/0058663 A1 | 3/2012 | Oster |
| 2012/0062123 A1* | 3/2012 | Jarrell ............... H05B 37/0245 315/131 |
| 2012/0062125 A1 | 3/2012 | Mohan et al. |
| 2012/0080944 A1 | 4/2012 | Recker et al. |
| 2012/0081906 A1 | 4/2012 | Verfuerth et al. |
| 2012/0086363 A1 | 4/2012 | Golding et al. |
| 2012/0098439 A1 | 4/2012 | Recker et al. |
| 2012/0112654 A1 | 5/2012 | Choong et al. |
| 2012/0112667 A1 | 5/2012 | Mohan et al. |
| 2012/0130544 A1 | 5/2012 | Mohan et al. |
| 2012/0143357 A1* | 6/2012 | Chemel ............... F21V 23/0471 700/90 |
| 2012/0153844 A1 | 6/2012 | Chobot |
| 2012/0167957 A1 | 7/2012 | Verfuerth et al. |
| 2012/0182729 A1 | 7/2012 | Verfuerth et al. |
| 2012/0203601 A1 | 8/2012 | Verfuerth et al. |
| 2012/0209755 A1 | 8/2012 | Verfuerth et al. |
| 2012/0229049 A1 | 9/2012 | Mohan et al. |
| 2012/0233045 A1 | 9/2012 | Verfuerth et al. |
| 2012/0235579 A1 | 9/2012 | Chemel et al. |
| 2012/0262074 A1 | 10/2012 | Wang |
| 2012/0274222 A1 | 11/2012 | Verfuerth et al. |
| 2012/0286673 A1 | 11/2012 | Holland et al. |
| 2012/0299485 A1 | 11/2012 | Mohan et al. |
| 2012/0326608 A1 | 12/2012 | Mohan et al. |
| 2013/0006437 A1 | 1/2013 | Verfuerth et al. |
| 2013/0020949 A1 | 1/2013 | Mohan et al. |
| 2013/0033183 A1 | 2/2013 | Verfuerth et al. |
| 2013/0063042 A1 | 3/2013 | Bora et al. |
| 2013/0069542 A1 | 3/2013 | Curasi et al. |
| 2013/0069543 A1 | 3/2013 | Mohan et al. |
| 2013/0088168 A1 | 4/2013 | Mohan et al. |
| 2013/0093323 A1 | 4/2013 | Radermacher |
| 2013/0094230 A1 | 4/2013 | Verfuerth et al. |
| 2013/0131882 A1 | 5/2013 | Verfuerth et al. |
| 2013/0141904 A1 | 6/2013 | Verfuerth et al. |
| 2013/0169185 A1 | 7/2013 | Dai et al. |
| 2013/0176401 A1 | 7/2013 | Monari et al. |
| 2013/0193857 A1 | 8/2013 | Tlachac et al. |
| 2013/0229795 A1 | 9/2013 | Wang et al. |
| 2013/0249410 A1 | 9/2013 | Thompson |
| 2013/0257292 A1 | 10/2013 | Verfuerth et al. |
| 2013/0293117 A1 | 11/2013 | Verfuerth |
| 2013/0293877 A1 | 11/2013 | Ramer et al. |
| 2013/0308325 A1 | 11/2013 | Verfuerth et al. |
| 2014/0001977 A1* | 1/2014 | Zacharchuk ........ H04L 12/2816 315/291 |
| 2014/0028199 A1 | 1/2014 | Chemel et al. |
| 2014/0117852 A1 | 5/2014 | Zhai et al. |
| 2014/0239824 A1* | 8/2014 | Li ...................... H05B 33/0812 315/185 R |
| 2014/0252961 A1 | 9/2014 | Ramer et al. |
| 2014/0265920 A1* | 9/2014 | Pederson ........... H05B 33/0842 315/294 |
| 2014/0285090 A1 | 9/2014 | Chemel et al. |
| 2014/0285095 A1 | 9/2014 | Chemel et al. |
| 2014/0292208 A1 | 10/2014 | Chemel et al. |
| 2014/0293605 A1 | 10/2014 | Chemel et al. |
| 2014/0333222 A1 | 11/2014 | Chemel et al. |
| 2014/0375206 A1 | 12/2014 | Holland et al. |
| 2015/0008827 A1 | 1/2015 | Carrigan et al. |
| 2015/0008828 A1 | 1/2015 | Carrigan et al. |
| 2015/0061511 A1 | 3/2015 | Chemel et al. |
| 2015/0184842 A1 | 7/2015 | Chemel et al. |
| 2016/0014856 A1 | 1/2016 | Wacheux |
| 2016/0360594 A1 | 12/2016 | Chemel et al. |
| 2016/0374166 A1 | 12/2016 | Chen et al. |
| 2017/0019970 A1 | 1/2017 | Chemel et al. |
| 2017/0027045 A1 | 1/2017 | Chemel et al. |
| 2017/0042001 A1 | 2/2017 | Chemel et al. |
| 2017/0086279 A1 | 3/2017 | Chemel et al. |
| 2017/0094753 A1* | 3/2017 | Lunn ................ H05B 37/0227 |
| 2017/0150561 A1* | 5/2017 | Knode ................ H02M 5/04 |
| 2018/0160509 A1 | 6/2018 | Treible et al. |

FOREIGN PATENT DOCUMENTS

| | | |
|---|---|---|
| JP | 2006-106762 | 4/2006 |
| JP | 2007-045407 A | 2/2007 |
| WO | WO 96/20369 | 7/1996 |
| WO | WO 98/34206 A1 | 8/1998 |
| WO | WO 2007/003038 | 1/2007 |
| WO | WO 2007/116332 A2 | 10/2007 |
| WO | WO 2009/003279 | 1/2009 |
| WO | WO 2009/129232 A1 | 10/2009 |
| WO | WO 2010/116283 A2 | 10/2010 |
| WO | WO 2012/061709 A1 | 5/2012 |
| WO | WO 2012/129243 A1 | 9/2012 |
| WO | WO 2013/067389 A1 | 5/2013 |
| WO | WO 2013/142292 A1 | 9/2013 |

OTHER PUBLICATIONS

International Search Report and Written Opinion dated Oct. 14, 2016 in International Application No. PCT/US2016/043893, 14 pages.

(56) References Cited

OTHER PUBLICATIONS

Final Office Action in U.S. Appl. No. 12/817,425 dated Dec. 15, 2016, 10 pages.
Office Action in U.S. Appl. No. 14/518,831 dated Dec. 30, 2016, 51 pp.
Communication pursuant to Article 94(3) EPC, issued by the European Patent Office for Application No. 12761180.4, dated Jan. 27, 2017, 5 pages.
Office Action issued by the Canadian Patent Office for Application No. 2721486, dated Oct. 14, 2016, 4 pages.
Notice of Acceptance issued by the Australian Patent Office for Application No. 2014218445, dated Jul. 15, 2016, 2 pages.
Notice of Acceptance issued by the Australian Patent Office for Application No. 2015255250, dated Jan. 24, 2017, 3 pages.
Notification of Fulfilling of Registration Formality issued by the Patent Office of the People's Republic of China for Application No. 201380026132.5, dated Aug. 3, 2016 (English Translation), 2 pages.
Notice of Acceptance issued by the Australian Patent Office for Application No. 2013235436, dated Nov. 16, 2016, 2 pages.
Advisory Action in U.S. Appl. No. 12/831,358, dated Feb. 27, 2014, 2 pages.
Albeo Technologies, C Series, http://www.albeotech.com/?site_id=1500&item_id=161711, retrieved May 18, 2011, 2 pages.
Albeo Technologies, C3 Series, http://www.albeotech.com/?site_id=1500&item_id=173338, retrieved May 18, 2011, 2 pages.
Albeo Technologies, S Series, http://www.albeotech.com/?site id=1500&item_id=161722, retrieved May 18, 2011, 2 pages.
Albeo Technologies, Surface Mounts, http://www.albeotech.com/?site_id=1500&item_id=161724, retrieved May 18, 2011, 2 pages.
Beta LED, 227 Series LED Canopy, http://www.betaled.com/us-en/TechnicalLibrary/TechnicalDocuments/227-series-canopy.aspx, retrieved May 18, 2011, 2 pages.
Beta LED, 227 Series LED Sofit, http://www.betaled.com/us-en/TechnicalLibrary/TechnicalDocuments/227-series-soffit.aspx, retrieved May 18, 2011, 2 pages.
Beta LED, 304 Series LED Interior, http://www.betaled.com/us-en/TechnicalLibrary/TechnicalDocuments/304-series-canopy.aspx, retrieved May 18, 2011, 2 pages.
Beta LED, 304 Series LED Parking Structure, http://www.betaled.com/us-en/TechnicalLibrary/TechnicalDocuments/304-series-parking.aspx, retrieved May 18, 2011, 2 pages.
Beta LED, 304 Series LED Sofit, http://www.betaled.com/us-en/TechnicalLibrary/TechnicalDocuments/304-series-soffit.aspx, retrieved May 18, 2011, 2 pages.
Beta LED, The Edge Canopy, http://www.betaled.com/us-en/TechnicalLibrary/TechnicalDocuments/TheEdgeCanopy.aspx, retrieved May 18, 2011, 2 pages.
Beta LED, The Edge LED Parking Structure, http://www.betaled.com/us-en/TechnicalLibrary/TechnicalDocuments/TheEdgeParking.aspx, retrieved May 18, 2011, 2 pages.
Color Kinetics, eW Cove EC Powercore line, http://www.colorkinetics.com/support/datasheets/eW_Cove_EC_Powercore_2700K_12in_SpecSheet.pdf, retrieved May 18, 2011, 2 pages.
Color Kinetics, eW Cove MX Powercore line, http://www.colorkinetics.com/support/datasheets/eW_Cove_MX_Powercore_2700K_Wide_Beam_Angle_SpecSheet.pdf, retrieved May 18, 2011, 2 pages.
Color Kinetics, eW Cove QLX Powercore line, http://www.colorkinetics.com/support/datasheets/eW_Cove_QLX_Powercore_6in_110degreex110degree.pdf, retrieved May 18, 2011, 2 pages.
Color Kinetics, eW Fuse Powercore line, http://www.colorkinetics.com/support/datasheets/eW_Fuse_Powercore_2700K_10degree_x_60degree.pdf, retrieved May 18, 2011, 2 pages.
Color Kinetics, eW Graze Powercore line, http://www.colorkinetics.com/support/datasheets/eW_Graze_Powercore_SpecSheet_2700K_10x60.pdf, retrieved May 18, 2011, 2 pages.
"Enlightened Energy Management System," ETCC Open Forum, 13 pp. (Jul. 24, 2012).
Examination Report in Australian Patent Application No. 2009236311, dated May 10, 2013, 3 pages.
Examination Report in Australian Patent Application No. 2011323165, dated Aug. 22, 2014, 3 pages.
Examination Report in Australian Patent Application No. 2012230991, dated Nov. 18, 2014, 3 pages.
Examination Report in Australian Patent Application No. 2012332206, dated Feb. 12, 2015, 3 pages.
Examination Report in Australian Patent Application No. 2015255250, dated Jun. 1, 2016, 3 pages.
Examination Report in European Patent Application No. 09732558.3, dated Apr. 19, 2016, 5 pages.
Extended European Report and Opinion for European Appln No. EP 09732558.3, dated Aug. 23, 2012, 8 pages.
Extended European Report and Opinion for European Appln No. EP 12844864.4, dated Nov. 3, 2015, 8 pages.
Extended European Report and Opinion for European Patent Application No. EP 13763788.0, dated Dec. 17, 2015, 7 pages.
Final Office Action in U.S. Appl. No. 12/817,425 dated Sep. 17, 2015, 9 pages.
Final Office Action in U.S. Appl. No. 12/817,425, dated Sep. 15, 2014, 17 pages.
Final Office Action in U.S. Appl. No. 13/425,295, dated Jan. 2, 2015, 17 pages.
Final Office Action in U.S. Appl. No. 13/425,295, dated Mar. 7, 2016, 18 pages.
Final Office Action in U.S. Appl. No. 14/245,196, dated May 27, 2015, 6 pages.
Final Office Action in U.S. Appl. No. 14/267,368 dated Dec. 31, 2015, x pages.
Final Office Action in U.S. Appl. No. 14/294,081 dated Jun. 10, 2015, 13 pages.
Garg, Visha et al., "Smart occupancy sensors to reduce energy consumption, Energy and Buildings," vol. 32, Issue 1, Jun. 2000, pp. 81-87. ISSN 0378-7788, 10.1 016/S0378-7788(99)00040-7. (http://www.sciencedirect.com/science/article/pii/S037877889.
International Preliminary Report on Patentability in International Application No. PCT/US2012/029834, dated Sep. 24, 2013, 7 pages.
International Preliminary Report on Patentability in International Application No. PCT/US2012/063372, dated Mar. 19, 2013, 14 pages.
International Preliminary Report on Patentability in International Application No. PCT/US2013/031790, dated Sep. 23, 2014, 10 pages.
International Preliminary Report on Patentability of PCT/US2009/040514, dated Oct. 19, 2010, 4 pages.
International Preliminary Report on Patentability of PCT/US2011/059334, dated May 7, 2013, 8 pages.
International Search Report and Written Opinion in International Application No. PCT/US2011/059334, dated Feb. 2, 2012, 11 pages.
International Search Report and Written Opinion in International Application No. PCT/US2012/063372, dated Mar. 19, 2013, 18 pages.
International Search Report and Written Opinion in International Application No. PCT/US2013/031790, dated Jun. 3, 2013, 13 pages.
International Search Report and Written Opinion in International Application No. PCT/US2014/35990, dated Sep. 18, 2014, 11 pages.
International Search Report and Written Opinion in International Application No. PCT/US2014/060095, dated Jan. 29, 2015, 16 pages.
International Search Report and Written Report in International Application No. PCT/US12/029834, dated Jul. 12, 2012, 10 pages.
International Search Report in International Application No. PCT/US2009/040514 dated Jun. 26, 2009, 4 pages.
Notice of Acceptance for Australian Patent Application No. 2012332206, dated Jan. 21, 2016, 2 pages.
Notice of Acceptance in Australian Application No. 2009236311, dated May 28, 2014, 2 pages.
Notice of Acceptance in Australian Patent Application No. 2011323165, dated Apr. 10, 2015, 2 pages.

(56) References Cited

OTHER PUBLICATIONS

Notice of Allowance in U.S. Appl. No. 12/423,543, dated Jun. 21, 2012, 4 pages.
Notice of Allowance in U.S. Appl. No. 12/423,543, dated Feb. 8, 2012, 12 pages.
Notice of Allowance in U.S. Appl. No. 12/423,543, dated Apr. 11, 2012, 8 pages.
Notice of Allowance in U.S. Appl. No. 12/822,421, dated Mar. 1, 2013, 9 pages.
Notice of Allowance in U.S. Appl. No. 12/822,577, dated Mar. 15, 2013, 10 pages.
Notice of Allowance in U.S. Appl. No. 12/823,195, dated Oct. 27, 2011, 7 pages.
Notice of Allowance in U.S. Appl. No. 12/823,195, dated Dec. 12, 2011, 8 pages.
Notice of Allowance in U.S. Appl. No. 12/824,797 dated Nov. 9, 2012, 8 pages.
Notice of Allowance in U.S. Appl. No. 12/827,336, dated Oct. 2, 2013, 12 pages.
Notice of Allowance in U.S. Appl. No. 12/827,397, dated Oct. 29, 2012, 5 pages.
Notice of Allowance in U.S. Appl. No. 12/828,340, dated Nov. 21, 2012, 5 pages.
Notice of Allowance in U.S. Appl. No. 12/828,495, dated Feb. 19, 2014, 8 pages.
Notice of Allowance in U.S. Appl. No. 12/830,868, dated Mar. 25, 2013, 9 pages.
Notice of Allowance in U.S. Appl. No. 12/830,868, dated Jun. 24, 2013, 6 pages.
Notice of Allowance in U.S. Appl. No. 12/831,358, dated Aug. 29, 2014, 9 pages.
Notice of Allowance in U.S. Appl. No. 12/831,476, dated Jun. 11, 2014, 5 pages.
Notice of Allowance in U.S. Appl. No. 12/832,179, dated Aug. 1, 2014, 9 pages.
Notice of Allowance in U.S. Appl. No. 12/832,211, dated Apr. 23, 2014, 10 pages.
Notice of Allowance in U.S. Appl. No. 12/833,181, dated May 23, 2013, 18 pages.
Notice of Allowance in U.S. Appl. No. 12/833,332, dated Mar. 21, 2013, 8 pages.
Notice of Allowance in U.S. Appl. No. 13/289,492, dated Nov. 19, 2014, 9 pages.
Notice of Allowance in U.S. Appl. No. 13/289,492, dated Jan. 23, 2015, 10 pages.
Notice of Allowance in U.S. Appl. No. 14/045,679, dated Feb. 20, 2014, 8 pages.
Notice of Allowance in U.S. Appl. No. 14/245,196, dated Sep. 9, 2015, 8 pages.
Notice of Allowance in U.S. Appl. No. 14/245,196, dated Sep. 23, 2015, 2 pages.
Notice of Allowance in U.S. Appl. No. 14/289,601, dated Apr. 1, 2015, 9 pages.
Notice of Allowance in U.S. Appl. No. 14/289,601, dated Jun. 4 2015, 2 pages.
Notice of Allowance in U.S. Appl. No. 14/294,082, dated May 19, 2015, 8 pages.
Office Action in Canadian Application No. 2,721,486 dated Jul. 14, 2015, 4 pages.
Office Action in Chinese Patent Application No. 201380026132.5 dated Sep. 12, 2015, 17 pages.
Office Action in U.S. Appl. No. 13/425,295, dated Jun. 10, 2014, 12 pages.
Office Action in U.S. Appl. No. 12/423,543, dated Jun. 27, 2011, 14 pages.
Office Action in U.S. Appl. No. 12/817,425, dated Apr. 30, 2012, 18 pages.
Office Action in U.S. Appl. No. 12/817,425, dated Feb. 25, 2015, 6 pages.
Office Action in U.S. Appl. No. 12/817,425, dated Mar. 27, 2014, 16 pages.
Office Action in U.S. Appl. No. 12/817,425, dated Mar. 23, 2016, 9 pages.
Office Action in U.S. Appl. No. 12/817,425, dated Nov. 3, 2011, 14 pages.
Office Action in U.S. Appl. No. 12/817,425, dated Sep. 10, 2013, 15 pages.
Office Action in U.S. Appl. No. 12/822,421, dated Jan. 19, 2012, 20 pages.
Office Action in U.S. Appl. No. 12/822,421, dated Sep. 12, 2012, 16 pages.
Office Action in U.S. Appl. No. 12/822,577, dated Apr. 2, 2012, 25 pages.
Office Action in U.S. Appl. No. 12/822,577, dated Oct. 11, 2012, 21 pages.
Office Action in U.S. Appl. No. 12/824,797, dated Jun. 29, 2012, 5 pages.
Office Action in U.S. Appl. No. 12/827,209, dated Jan. 10, 2014, 20 pages.
Office Action in U.S. Appl. No. 12/827,336, dated Jun. 13, 2013, 6 pages.
Office Action in U.S. Appl. No. 12/827,336, dated Oct. 4, 2012, 26 pages.
Office Action in U.S. Appl. No. 12/827,397, dated Jul. 11, 2012, 6 pages.
Office Action in U.S. Appl. No. 12/828,340, dated Jul. 2, 2012, 4 pages.
Office Action in U.S. Appl. No. 12/828,385, dated Mar. 19, 2013, 12 pages.
Office Action in U.S. Appl. No. 12/828,385, dated Sep. 12, 2012, 5 pages.
Office Action in U.S. Appl. No. 12/828,495, dated Dec. 12, 2012, 21 pages.
Office Action in U.S. Appl. No. 12/828,495, dated May 17, 2012, 6 pages.
Office Action in U.S. Appl. No. 12/828,495, dated Mar. 28, 2013, 22 pages.
Office Action in U.S. Appl. No. 12/828,495, dated Oct. 10, 2013, 25 pages.
Office Action in U.S. Appl. No. 12/830,868, dated Aug. 13, 2012, 26 pages.
Office Action in U.S. Appl. No. 12/830,868, dated Mar. 5, 2012, 5 pages.
Office Action in U.S. Appl. No. 12/831,358, dated Jun. 13, 2013, 7 pages.
Office Action in U.S. Appl. No. 12/831,358, dated Nov. 19, 2013, 16 pages.
Office Action in U.S. Appl. No. 12/831,476, dated Apr. 11, 2012, 7 pages.
Office Action in U.S. Appl. No. 12/831,476, dated Feb. 13, 2013, 42 pages.
Office Action in U.S. Appl. No. 12/831,476, dated Jul. 23, 2013, 42 pages.
Office Action in U.S. Appl. No. 12/831,476, dated Nov. 21, 2013, 52 pages.
Office Action in U.S. Appl. No. 12/831,476, dated Oct. 17, 2012, 36 pages.
Office Action in U.S. Appl. No. 12/832,179, dated Feb. 21, 2014, 16 pages.
Office Action in U.S. Appl. No. 12/832,179, dated Jul. 17, 2013, 15 pages.
Office Action in U.S. Appl. No. 12/832,179, dated Mar. 13, 2013, 13 pages.
Office Action in U.S. Appl. No. 12/832,179, dated Sep. 12, 2012, 5 pages.
Office Action in U.S. Appl. No. 12/832,211, dated Jun. 20, 2013, 12 pages.
Office Action in U.S. Appl. No. 12/832,211, dated Oct. 2, 2013, 13 pages.
Office Action in U.S. Appl. No. 12/832,211, dated Sep. 12, 2012, 4 pages.

(56) References Cited

OTHER PUBLICATIONS

Office Action in U.S. Appl. No. 12/833,181, dated Sep. 12, 2012, 5 pages.
Office Action in U.S. Appl. No. 12/833,332 dated Nov. 23, 2012, 5 pages.
Office Action in U.S. Appl. No. 12/833,332, dated Aug. 20, 2012, 5 pages.
Office Action in U.S. Appl. No. 13/289,492, dated Aug. 5, 2014, 29 pages.
Office Action in U.S. Appl. No. 13/289,492, dated Feb. 27, 2014, 28 pages.
Office Action in U.S. Appl. No. 13/425,295 dated Jun. 29, 2015, 17 pages.
Office Action in U.S. Appl. No. 14/245,196, dated Feb. 9, 2015, 13 pages.
Office Action in U.S. Appl. No. 14/267,386 dated Aug. 10, 2015, 27 pages.
Office Action in U.S. Appl. No. 14/267,386, dated Apr. 17, 2015, 30 pages.
Office Action in U.S. Appl. No. 14/289,601, dated Jan. 30, 2015, 6 pages.
Office Action in U.S. Appl. No. 14/294,081, dated Jan. 22, 2015, 7 pages.
Office Action in U.S. Appl. No. 14/294,081, dated Mar. 14, 2016, 20 pages.
Office Action in U.S. Appl. No. 14/294,082, dated Jan. 2, 2015, 10 pages.
Office Action in U.S. Appl. No. 14/960,105, dated Aug. 30, 2016, 50 pages.
Patent Examination Report No. 1 for Australian Patent Application No. 2013235436, dated Jan. 18, 2016, 3 pages.
Progress Report: Reducing Barriers to Use of High Efficiency Lighting Systems; Oct. 2001, (http://www.lrc.rpi.edu/researchAreas/reducingBarriers/pdf/year1FinalReport.pdf), 108 pages.
Restriction Requirement in U.S. Appl. No. 12/817,425, dated Dec. 10, 2014, 6 pages.
Restriction Requirement in U.S. Appl. No. 14/294,081, dated Oct. 9, 2014, 6 pages.
Second Office Action in Chinese Patent Application No. 201380026132.5, dated Apr. 20, 2016, 6 pages (w/English translation).
Vainio, A.-M. et al., Learning and adaptive fuzzy control system for smart home, Mar. 2008, http://www.springerlink.com/content/l172k3200614qx81/fulltext.pdf, 10 pages.
Written Opinion in International Application No. PCT/US2009/040514, dated Jun. 26, 2009, 3 pages.
ZigBee Alliance "Wireless Sensors and Control Networks: Enabling New Opportunities with ZigBee", Bob Heile, Chairman, ZigBee Alliance, Dec. 2006 Powerpoint Presentation, 53 pages.
ZigBee Alliance Document No. 08006r03, Jun. 2008, ZigBee-200y Layer Pics and Stack Profile, Copyright © 1996-2008 by the ZigBee Alliance. 2400 Camino Ramon, Suite 375, San Ramon, CA 94583, USA; http://www.zigbee.org, 119 pages.
ZigBee Specification Document 053474r17, Notice of Use and Disclosure; Jan. 17, 2008 11:09 A.M., Sponsored by: ZibEe Alliance; Copyright © 2007 ZigBee Standards Organizat. All rights reserved, 602 pages.
Examination Report issued by the Canadian Patent Office for Application No. 2,830,991, dated Jul. 13, 2017, 3 pages.
Examination Report issued by the European Patent Office for Application No. 12844864.4, dated Aug. 16, 2017, 3 pages.
Examination Report No. 1 issued by the Australian Patent Office for Application No. 2016202824, dated Jul. 17, 2017, 6 pages.
Examination Report No. 1 issued by the Australian Patent Office for Application No. 2017201414, dated Jun. 6, 2017, 3 pages.
Non-Final Office Action in U.S. Appl. No. 12/817,425, dated Aug. 3, 2017, 17 pages.
Non-Final Office Action in U.S. Appl. No. 15/298,064, dated Aug. 11, 2017, 15 pages.
Notice of Allowance in U.S. Appl. No. 14/518,831, dated Aug. 21, 2017, 13 pages.
Notice of Allowance in U.S. Appl. No. 14/960,105, dated Jul. 12, 2017, 6 pages.
Office Action issued by the European Patent Office for Application No. 12 761 180.4, dated Aug. 24, 2017, 5 pages.
Communication pursuant to Article 94(3) EPC, issued by the European Patent Office for Application No. 13763788.0, dated Apr. 4, 2017, 5 pages.
European Search Report issued by the European Patent Office for Application No. 14852889.6, dated May 19, 2017, 8 pages.
Examination Report No. 1 issued by the Australian Patent Office for Application No. 2014259974, dated Apr. 3, 2017, 3 pages.
Examination Report No. 1 issued by the Australian Patent Office for Application No. 2016206250, dated May 1, 2017, 3 pages.
Examination Report No. 2 issued by the Australian Patent Office for Application No. 2015203026, dated May 16, 2017, 3 pages.
Extended European Search Report issued by the European Patent Office for Application No. 11838876.8, dated Apr. 11, 2017, 8 pages.
Non-Final Office Action in U.S. Appl. No. 14/645,548, dated May 4, 2017, 20 pages.
Non-Final Office Action in U.S. Appl. No. 14/927,413, dated May 5, 2017, 12 pages.
Non-Final Office Action in U.S. Appl. No. 15/175,725, dated Jun. 1, 2017, 14 pages.
Non-Final Office Action in U.S. Appl. No. 14/294,081, dated Jun. 15, 2017, 15 pages.
Notice of Allowance in U.S. Appl. No. 14/960,105, dated May 10, 2017, 8 pages.
Final Office Action in U.S. Appl. No. 14/294,081 dated Oct. 5, 2016, 20 pages.
Examination Report No. 1 dated Oct. 14, 2016 in Australian Patent Application No. 2015203026, 2 pages.
Advisory Action in U.S. Appl. No. 15/175,725, dated Apr. 19, 2018, 4 pages.
Examination Report in European Patent Application No. 12761180.4, dated Apr. 11, 2018, 5 pages.
Examination Report in European Patent Application No. 13763788.0, dated Apr. 10, 2018, 6 pages.
Final Office Action in U.S. Appl. No. 14/294,081, dated Mar. 9, 2018, 14 pages.
Non-Final Office Action in U.S. Appl. No. 15/367,125, dated Apr. 6, 2018, 14 pages.
Non-Final Office Action in U.S. Appl. No. 15/728,618, dated Mar. 1, 2018, 4 pages.
Examination Report No. 1 issued by the Australian Patent Office for Application No. 2017202824, dated Jan. 15, 2018, 4 pages.
Final Office Action in U.S. Appl. No. 15/175,725, dated Jan. 9, 2018, 14 pages.
Non-Final Office Action in U.S. Appl. No. 15/218,851, dated Jan. 25, 2018, 16 pages.
Notice of Allowance in U.S. Appl. No. 14/645,548, dated Oct. 20, 2017, 12 pages.
Notice of Allowance in U.S. Appl. No. 14/927,413, dated Nov. 7, 2017, 14 pages.
Office Action issued by the Canadian Patent Office for Application No. 2,721,486, dated Sep. 19, 2017, 3 pages.
Office Action issued by the Canadian Patent Office for Application No. 2,816,978, dated Oct. 3, 2017, 4 pages.
Examination Report in European Application No. 12844864.4, dated May 8, 2018, 6 pages.
Examination Report No. 1 in Australian Application No. 2014331746, dated Jun. 27, 2018, 3 pages.
Final Office Action in U.S. Appl. No. 12/817,425, dated Jun. 13, 2018, 39 pages.
Final Office Action in U.S. Appl. No. 15/728,618, dated Jul. 10, 2018, 10 pages.
Non-Final Office Action in U.S. Appl. No. 15/218,851, dated Jul. 24, 2018, 18 pages.
Non-Final Office Action in U.S. Appl. No. 15/916,234, dated Apr. 26, 2018, 13 pages.

\* cited by examiner

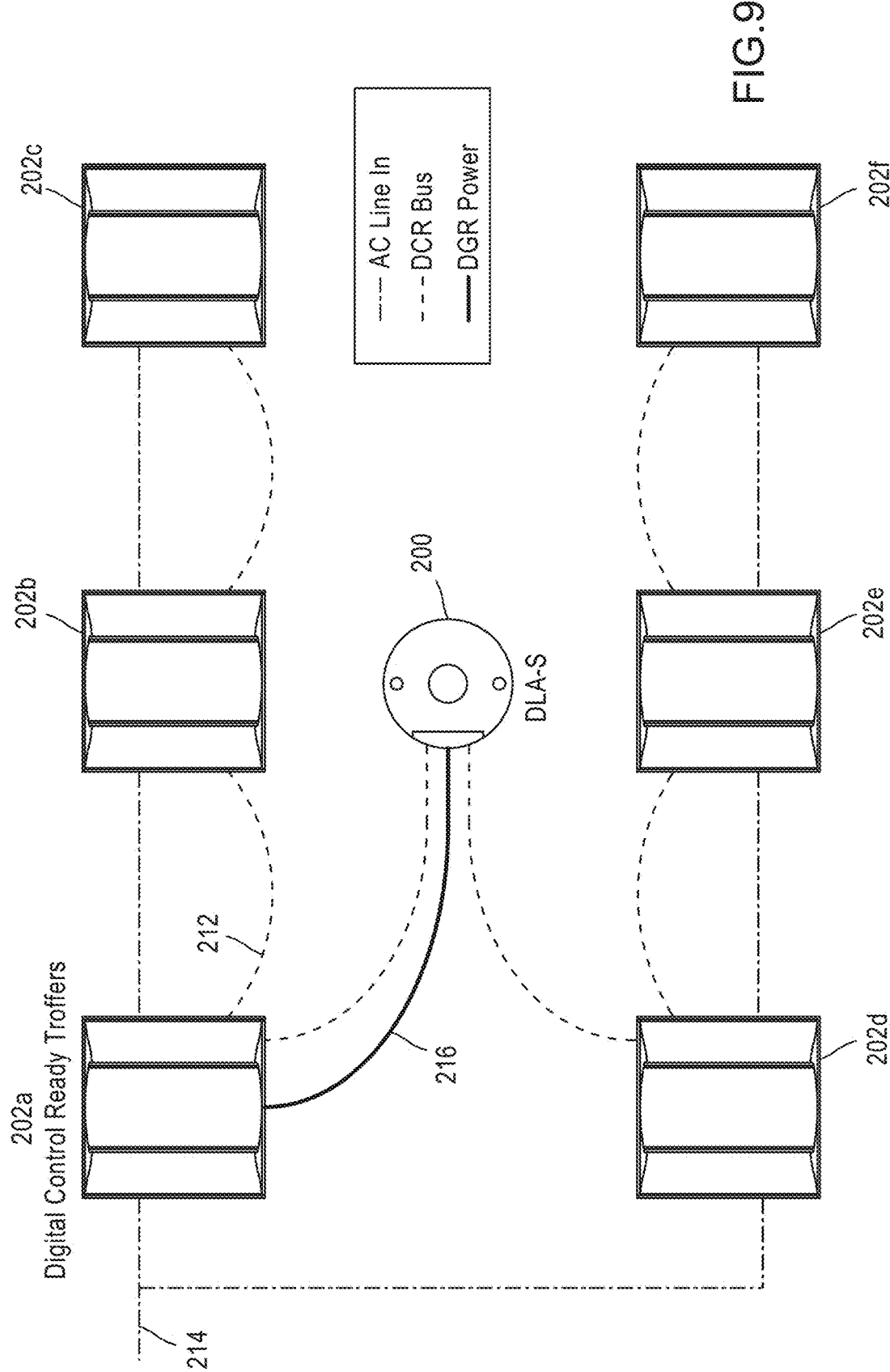

544

Object ID: Warehouse high-lift forklift #WHM4
Illumination level overhead: 10 ft-cd
Illumination level 10 ft radius: maximum
Illumination level 25 ft radius: > 100 ft-cd
Illumination level 50 ft radius: > 40 ft-cd

Object ID: Manufacturing pallet jack #Cell8PJ2
Illumination level 10 ft radius: > 10 ft-cd
Illumination level 25 ft radius: > 5 ft-cd
Illumination level 50 ft radius: > 3 ft-cd

My ID: Brian Chemel
My preferred illumination at my desk: 50 ft-cd, 4200K, 5ft radius
My preferred light level in the rest of the office: 20 ft-cd, 3000K, 50ft radius
My preferred light level in the kitchen: 100 ft-cd, 5000K, infinite radius
My preferred light level in the day time: > 40 ft-cd, 5500K
My preferred light level in the night time: 10 ft-cd to 20 ft-cd, 2500K

FIG. 10C

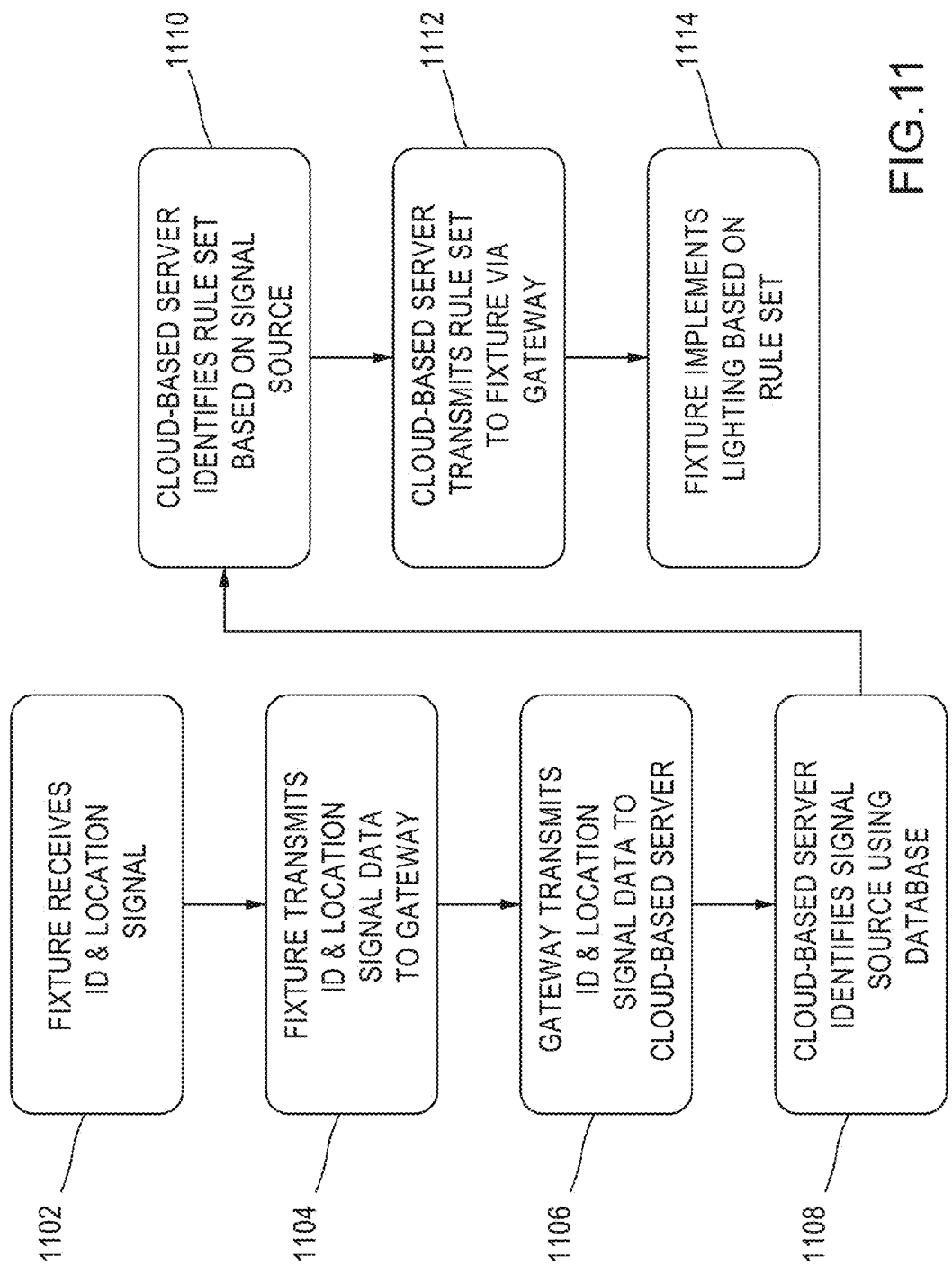

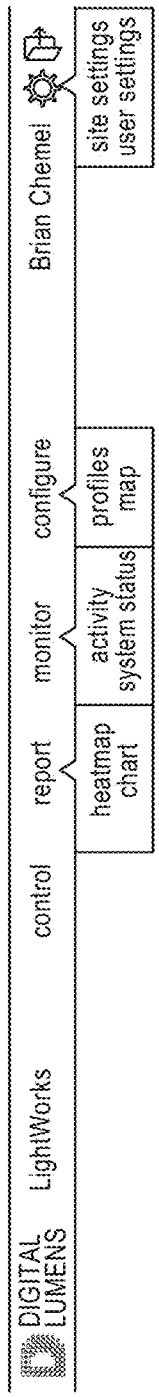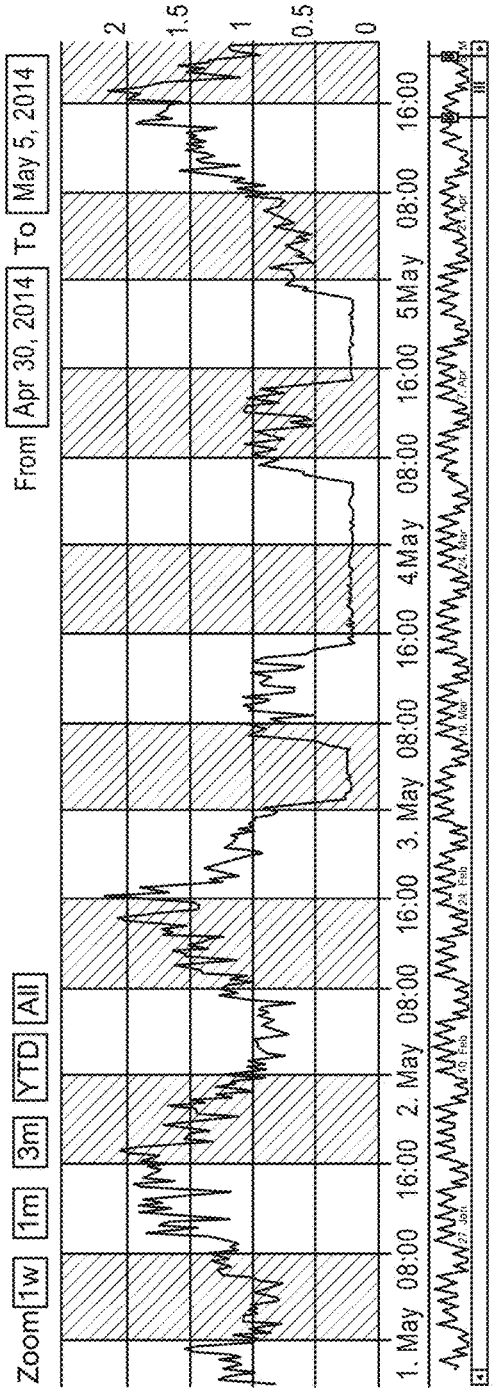
FIG. 21

METHODS, SYSTEMS, AND APPARATUS FOR INTELLIGENT LIGHTING

CROSS-REFERENCE TO RELATED APPLICATIONS

This application is a continuation of International Patent Application No. PCT/US2014/060095, filed Oct. 10, 2014, entitled "METHODS, SYSTEMS, AND APPARATUS FOR INTELLIGENT LIGHTING," the disclosure of which is hereby incorporated by reference in its entirety.

International Patent Application No. PCT/US2014/060095 claims priority, under 35 U.S.C. § 119(e), to U.S. Application No. 61/889,368, filed Oct. 10, 2013, entitled "METHODS, SYSTEMS, AND APPARATUS FOR INTELLIGENT LIGHTING," the disclosure of which is hereby incorporated by reference in its entirety.

International Patent Application No. PCT/US2014/060095 also claims priority, under 35 U.S.C. § 119(e), to U.S. Application No. 61/983,235, filed Apr. 23, 2014, entitled "METHODS, SYSTEMS, AND APPARATUS FOR INTELLIGENT LIGHTING," the disclosure of which is hereby incorporated by reference in its entirety.

BACKGROUND

Intelligent lighting systems combine solid-state light sources, embedded sensors and controls, and low-cost pervasive networking to create an integrated illumination system which is highly responsive to its environment. Benefits of some or all such systems may include, but are not limited to, a much higher quality of light tailored specifically to user needs and significant energy savings compared to legacy lighting system technologies.

SUMMARY

Embodiments of the present invention include a system for controlling illumination of an environment. The system may comprise at least one lighting fixture disposed to illuminate a first portion of the environment, at least one gateway communicatively coupled to the lighting fixture(s), and at least one server communicatively coupled to the gateway(s). The lighting fixture can include a light source to emit illumination; a light source driver, operably coupled to the light source, to provide a variable amount of power to the light source; a power meter, operably coupled to the light source driver, to measure electrical power supplied to the light source; a sensor to sense the presence of a person and/or object within the first portion of the environment; a fixture processor operably coupled to the light source driver, the energy usage sensor, and the environmental sensor; a fixture memory operably coupled to the power meter and the sensor; and a fixture communications interface, operably coupled to the fixture processor.

In operation, the fixture processor locates and identifies the person and/or object sensed by the sensor, identifies a lighting profile associated with the person and/or object, and to adjusts the illumination emitted by the light source based at least in part on the lighting profile. The a fixture memory stores an indication of total electrical power supplied to the light source. And the fixture communications interface transmits an indication of the presence of the person and/or object and the indication of total electrical power supplied to the light source to the gateway.

The gateway includes a gateway communications interface, a gateway memory, and a gateway processor. The gateway communications interface to receive the indication of the presence of the person and/or object and the indication of total electrical power supplied to the light source from the fixture communications interface. The gateway memory stores the indication of the presence of the person and/or object and the indication of total electrical power supplied to the light source. And the gateway processor provides an updated lighting profile associated with the person and/or object to the lighting fixture(s).

The server includes a server communications interface and a server processor that is operably coupled to the server communications interface. In operation, the server communications interface transmits the updated lighting profile to the gateway and receives the indication of total electrical power supplied to the light source from the gateway. The server processor determines the updated lighting profile based at least in part on the indication of total electrical power supplied to the light source from the gateway.

Another embodiment of the present invention comprises a method of adjusting illumination of an environment by at least one lighting fixture in a network of lighting fixtures. This method may include sensing an object and/or a person within the environment with at least one sensor communicatively coupled to the network of lighting fixtures. A processor communicatively coupled to the sensor identifies a lighting profile associated with the object and/or the person sensed by the sensor. Then the processor or another device adjusts the illumination provided by the lighting fixture according to the lighting profile identified by the processor.

Still another embodiment of the present invention comprises an apparatus for controlling at least one lighting fixture disposed to illuminate an environment. The apparatus may comprise a memory, a local processor operably coupled to the memory, and a communications interface operably coupled to the local processor and the memory. In operation, the memory stores sensor data associated with the lighting fixture, energy usage data representing energy consumed by the lighting fixture over a given time period, and at least one rule for providing a desired lighting level and/or adjusting power consumption by the at least one lighting fixture according to the sensor data and the energy usage data. The local processor provides an updated rule based at least in part on the sensor data, the energy usage data, and/or instructions from a network-based processor. And the communications interface receives the sensor data and the energy usage data from the lighting fixture, transmits the sensor data and/or the energy usage data to the network-based processor, receive the instructions from the network-based processor, and transmits the updated rule to the lighting fixture.

Yet another embodiment of the present invention comprises an apparatus and method of controlling illumination of an environment by at least one lighting fixture in a network of lighting fixtures. The apparatus may include a communications interface, a processor, and a memory. In one example of this method, a communications interface receives sensor data associated with the at least one lighting fixture and energy usage data representing energy consumed by the lighting fixture over a given time period. A memory operably coupled to the communications interface stores the sensor data and the energy usage data received by the communications interface. The memory also stores at least one rule for providing a desired lighting level and/or adjusting power consumption by the lighting fixture according to the sensor data and the energy usage data. The processor and/or the communications interface transmit the sensor data and/or the energy usage data stored in the memory to a network-based processor. The processor and/or communications interface also receive instructions from the network-based processor representative of a change to the rule stored in the memory and transmit an updated rule to the lighting fixture.

The following U.S. published applications are hereby incorporated herein by reference:

U.S. Pat. No. 8,138,690, issued Feb. 29, 2012, filed Jun. 25, 2010, and entitled "LED-BASED LIGHTING METHODS, APPARATUS, AND SYSTEMS EMPLOYING LED LIGHT BARS, OCCUPANCY SENSING, LOCAL STATE MACHINE, AND METER CIRCUIT";

U.S. Pat. No. 8,232,745, issued Jul. 31, 2012, filed Apr. 14, 2009, and entitled "MODULAR LIGHTING SYSTEMS";

U.S. Pat. No. 8,339,069, issued Dec. 25, 2012, filed Jun. 30, 2010, and entitled "POWER MANAGEMENT UNIT WITH POWER METERING";

U.S. Pat. No. 8,373,362, issued Feb. 12, 2013, filed Jul. 1, 2010, and entitled "METHODS, SYSTEMS, AND APPARATUS FOR COMMISSIONING AN LED LIGHTING FIXTURE WITH REMOTE REPORTING";

U.S. Pat. No. 8,543,249, issued Sep. 24, 2013, filed Jul. 6, 2010, and entitled "POWER MANAGEMENT UNIT WITH MODULAR SENSOR BUS";

U.S. Pat. No. 8,552,664, issued Oct. 8, 2013, filed Jul. 9, 2010, and entitled "POWER MANAGEMENT UNIT WITH BALLAST INTERFACE";

U.S. Pat. No. 8,593,135, issued Nov. 26, 2013, filed Jul. 9, 2010, and entitled "LOW-COST POWER MEASUREMENT CIRCUIT";

U.S. Pat. No. 8,610,377, issued Dec. 17, 2013, filed Jul. 9, 2010, and entitled "METHODS, APPARATUS, AND SYSTEMS FOR PREDICTION OF LIGHTING MODULE PERFORMANCE";

U.S. Pat. No. 8,729,833, issued May 20, 2014, filed Mar. 19, 2012, and entitled "METHODS, SYSTEMS, AND APPARATUS FOR PROVIDING VARIABLE ILLUMINATION";

U.S. Pat. No. 8,754,589, issued Jun. 17, 2014, filed Jul. 1, 2010, and entitled "POWER MANAGEMENT UNIT WITH TEMPERATURE PROTECTION";

U.S. Pat. No. 8,805,550, issued Aug. 12, 2014, filed Jul. 7, 2010, and entitled "POWER MANAGEMENT UNIT WITH POWER SOURCE ARBITRATION";

U.S. Pat. No. 8,823,277, issued Sep. 2, 2014, filed Jul. 8, 2010, and entitled "METHODS, SYSTEMS, AND APPARATUS FOR MAPPING A NETWORK OF LIGHTING FIXTURES WITH LIGHT MODULE IDENTIFICATION";

U.S. Pre-Grant Publication No. 2010-0295482-A1, published Nov. 25, 2010, filed Jul. 7, 2010, and entitled "POWER MANAGEMENT UNIT WITH MULTI-INPUT ARBITRATION";

U.S. Pre-Grant Publication No. 2010-0296285-A1, published Nov. 25, 2010, filed Jun. 17, 2010, and entitled "SENSOR-BASED LIGHTING METHODS, APPARATUS, AND SYSTEMS EMPLOYING ROTATABLE LED LIGHT BARS";

U.S. Pat. No. 8,866,408, issued Oct. 21, 2014, filed Jul. 8, 2010, and entitled "METHODS, APPARATUS, AND SYSTEMS FOR AUTOMATIC POWER ADJUSTMENT BASED ON ENERGY DEMAND INFORMATION";

U.S. Pre-Grant Publication No. 2014-0285095-A1, published Sep. 25, 2014, filed May 28, 2014, and entitled "LIGHTING FIXTURES AND METHODS OF COMMISSIONING LIGHTING FIXTURES";

U.S. Pre-Grant Publication No. 2014-0285090-A1, published Sep. 25, 2014, filed Jun. 2, 2014, and entitled "LIGHTING FIXTURES AND METHODS OF COMMISSIONING LIGHTING FIXTURES";

U.S. Pre-Grant Publication No. 2014-0293605-A1, published Oct. 2, 2014, filed Jun. 2, 2014, and entitled "LIGHTING FIXTURES AND METHODS OF COMMISSIONING LIGHTING FIXTURES";

U.S. Pre-Grant Publication No. 2014-0292208-A1, published Oct. 2, 2014, filed May 1, 2014, and entitled "METHODS, SYSTEMS, AND APPARATUS FOR INTELLIGENT LIGHTING";

U.S. Pre-Grant Publication No. 2012-0235579, published Sep. 20, 2012, filed Mar. 20, 2012, and entitled "METHODS, APPARATUS AND SYSTEMS FOR PROVIDING OCCUPANCY-BASED VARIABLE LIGHTING";

U.S. Pre-Grant Publication No. 2012-0143357, published Jun. 7, 2012, filed Nov. 4, 2011, and entitled "METHOD, APPARATUS, AND SYSTEM FOR OCCUPANCY SENSING";

WO 2009/129232, published Oct. 22, 2009, filed Apr. 14, 2009, and entitled "MODULAR LIGHTING SYSTEMS";

WO 2012/061709, published May 10, 2012, filed Nov. 4, 2011, and entitled "METHOD, APPARATUS, AND SYSTEM FOR OCCUPANCY SENSING";

WO 2012/129243, published Sep. 27, 2012, filed Mar. 20, 2012, and entitled "METHODS, APPARATUS AND SYSTEMS FOR PROVIDING OCCUPANCY-BASED VARIABLE LIGHTING";

WO 2013/067389, published May 10, 2013, filed Nov. 2, 2012, and entitled "METHODS, APPARATUS AND SYSTEMS FOR INTELLIGENT LIGHTING";

WO 2013/142292, published Sep. 26, 2013, filed Mar. 14, 2013, and entitled "METHODS, SYSTEMS, AND APPARATUS FOR PROVIDING VARIABLE ILLUMINATION"; and PCT/US2014/035990, filed Apr. 30, 2014, and entitled "METHODS, APPARATUSES, AND SYSTEMS FOR OPERATING LIGHT EMITTING DIODES AT LOW TEMPERATURE".

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 9 illustrates another stand-alone DLA connected to and controlling several DCR lighting fixtures (troffers) according to embodiments of the present invention.

FIG. 10A illustrates an exemplary object lighting profile for a warehouse forklift according to embodiments of the present invention.

FIG. 10B illustrates an exemplary object lighting profile for a pallet jack according to embodiments of the present invention.

FIG. 10C illustrates an exemplary personal lighting profile according to embodiments of the present invention.

FIG. 11 is a flow chart that illustrates a process for illuminating an area according to a lighting profile associated with a person or object according to embodiments of the present invention.

FIG. 21 is a screenshot of the LightWorks web app report feature showing a chart and calculation of energy savings over a given period of time according to embodiments of the present invention.

DETAILED DESCRIPTION

Figure 1:
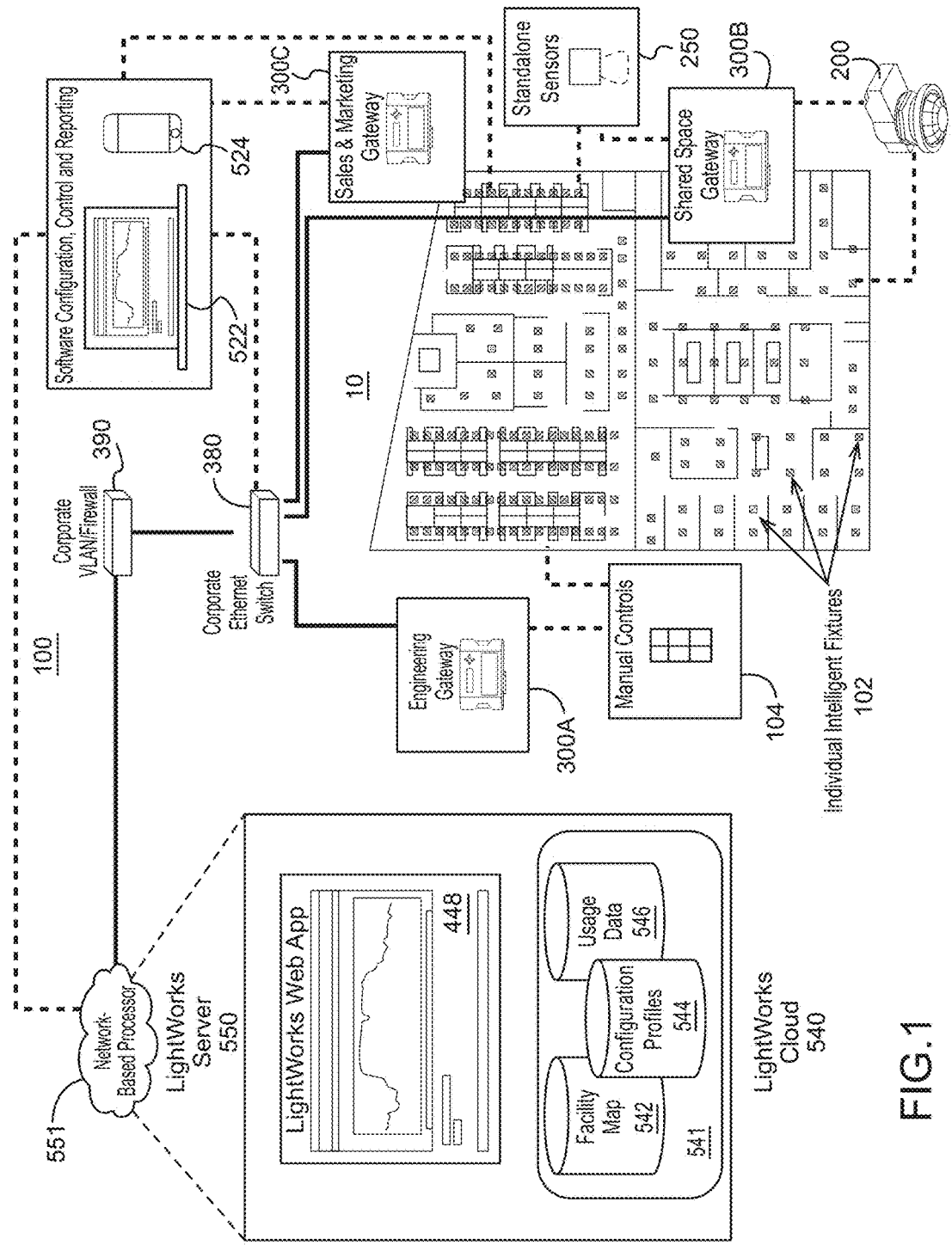
FIG. 1 illustrates an exemplary LightWorks lighting system architecture according to embodiments of the present invention.

Following below are more detailed descriptions of various concepts related to, and embodiments of, inventive systems, methods, and apparatus for providing intelligent lighting via cloud-based control and system architecture known as "LightWorks." It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Embodiments of the present invention include a cloud-based lighting control system also known as the LightWorks architecture. An exemplary LightWorks architecture lighting control system may include one or more LightWorks Gateways, each of which is coupled to the cloud (or, more specifically, a cloud-based server) via the Ethernet and/or an optional cellular radio. The LightWorks Gateways can be commissioned via the cloud using a LightWorks web app (e.g., an app running on a smartphone, tablet, laptop computer, or other portable electronic device) to control one or more lighting fixtures in a particular facility. In some cases, the LightWorks Gateways may be commissioned to maintain a strict control hierarchy, adding floors and organizations, including but not limited to: site, floor, network (gateway), zone, and node (e.g., power management unit (PMU) or digital light agent (DLA)).

Once they have been properly commissioned, the LightWorks Gateways can be used with the cloud-based control and one or more web apps to provide a flexible reporting hierarchy orthogonal to the control hierarchy ("tags"/ "groups"). The LightWorks Gateways may poll and/or record sensor data by reading corresponding sensor registers and transmitting the data at times selected to reduce or limit wireless bandwidth and/or Gateway processor load. In some cases, the Gateways may record and/or process only a small fraction of the available data to reduce power consumption, storage requirements, processor load, and transmitter bandwidth. In a normal operating loop, for example, a LightWorks Gateway may store only values from a Watt-hour odometry ("wh_odo") register, which stores a running sum of the energy used by the fixture and a running sum of energy used by the fixture in response to motion sensed within the area of the fixture. By reading the wh_odo register periodically, the system can calculate energy used per time interval. A LightWorks Gateway may also ignore certain events detected by the sensors. Nevertheless, the LightWorks Gateways may also provide the capability of doing deep register/event reading, e.g., for diagnostic purposes.

In addition, the LightWorks Gateways, cloud-based control system, and/or web apps may store and provide different configuration profiles for managing the illumination of a particular facility or environment. These profiles can be configured using a web app to provide coordinated control as locked/unlocked zones, daylight harvesting as a "target level" for lighting, and/or fixed and automatic lighting schedules. If desired, the profiles can be tailored or customized based on a particular person, object, or piece of equipment. For instance, a particular part may have a radio-frequency identification (RFID) tag with a lighting profile tailored according to the part's progress through a warehouse or along an assembly line.

Unlike other lighting systems, which use a central controller (sometimes called an Appliance) to manage one or more intelligent lighting fixtures, embodiments of the present system use one or more capable and hardened "LightWorks Gateways," which control and monitors a single lighting network while piping data directly to and from a "LightWorks Server" located in the cloud. The LightWorks Gateways and Server may also channel data and instructions to and from subscription-based web apps for reporting and configuration. LightWorks Mobile, a mobile app, enables manual control and simple profile configuration right in the palm of one's hand by interfacing directly with intelligent lighting fixtures, or via the LightWorks Gateway, LightWorks Server, and through other networks.

Compared to other lighting systems, embodiments of the present system can be simpler to install, commission, and support. Eliminating the Appliance eliminates a common failure point. The ability to commission simple installations directly from a web app makes installation and commissioning faster and less expensive. And the inherently scalable nature of a modular cloud-based architecture lets exemplary systems handle bigger jobs with ease.

Embodiments of the present system can also provide layers of resiliency not available in other lighting systems. In the event of a network communication failure or other type of disruptive event, the present system can continue to operate effectively until such time that network communication is restored or the disruptive event has been remedied. These layers of resiliency are more than just a simple redundant backup, since during normal operations, they can provide additional levels of control.

In addition, inventive embodiments shift the economics of lighting control from hardware to software, increasing service flexibility for providers and consumers. For instance, a model where software is provided as a subscription service allows services and charges tailored to the customers' desires and reduces time and effort spent supporting undesired features. For example, customers that prefer low level lighting conditions and thus use less energy would be charged less than customers desiring maximal levels of lighting. By identifying and tracking persons and objects within the lighting area, lighting charges can be allocated based on actual lighting usage. In other embodiments, lighting usage can be allocated based on predetermined lighting subscriptions.

Moving control from an appliance to the cloud also provides more technological flexibility. New features (and bug fixes) can be launched with a simple deploy, and distinct tiers of service and functionality can be built out without any need to push changes to hundreds of remote appliances.

LightWorks Architecture

FIG. 1 illustrates an exemplary LightWorks architecture 100 for a facility 10 having an engineering area, a sales and marketing area, and a shared space. The LightWorks architecture 100 includes one or more intelligent lighting fixtures 102 to provide illumination in a given environment. The intelligent lighting fixtures 102 may be controlled by one or more manual control devices 104. A digital light agent (DLA) can be integrated into the intelligent lighting fixture 102 or a standalone DLA 200 can be used to control one or more intelligent lighting fixtures via a digital control ready (DCR) bus, e.g., as disclosed in U.S. Pat. No. 8,729,833, entitled "Methods, Systems, and Apparatus for Providing Variable Illumination," which is incorporated herein by reference in its entirety.

Each intelligent lighting fixture 102 and/or standalone DLA 200 can be connected to a corresponding LightWorks Gateway 300 (e.g., an engineering gateway 300A for the engineering department, a shared space gateway 300B for shared space, or a sales and marketing gateway 300C for the sales and marketing department). The manual control devices 104 can also have respective network connection to a corresponding LightWorks Gateway 300 as well. In some embodiments, the connections between the LightWorks Gateways 300 and the intelligent lighting fixtures 102, standalone DLAs 200, standalone sensors 250, and manual control devices 104 can be wireless connections including cellular data connections (e.g., EDGE, 3G, or 4G/LTE radio connections), wireless mesh network connections (e.g., ZigBee or Thread connections), point-to-point wireless network connections (e.g., WiFi or Bluetooth connections), and combinations thereof. In other embodiments, the connections between the LightWorks Gateways 300 and the intelligent lighting fixtures 102, standalone DLAs 200, standalone sensors 250, and manual control devices 104 can be wired connections, such as Ethernet, KNX, DALI, on/off, dry contact, variable voltage, variable current, and variable resistance connections and combinations thereof. In some embodiments, the connections between the LightWorks Gateways 300 and the intelligent lighting fixtures 102, standalone DLAs 200, standalone sensors 250, and manual control devices 104 can be combinations of wireless and wired connection depending on application and any existing infrastructure.

Each LightWorks Gateway 300 can support one or more intelligent lighting fixtures 102, DLAs 200, standalone sensors 250, and/or manual control devices 104. For example, LightWorks Gateways 300 networks utilizing a 802.15.4 Zigbee stack technology can support at least 100 connections or nodes. The number of LightWorks Gateways 300 within an implementation of LightWorks architecture 100 can vary based on the facility 10 layout, number of devices (e.g., intelligent lighting fixtures 102, standalone DLAs 200, standalone sensors 250, manual control devices 104) within the lighting network, network connection speed and bandwidth, desired throughput of data to and from the LightWorks Server 550, and the number and complexity of the rules processed by the LightWorks gateway's local processor 316.

Each LightWorks gateway 300 can have one or more distinct network interfaces—for example, a downstream port that connects to the intelligent lighting fixtures 102, standalone DLAs 200, standalone sensors 250, manual control devices 104, and an upstream port that connects to a LightWorks cloud 540, which may include one or more LightWorks servers 550. A LightWorks gateway 300 may also have a single bidirectional port, such as an Ethernet port or wireless port, for multiplexed upstream and downstream communication. At the facility 10 level, the LightWorks architecture 100 can leverage existing network infrastructure to connect the LightWorks Gateways' 300 upstream ports to the internet. This existing network infrastructure might include corporate Ethernet switches 380, routers (not shown) and corporate firewalls 390 (hardware- or software-based) that connect to the internet via direct subscriber line (DSL), cable modem connections, cellular wide area networks, integrated services for digital network (ISDN) connections, and/or fiber optic modem connections. The corporate Ethernet switches 380 may also provide (wireless) network connectivity to laptops 522 and smartphones 524 running LightWorks apps to perform configuration, control, monitoring, and reporting for devices within the LightWorks architecture 100.

Figure 2:
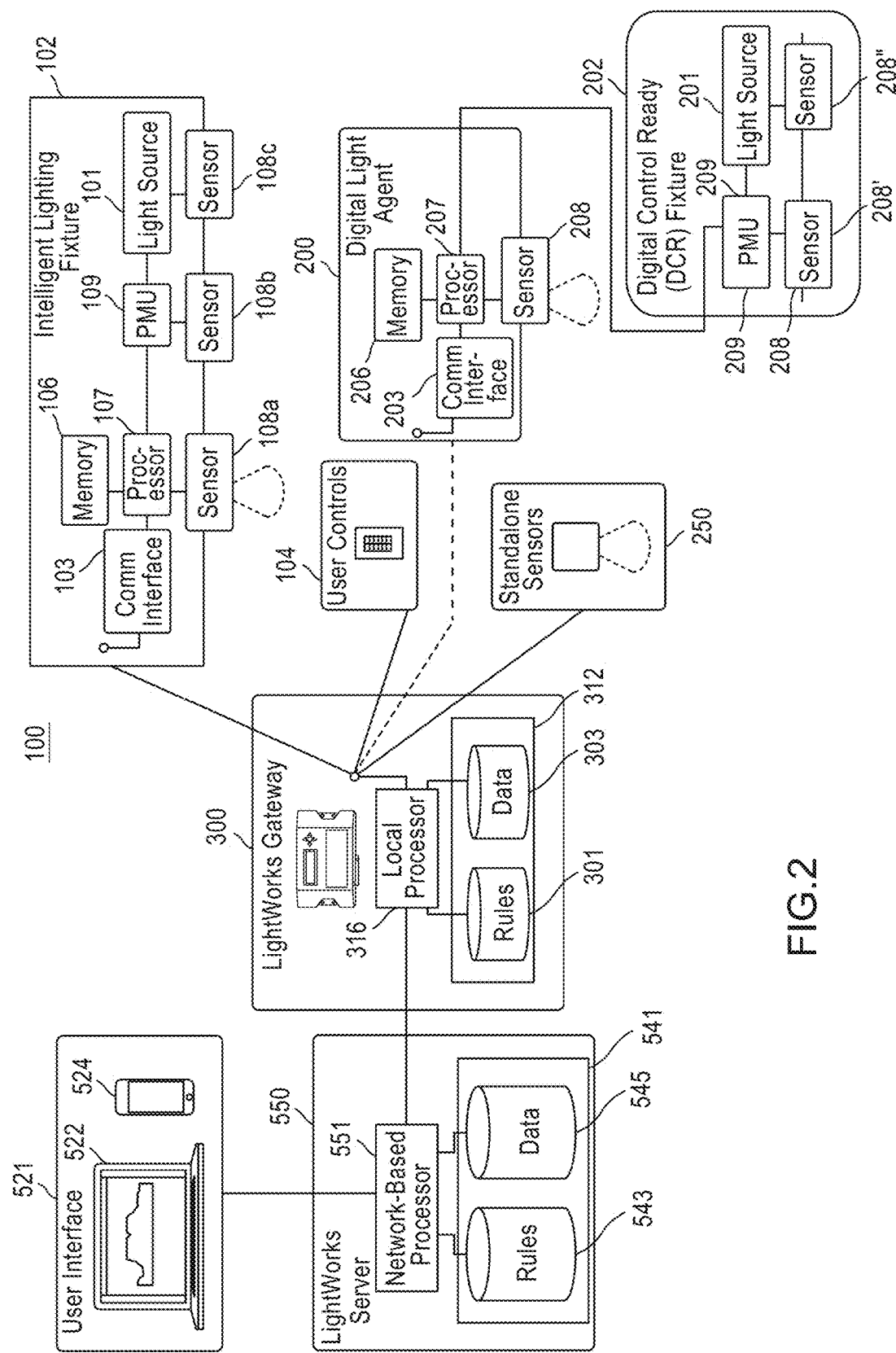
FIG. 2 illustrates the connectivity an exemplary LightWorks lighting system architecture according to embodiments of the present invention

FIG. 2 shows a component-level view of certain devices in the LightWorks architecture 100. As explained above, the architecture 100 includes one or more LightWorks Gateways 300, each of which includes a local processor 316 coupled to a memory 312 that stores programmable rule data 301, or rules, and data 303, including sensor data acquired using standalone sensors 250 and/or sensors in the Gateway 300 and other devices in the architecture 100. The rules 301 and data 303 may be shared among devices within the architecture 100 as explained in greater detail below.

In the view of FIG. 2, the gateway 300 is wirelessly coupled to a lighting fixture 102, user controls 104, a standalone sensor 250, and a DLA 200, which in turn is coupled to a digital control ready (DCR) lighting fixture 202. The lighting fixture 102 includes one or more sensors 108, including an occupancy sensor 108*a*, a power meter 108*b*, and an ambient light sensor 108*c*, that collect data about the environment illuminated by the lighting fixture 102. The occupancy sensor 108*a* detects people and moving objects and transmits corresponding occupancy data to a processor 107, which stores occupancy data in a memory 106. Similarly, the power meter 108*b* measures power/energy consumption of a light source 101 driven by a power management unit (PMU) 109, also known as a light source driver, and the ambient light sensor 108*c* detects the light intensity, color temperature, spectrum, ambient light level, etc. The processor 107 records these data in the memory 106 and transmits them to the gateway 300 via a wireless communications interface 103, such as a Zigbee interface.

The gateway 300 also receives data from and transmits instructions (rules) to the DLA 200, which has its own wireless communications interface 203. The data may acquire data with one or more integral environmental sensors 208 and/or with sensors 208' and 208" in the DCR lighting fixture 202. For example, the first sensor 208' may measure power/energy consumption of a light source 101 driven by a light source driver/PMU 209, and the second sensor 208" may detects the light intensity, color temperature, spectrum, ambient light level, etc. of the environment and/or of light emitted by a light source 201 in the DCR lighting fixture 202.

The LightWorks Cloud and LightWorks Servers

As shown in FIGS. 1 and 2, the gateway 300 also communicates with one or more remote LightWorks servers 550 in the LightWorks cloud 540. Each LightWorks server 550 can be physically located in one or more places, including but not limited to inside the facility 10; offsite at a customer's other locations (for example, at a data center owned by the customer); at a colocation facility (where the end customer owns the server hardware, which is located in a third-party data center); or in a cloud compute cluster (e.g., Amazon EC2 or Rackspace) where the server hardware itself is owned by a third party and the lighting provider leases compute time from the cloud vendor. Each LightWorks server 550 can include one or more network-based processors 551, memory (RAM), storage media 541 (e.g., hard disks, optical disks, tape drives), and a network connection. The storage media 541 may include a database structure, such as SQL, SQLite, XML, relational database, or hierarchical database, that stores facility maps 542, configuration profiles 544, and/or usage data 546. For example, the storage media 541 may store data 545 acquired by the sensors in the facility 10, including occupancy and lighting fixture energy usage data. The storage media 541 may also store programmable rule data 545, including updates to rules 301 stored in the gateway(s) 300, for transmission to the gateway(s) 300 as appropriate.

Together, the LightWorks servers 550 implement a cloud-based LightWorks Engine that includes the core programming for running the LightWorks architecture 100. In operation, the LightWorks Engine manages the rules stored in each gateway 300, including changes to those rules, as well as acquisition, dissemination, and processing of sensor data about the environment and/or devices and connections in the LightWorks architecture 100. The LightWorks Engine can run directly on a LightWorks Server 550 or via virtualization software executed on another processor. Versions of the LightWorks Engine can also reside in the LightWorks Gateway 300, the DLA-integrated intelligent lighting fixtures 102, and the standalone DLAs 200. Intelligent sensors and intelligent controls can also run versions of the LightWorks Engine.

The LightWorks cloud 540 can also include several components to run at scale, including but not limited to front-end load balancers to distribute processing among multiple network-based processors 551 and back-end controllers for storing and retrieving data from multiple storage media 541. The network-based processors 551 located in the LightWorks cloud 540 handle the intensive processing like data processing, data analysis, sensor input synthesis, rule generation and updating, etc. Network-based processors 551 store and retrieve rules 543, including configuration profiles 544, as well as multiple types of data 545 from storage media 541, including facility map data 542, and usage-related data 546. Network-based processors 551 can also access, retrieve, correlate, and process data stored in third-party databases to supplement the data resident within the LightWorks cloud 540. Accessing third-party databases reduces storage space and costs, and helps avoids potential security issues surrounding sensitive data. To aid the user in interpreting vast amounts of data, intuitive graphical user interfaces provide the user with views and models, for example, the LightWorks cloud 540 may include a LightWorks web app 448 with graphing, charting, and mapping capabilities.

The LightWorks architecture 100 features a resilient design not found in other systems. Processing capabilities and data storage are present within multiple devices at multiple levels within the LightWorks architecture 100 system. Because of this resilient and robust design, there is less risk of a complete system failure in the event of a lost connection between a remote LightWorks Server 550 and a local LightWorks Gateway 300, or between a particular LightWorks Gateway 300 and a particular intelligent lighting fixture 102.

For instance, the gateways 300 and intelligent lighting fixtures 102 include respective processors that execute rules stored in respective local memories that control the operation of the intelligent lighting fixtures 102. In the event of a lost network connection, the gateways 300 and/or intelligent lighting fixtures 102 continue to function according to the locally stored memory and sensor data acquired recently or in real-time. Additionally, the local memories can act as buffers to store usage data 546 temporarily until the data can be transmitted to the LightWorks Server 550 for archiving within storage media 541. When network connectivity is restored, the gateways 300 and/or intelligent lighting fixtures 102 resume communication with the LightWorks Server 550 and upload the buffered usage data 546 while downloading any new rules to local memories. A standalone DLA 200 connected to an intelligent lighting fixture 202 via a wired DCR bus may function similarly to an intelligent lighting fixture 102 in the event of a lost network connection.

LightWorks Gateway Hardware and Operation

Figure 3:
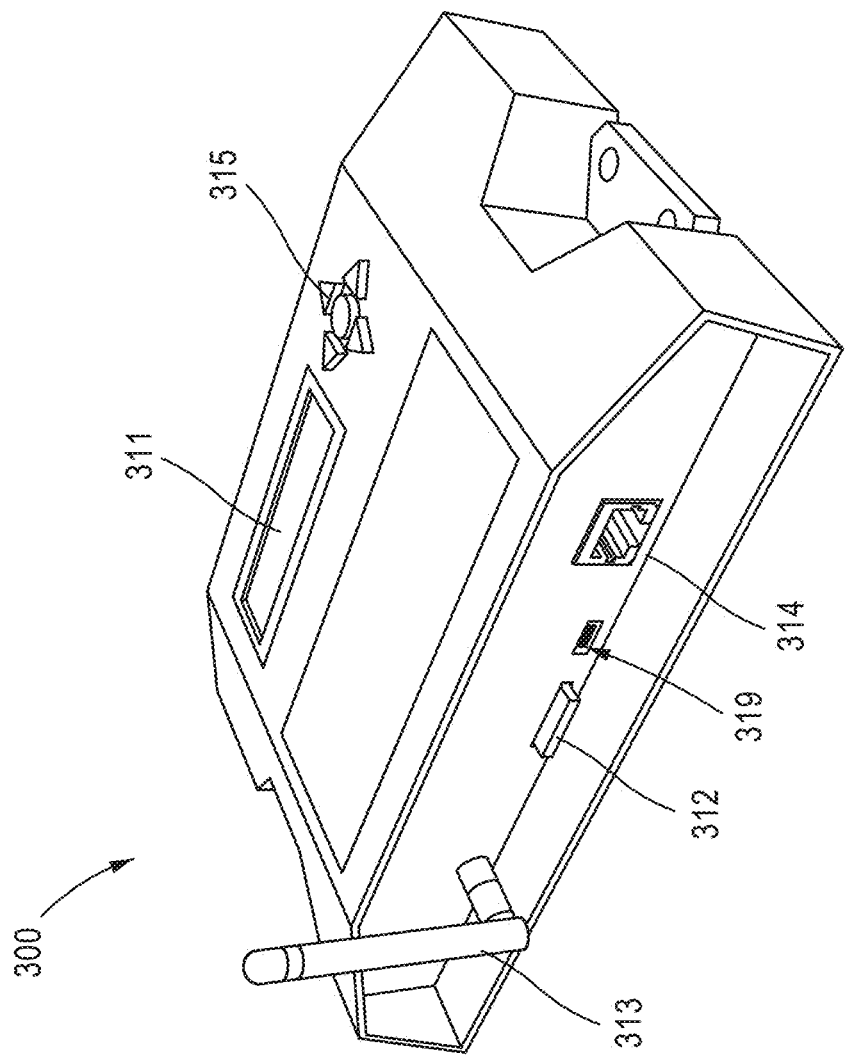
FIG. 3 shows a perspective view of an exemplary LightWorks Gateway device according to embodiments of the present invention.

FIG. 3 shows a perspective view of a LightWorks Gateway 300. In some embodiments, the LightWorks Gateway 300 coordinates and manages the communication with one or more intelligent lighting fixtures 102 or 202 grouped together. In some cases, a single LightWorks Gateway 300 coordinates and manages an entire network of intelligent lighting fixtures 102 or 202. The LightWorks Gateway 300 includes a version of the LightWorks Engine for real-time control and data collection. The LightWorks Gateway 300 transmits data quickly to a network-based processor (e.g., processor 551 in FIG. 2) and can be configured and operated through a simple user interface via an app or other network-based interface (e.g., the LightWorks web app 548 described below).

Figure 4:
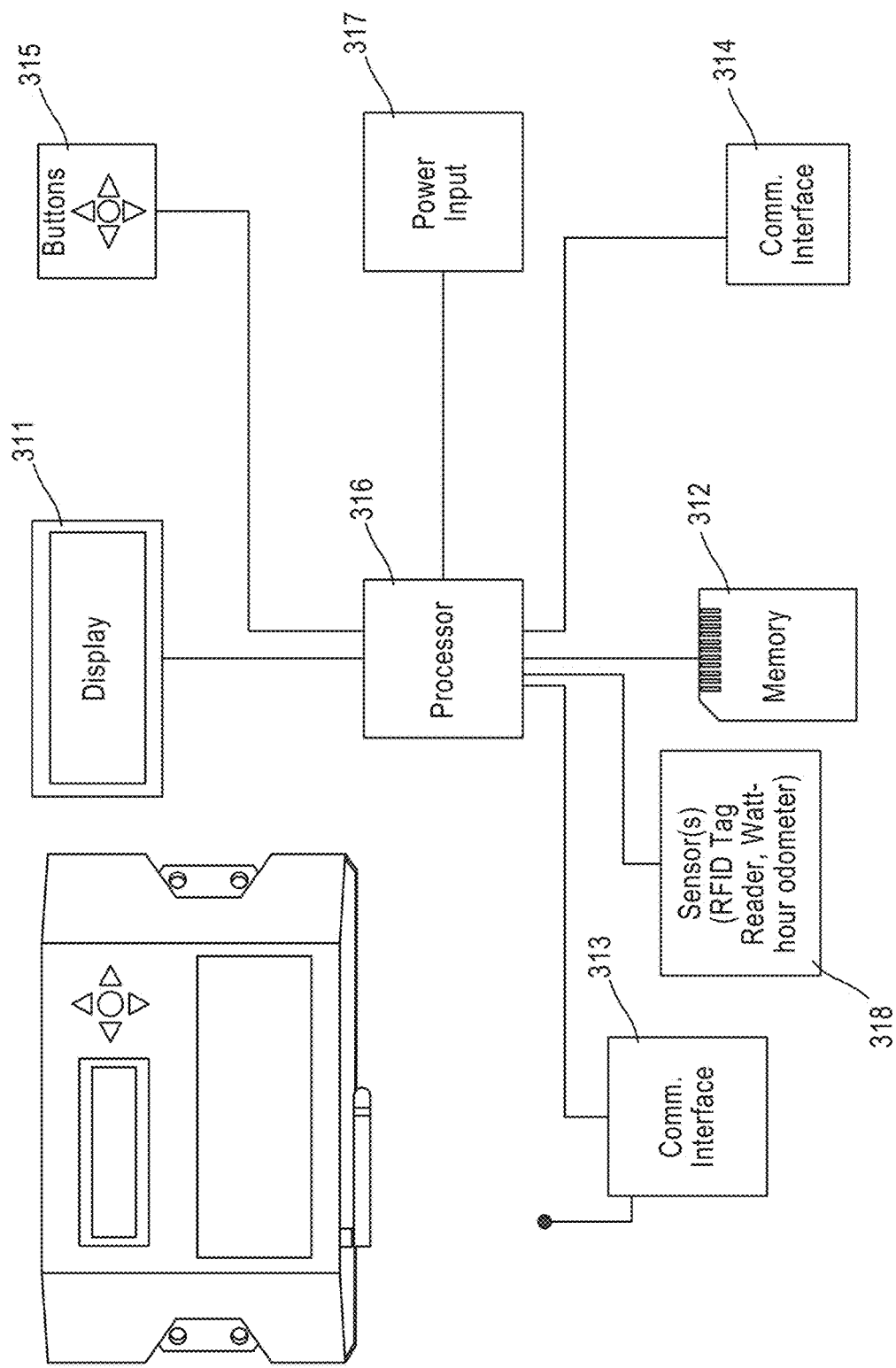
FIG. 4 illustrates a plan view (upper left) and a block diagram of the exemplary LightWorks Gateway device of FIG. 3 according to embodiments of the present invention.

FIG. 4 shows a plan view of a LightWorks Gateway 300 (upper right) and a block diagram of the gateway's components, which may include a display 311 (e.g., a liquid crystal display (LCD)), a memory 312, a (wireless) first communications interface 313, a (wired) second communications interface 314, a user input (buttons) 315, a processor 316, a power input 317, and one or more sensors 318. In some cases, the second communications interface 314 may also supply electrical power to the LightWorks Gateway 300. For example, the second communications interface 314 may include a powered via a power-over Ethernet (PoE) port (e.g., as shown in FIG. 3) and/or a powered universal serial bus (USB) port 319 that connects to a 5-20 volts DC power supply (not shown). The LightWorks Gateway 300 may also includes an optional power input 317 that connects to a 12-48 volts DC power supply (not shown).

The processor 316 may be a microprocessor that runs an operating system such as Linux and a version of the LightWorks Engine. Other components in the LightWorks Gateway 300 may also be selected for compatibility with Linux. Suitable commercially available processors include, but are not limited to the Broadcom BCM2835 SoC powering the Raspberry Pi or the Texas Instruments AM3359A in the Beaglebone Black. As shown in FIG. 4, the processor 316 is communicatively coupled to the display 311, the memory 312, wireless module 313, Ethernet port 314, and one or more input buttons 315.

The memory 312 may include both volatile memory, such as SRAM, DRAM, Z-RAM, TTRAM, A-RAM and ETA RAM, and non-volatile memory, such as read-only memory, flash memory (e.g., SD, MMC, xD, Memory Stick, RS-MMC, miniSD and microSD, and Intelligent Stick), magnetic storage devices (e.g., hard disks, floppy discs and magnetic tape), optical discs, FeRAM, CBRAM, PRAM, SONOS, RRAM, Racetrack memory, NRAM and Millipede. The memory 312 can be sized as desired; it may hold approximately one month of usage data 546 in the event that the upstream network connection to the LightWorks Server 550 is interrupted. Compression algorithms can be used to further increase the efficiency with which data is stored in the memory 312.

The sensor 318 may include a variety of sensing elements, including but not limited to radio-frequency identification (RFID) tag sensors, occupancy sensors, ambient light sensors or other photosensors, an imaging sensors, temperature sensors, microphones, pressure sensors, air quality sensors, and wireless signal sensors. The data acquired by the sensor 318 can include, but its not limited to measurements of parameters associated with the environment, such as: an occupancy of the environment, an ambient light level of the environment, a spectrum of illumination of the environment, a temperature of the environment, a sound in the environment, an air quality of the environment, an amplitude of a radio-frequency wave propagating in the environment, a location of an object or a person in the environment, or an identification of the object or the person in the environment. For instance, the sensor 318 may include one or more photosensitive elements that measure the luminous flux emitted by one or more lighting fixtures, the illuminance delivered to a specified surface in the environment, a correlated color temperature of the light emitted by the lighting fixture(s), a spectral power distribution of the light emitted by the lighting fixture(s), a color of the light emitted by the lighting fixture(s), an illumination radius of the lighting fixture(s), and/or a timing parameter related to a change in lighting emitted by the lighting fixture(s). The sensor 318 may also measure power consumption and/or energy usage of the gateway itself and/or by other components of the LightWorks architecture 100, including one or more of the lighting fixtures.

In some embodiments, the first communications interface 313 can include one or more wireless modules including cellular data module (e.g., EDGE, 3G, or 4G/LTE radio), wireless mesh network module (e.g., ZigBee or Thread), point-to-point wireless network module (e.g., WiFi or Bluetooth), and combinations thereof. The LightWorks Gateway can be configured to use a Telegesis Ember module as communication interface 313 to communicate wirelessly with intelligent lighting fixtures 102 and/or standalone DLAs 200. In other embodiments, first communications interface 313 can include one or more wired connections such as TCP/IP, Ethernet, KNX, DALI, on/off, dry contact, variable voltage, variable current, variable resistance and combinations thereof.

Similarly, the second communications interface 314 can include one or more wired connections such as Ethernet, KNX, DALI, on/off, dry contact, variable voltage, variable current, variable resistance and combinations thereof. It can also be configured to receive electrical power as described above.

In some embodiments, the connections between the LightWorks Gateways 300 and the intelligent lighting fixtures 102, standalone DLAs 200, standalone sensors 250, and manual control devices 104 can be combinations of wireless and wired connection depending on application and any existing infrastructure. The LightWorks Gateway 300 can be plugged in directly to a corporate network (e.g., via the second communication interface 314), assigned an IP via DHCP, and tunneled out to the LightWorks cloud 540 and LightWorks Server 550 by punching through virtual private networks (VPN's), network address translations (NAT's), virtual local area networks (VLAN's), and firewalls on an outbound HTTP, HTTPS, websocket, or other standard protocol connection. (The LightWorks Gateway 300 may also have a minimal web server running on port 80 for basic configuration and status information.) If data transmission via existing network infrastructure using one of these standard protocols is impractical, the LightWorks Gateway 300 may include or be coupled to an optional cellular modem for network communication to the LightWorks cloud 540 and LightWorks Server 550.

As shown in FIG. 3, the "front" face of the LightWorks Gateway 300 includes a display 311 (e.g., a 16×2 character alphanumeric LCD) and one or more input buttons 315, which may be arranged in a 5-key button pad. Together, the display 311 and the input buttons 315 provide a user interface for initial setup (commissioning), diagnostic messages, and troubleshooting. For example, the display 311 can indicate the health of the LightWorks architecture 100 system including the network status and operability of the connected devices, and the buttons 315 can be used to navigate through screens and menus shown on the display 311. Those of skill in art will readily appreciate that the gateway 300 may include other user interfaces, such as touchscreens and alphanumeric keypads, in addition to or instead of the display 311 and buttons 315 shown in FIG. 3.

In some embodiments, the LightWorks Gateway 300 can boot from, and store data on, the memory 312. During boot, the processor 316 loads a version of the LightRules Engine stored in memory 312. Processor 316 is communicatively coupled to communication interface 313 and communications interface 314 to send and receive data. Communication interface 313 receives data 303 including environmental data and/or operational data related to the at least one intelligent lighting fixture in the environment. Communication interface 313 also receives data 303 including data related to an object and/or a person within the environment. Data may be received from an intelligent lighting fixture 102, a manual user control 104, a standalone sensor 250, standalone DLA 200, and/or combinations thereof. Processor 316 can store data 303 into memory 312. Processor 316 can retrieve rules 317 from memory 312 and transmit them to an intelligent device, such as an intelligent lighting fixture 102 or a DLA 200, within the network via communication interface 313. Memory 312 may include a database structure, such as a SQLite database, that stores usage data 546, facility maps 542, and/or configuration profiles 544 similar to storage media 541.

Processor 316 can also be operably coupled to communication interface 314 to receive direct current (DC) power. In other embodiments, processor 316 is operable coupled to power input 317 to receive DC power. Data 303 stored in memory 312 can be retrieved by processor 316 and transmitted to the LightWorks server 550 via communication interface 314. In some embodiments, processor 316 causes data 303 received by communication interface 313 to be transmitted to the LightWorks server 550 via communication interface 314 without storage into memory 312.

Unlike other lighting systems, which collect data continuously and/or at high rates, embodiments of the LightWorks architecture 100 may collect data intermittently and/or at relatively low rates. The gateway 300 may also record when it received data from each lighting fixture/DLA for computation of changes over time (e.g., average power consumption since the last Watt-hour odometer reading). The LightWorks architecture 100 may not gather complete event log data and can be configured to query and store data from only a limited number of registers within the memory 312. In some embodiments, the LightWorks architecture 100 may provide granular controls (e.g., via a LightWorks app or controls on the LightWorks Gateways) for which data is gathered from each node or connection and how often that data is collected. In other embodiments, only changes to a system state or sensor reading may be logged into memory.

Some of this data may be accumulated within each lighting fixture or DLA's local memory and transmitted to the gateway 300 intermittently for storage in memory 312 and eventual transmission to the cloud. The gateway 300 may also query the sensors in the lighting fixture(s) or DLA(s) for instantaneous readings and store those readings in memory 312. If desired, these real-time measurements can be buffered or used to measure maximum, minimum, and/or average values since the last reading. Data accumulated within each lighting fixture or DLA's local memory includes, but is not limited to: Watt hours (on a Watt-hour odometer), fixture power up time, fixture active time, fixture inactive time, and number of sensor events (e.g., occupancy events, temperature-related events (peak temperature over preceding time period), etc.). And instantaneous measurements include, but are not limited to: maximum and/or minimum power consumption by a lighting fixture over a given period of time, a historical log of energy consumption by a lighting fixture, a power factor associated with a lighting fixture, an input voltage to a lighting fixture, total harmonic distortion of power received by a lighting fixture, and instantaneous sensor data from sensors themselves (e.g., data from any of the sensors shown in FIG. 7)

For example, the gateway 300 may store energy usage data collected from the Watt-hour odometer ("wh_odo") registers in the intelligent lighting fixtures 102 and/or the DLAs 200 in a Watt-hour odometry data table implemented in the memory 312. In operation, the gateway 300 may poll the lighting fixtures 102 and/or the DLAs 200, e.g., at regular intervals, irregular intervals, and/or in response to particular events, for energy usage data. The lighting fixtures 102 and/or the DLAs 200 may also supply energy usage data to the gateway 300 without prompting by the gateway 300, e.g., in accordance with a rule or other programming. The gateway 300 stores the energy data in the wh_odo data table, possibly with indications of the energy usage data's source (e.g., lighting fixture no. 1) and/or the time at which the energy usage data was read from the fixture (e.g., 2400 GMT on Jan. 23, 2014).

The gateway 300 stores the time-stamped watt-hour odometer values read out of each fixture in its local memory 312 and transmits these data to the cloud-based LightWorks server 550 on demand, at predetermined intervals, when lulls appear in network traffic, etc. The LightWorks server 550 processes this data to estimate one or more of the following pieces of information: total energy consumed by the lighting fixture(s) over a given period of time, instantaneous power consumption by one or more lighting fixture(s), average power consumption by one or more lighting fixture(s) over the given period of time, maximum and/or minimum power consumption by the lighting fixture(s) over the given period of time, and a historical log of energy consumption by the lighting fixture(s). The server 550 may also estimate a power factor associated with the lighting fixture(s), an input voltage to the lighting fixture(s), and/or total harmonic distortion of power received by the lighting fixture(s) from the energy usage data and/or from instantaneous sensor readings acquired from the lighting fixture(s) and DLA(s) and stored in the gateway memory 312.

The LightWorks Gateway 300 may also store information about the network it is managing, including lights, zones, rules-based lighting profiles, schedules, and so forth, in the local memory 312. This information can be managed in the LightWorks cloud 540, with changes automatically downloaded to the LightWorks Gateway 300 as part of a cloud synchronization process. The cloud synchronization process uploads new data 303 to the LightWorks cloud 540 and downloads rule changes and/or new rules, including changes to lighting profiles, to the memory 312 of the LightWorks Gateway 310. These rules changes and new rules may be based on an analysis of the energy usage or sensor data collected by the LightWorks Gateway 310. In addition to the batch data upload process, a RESTful application programming interface (API) handles real-time tasks like manually switching profiles. Calls to this API may be authenticated against the LightRules web app 548. LightWorks server 550 can push firmware updates to LightWorks Gateway 300 (via the (wired) second communication interface 314, e.g., Ethernet port) and intelligent lighting fixtures 102 and standalone DLAs 200 (via the (wireless) first communication interface 313).

Intelligent Lighting Fixtures and Digital Light Agents

Figure 5:
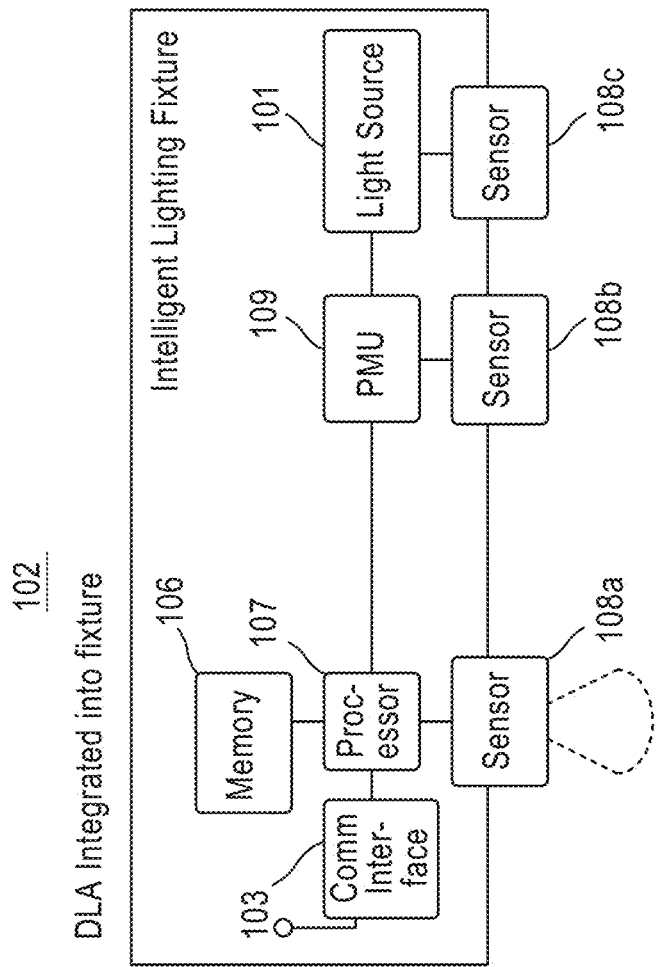
FIG. 5 illustrates the connectivity and components of an intelligent lighting fixture including a Digital Light Agent (DLA) according to embodiments of the present invention.

The LightWorks architecture 100 is compatible with a variety of different lighting fixtures and different configurations of intelligent lighting fixtures. For example, FIG. 5 is a block diagram of the intelligent lighting fixture 102 of FIGS. 1 and 2. This intelligent lighting fixture 102 may include the functionality and/or the components of a DLA, such as a communication interface 103, a memory 106, a processor 107, and one or more sensors 108a-108c (collectively, sensors 108) that measure operational and environmental data related to the DLA-integrated intelligent lighting fixture 102.

More specifically, the sensor 108a may be an occupancy sensor that senses and possibly locates a person or object within the environment illuminated by the lighting fixture. In some cases, the sensor 108a is a passive infrared sensor that detects a heat signature associated with the person or object. Data from the passive infrared sensor, including any thermal gradient information across different thermal sensing elements within the sensor, can be used to distinguish between people and different types of objects, to locate people/objects, and to track motion (e.g., based on temporal variation in thermal signatures).

The sensor 108a may also include an imaging sensor that acquires biometric imagery, including face images, of a person in its field of view and transmits the biometric imagery to the processor 107, which identifies the person using recognition software. The processor 107 may also locate the person within the imagery (and hence within the environment). Alternatively, or in addition, the sensor 108a may detect wireless signals emitted by an object, such as a cell phone or other wireless transceiver, and determine the object's identity and location based on the wireless signals. For instance, the sensor 108a may include a Bluetooth sniffer or other beacon-sensing device that senses and decodes an beacon signal emitted by an electronic device. The sensor 108a may also measure the received signal strength of a signal emitted by the electronic device for triangulation of the electronic device's position. Or the sensor 108a can interrogate the electronic device, e.g., with an ultrasonic signal or an RFID tag interrogation signal. The processor 107 may store a record of occupancy detection events (e.g., total number) in the memory 106; it may also notify the gateway 300 of each detection event and apply an appropriate lighting profile as described below with respect to FIGS. 11 and 12.

Similarly, sensor 108b may include a temperature meter, voltage meter, current meter, resistance meter, and/or power meter for measuring power supplied by the LED driver/Power Management Unit (PMU) 109 to the dimmable light source 101, which may include one or more LEDs. The processor 107 may store energy usage data from the sensor 108b in a Watt-hour odometer implemented as a register in the memory 106. This Watt-hour odometer may represent the sum total of Watt-hours consumed by the fixture 102 since the register was last cleared. Data from the sensor 108b may also be used to determine and record the elapsed time that the fixture has been powered on, active, and inactive.

Sensor 108c can include a color sensor, photodetector, spectrophotometer, ambient light level sensor, temperature sensor, imaging sensor, and combinations thereof, that measures the operational and environmental data related to the light source 101 of the DLA integrated intelligent lighting fixture 102. The lighting fixture 102 can use data acquired by the sensor 108c to vary the intensity, correlated color temperature, etc. of the output in order to provide the desired illumination at the desired energy consumption levels.

Figure 6:
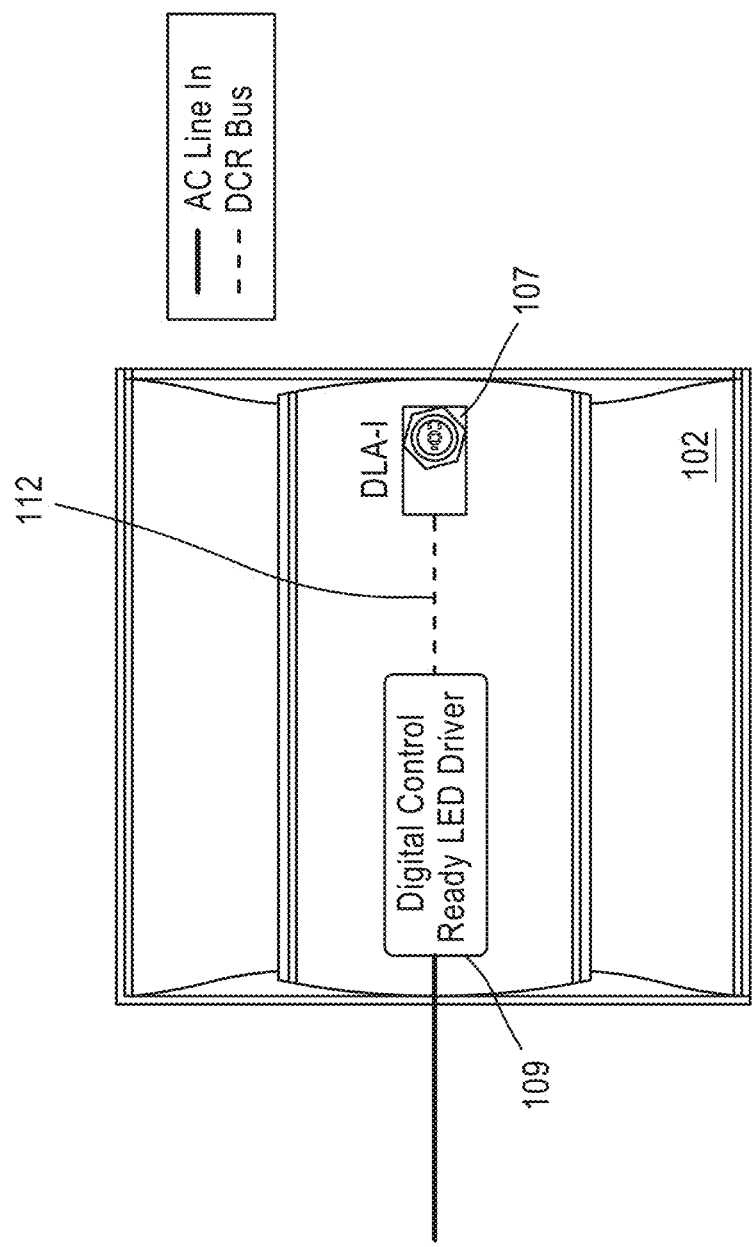
FIG. 6 illustrates an intelligent lighting fixture (troffer) including a DLA and Digital Control Ready (DCR) driver according to embodiments of the present invention.

FIG. 6 is a plan view of a troffer-type intelligent lighting fixture 102 with integrated DLA (indicated by reference numeral 107) connected the LED driver 109 via a DCR bus 112. As understood by those of skill in the art, a troffer is a rectangular light fixture that fits into a modular dropped ceiling grid (e.g., with dimensions of 2' by 2' or 2' by 4'). Troffers are typically recessed sitting above the ceiling grid, but can also be made in surface mount boxes. Troffers are commonly used in commercial office spaces, schools, hospitals, lab facilities, etc.

Figure 7:
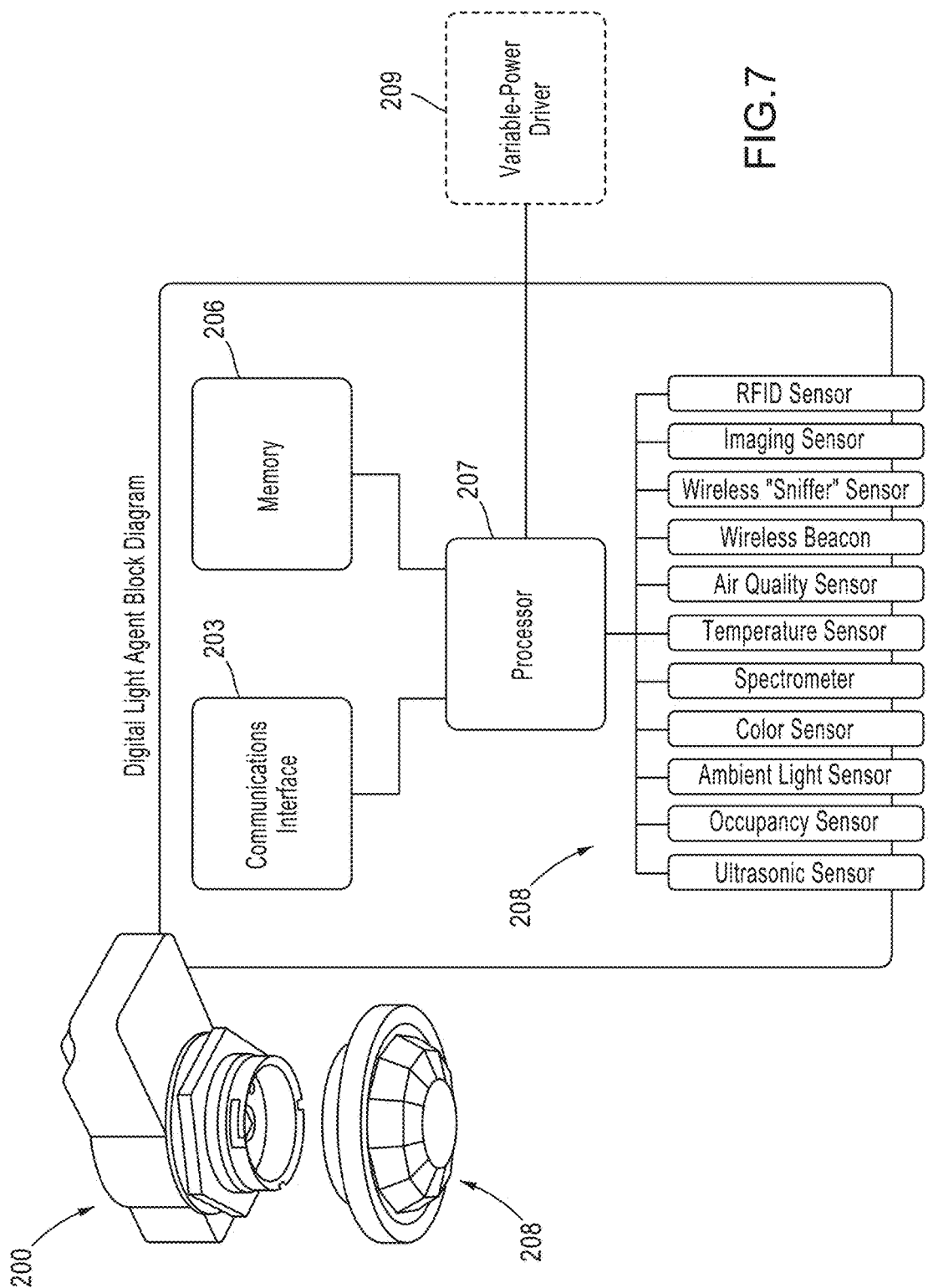
FIG. 7 illustrates a perspective view of an exemplary stand-alone DLA (upper left) and a block diagram of the exemplary standalone DLA according to embodiments of the present invention.
Figure 8:
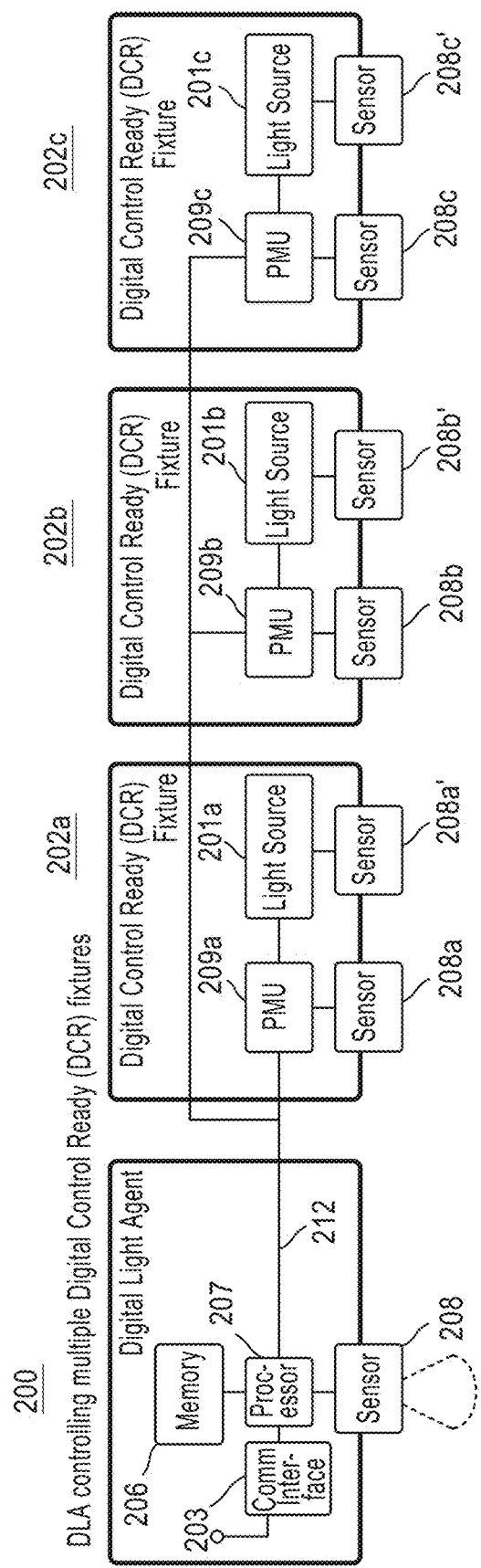
FIG. 8 illustrates a stand-alone DLA connected to and controlling several DCR lighting fixtures (troffers) according to embodiments of the present invention.

The LightWorks architecture 100 is compatible with standalone DLAs 200 that control one or more DCR lighting fixtures 202a-202f (collectively, DCR lighting fixtures 202) over a DCR bus as shown in FIGS. 7-9. As shown in FIG. 7, the standalone DLA 200 includes at least one communication interface 203, a memory 206, a processor 207, and one or more sensors 208a-208c (collectively, sensors 208) to sense environmental conditions, such as occupancy, ambient light level, and temperature, and device status conditions, such as fixture energy usage. In some cases, sensors 208a, 208b, and 208c may be identical or equivalent to sensors 108a, 108b, and 108c, respectively, as described above with respect to FIGS. 5 and 6. For instance, These sensors 208 can include a temperature meter, voltage meter, current meter, resistance meter, power meter, and combinations thereof, to measure the operational and environmental data related to the PMU of the DCR lighting fixtures 202. They can also include a color sensor, a photodetector, a spectrophotometer, an ambient light level sensor, a temperature sensor, and/or an imaging sensor to measure the operational and environmental data related to the light source 201 of the DCR lighting fixtures 202. Sensors 208 can also include ultrasonic sensors, occupancy (e.g., passive infrared) sensors, air quality sensors, wireless beacon sensors, wireless sniffers, RFID tag readers, and the like to sense people, parts, and equipment in the environment illuminated and/or monitored by the LightWorks architecture 100.

In operation, the DLA 200 transmits instructions to and receives data, including energy usage data and occupancy data, from the lighting fixtures 202 via the DCR bus 212 as shown in FIGS. 8 and 9. The lighting fixtures 202 may coupled together in series as shown in FIG. 8 or in parallel as shown in FIG. 9. The DLA 200 also receives DC power from a lighting fixture 202, via a power input 216, as shown in FIG. 9. This DC power may be converted from AC power received by the lighting fixture 202 via an AC line input 214.

Manual Control Devices

The LightWorks architecture 100 may also include or be coupled to one or more manual control devices 104, including light switches, dimmers, and other interfaces. For example, manual control devices 104 include wall switches and keypads that can be used to adjust the illumination level, illumination direction, and/or color temperature of the light emitted by the intelligent lighting fixtures 102 or DCR lighting fixtures 202. These manual control devices 104 may be connected to the LightWorks Gateway 300 via a wired or wireless connection. For example, manual control devices 104 can be a resident node on a wireless lighting network, or can communicate directly with a DLA sensor, for example, via an infrared signal. Manual control devices 104 can be programmed or wired to temporarily override the rules running in the gateways 300, DLAs 200, and intelligent lighting fixtures 102 to satisfy the immediate desires of the user, e.g., for a predetermined period or until the user relinquishes control. In addition to providing control functions, manual control devices 104 can be used to configure and/or commission the gateways 300, intelligent lighting fixtures 102, and/or DLAs 200.

Lighting Profiles for People, Parts, and Equipment

In some embodiments, the LightWorks architecture 100 can create, distribute, enforce, and update lighting rules that save energy by harvesting daylight, selecting efficient light sources, and/or reducing lighting levels in unoccupied areas. These rules may also reduce system downtime and repair costs by using the light sources (LEDs) sparingly and scheduling maintenance proactively and prospectively. These rules may be tailored to a particular lighting fixture or to a particular zone illuminated by the LightWorks architecture. For instance, a rule for a particular light fixture might include the following parameters:

Light ID: 0400DE13

Active Light Level (Occupancy Detected): 85%

Inactive Light Level (No Occupancy Detected): 15%

Sensor Delay (Sensor Inactive Period After Each Occupancy Detection): 60 seconds Daylight Harvesting target: 50 ft-cd This rule is in effect: Monday through Friday, 8 am to 5 pm Although this reduces wasteful energy consumption, it doesn't offer any opportunity for personalization or customization.

Fortunately, the LightWorks architecture 100 also enables users to create rules (or preferences) that can also be tailored to provide predetermined lighting levels or lighting behaviors based on a specific object or person in a given area illuminated by an intelligent lighting fixture. These rules may be keyed to detection of the object or person within the illuminated area and can be based on identifying information about the object or person and location data acquired by sensors in the LightWorks architecture 100. For example, a rule set for a particular person—John Q. Public—might specify:

My ID: John Q. Public

My preferred illumination at my desk: 50 ft-cd, 4200K, 5 ft radius

My preferred light level in the rest of the office: 20 ft-cd, 3000K, 50 ft radius My preferred light level in the kitchen: 100 ft-cd, 5000K, infinite radius Parameters that can be specified in or by a lighting profile include, but are not limited to: luminous flux, illuminance delivered to a specified surface, correlated color temperature, spectral power distribution, color of light, illumination radius, one or more timing parameters related to a change in lighting (e.g., sensor timeout), power consumption, and energy usage.

This rule set, also known as lighting profiles or preference rules, act like meta-rules for the light fixtures. Processors in the gateways 300, DLAs 200, and/or intelligent lighting fixtures 102 decompose these preference rules into specific instructions for the lights. In order to do this, the available processor(s) keep track of the available light sources, their locations, and their capabilities (e.g., light output, correlated color temperature (CCT), dimmability, color control, etc.). The available processor(s) also locate, identify, and track other people and/or objects are in the environment, as well as lighting profiles associated with those people and/or objects.

For instance, the LightWorks architecture 100 may include one or more RFID tag readers distributed throughout a warehouse or assembly line, possibly in the gateways 300, the lighting fixtures 102, the DLAs 200, or the standalone sensors 250. These RFID tag readers may track RFID tags on parts and equipment (e.g., forklifts and pallet jacks) within the warehouse. Each RFID tag may include identifying information, such as object type, object part number, and/or object serial number that can be used to locate a profile associated with the part in the rules stored either locally in the gateway memory or on the LightWorks server.

For instance, FIGS. 10A and 10B illustrate lighting profiles for a fork lift and a pallet jack, respectively, for use in a warehouse. The fork lift and the pallet jack each have a unique RFID tag that can be interrogated wirelessly using an RFID tag reader on a gateway or other device in the LightWorks architecture. The RFID tag may store lighting profile information or simply identifying information that can be read by the RFID tag and used to query a lighting profile database stored in the gateway's memory, the fixture or DLA memory, or in the LightWorks cloud for an associated lighting profile. Each lighting profile includes identifying information about the associated part (Object ID), as well as illumination levels at different distances (radii). In this case, the illumination levels are higher over longer distances for the fork lift than for the pallet jack because the fork lift can move at higher speed (and thus cover ground more quickly) than the pallet jack. The lighting fixtures provide the illumination levels according to the lighting profiles and in response to detection and movement of the fork lift and the pallet jack.

The lighting profiles can also be tailored to individuals, e.g., as shown in FIG. 10C and explained above. Personal lighting profiles may contain parameters related to location, time of day, presence of other people, activity level lighting intensity, color, tone, angle, area, frequency, inactivity period, and so on. An individual user can specify the lighting parameters based on his or her personal preferences. For example, an older user may want or need more light to see adequately. Other users may feel more comfortable in well-lit places, and can specify high levels of lighting for an extended lighting area. Still other people may desire warmer or cooler color tones of light that is both pleasing to their eyes, as well as complementary to their appearance.

Daylight harvesting, coordinated control (CC), and other energy-saving and safety features can be incorporated directly into profiles in LightWorks. Each profile can have an "Active Level" and an "Inactive Level" expressed as a fixed percentage of full output, e.g., as shown in FIG. 10C. A user can define the active and inactive levels in one of at least three ways:

1. by specifying a fixed percentage of full output;
2. by finding their desired light level with a slider then saying "hold this brightness when active" (interactive task tuning); or 3. by specifying a ft-cd or lux value (this may involve light meter calibration).

In scenarios 2 and 3, an ambient light sensor may measure the ambient light level to account for the effect of Daylight Harvesting on the light level experienced by the user.

LightWorks can also integrate coordinated control (CC) into profiles. For a given profile, zones are either "locked" (i.e., CC enabled, so all fixtures are in the same active or inactive state at all times) or "unlocked" (i.e., CC disabled, so fixtures are free to be active or inactive depending on their own sensors). The "CC Master" state of a node is not necessarily configurable as part of the profile, thus allowing a facility manager to override personal lighting profiles for safety or efficiency reasons. In some cases, for example, the CC Master state may override personal lighting profiles in response to emergency conditions (e.g., a smoke alarm or 911 call). In other cases, the CC Master may provide high illumination in a highly trafficked zone, regardless of the profiles of people and objects moving through the zone.

Sensors communicatively coupled to the intelligent lighting fixtures receive signals which are used to locate and identify the object or person, and illumination is provided by intelligent lighting fixtures conforming to predetermined rules. This system of object specific rules can provide for improved safety, increased productivity, and reduced fatigue. This system of person specific rules can provide for improved safety, increased productivity, reduced fatigue, and increased personal satisfaction.

Figure 12:
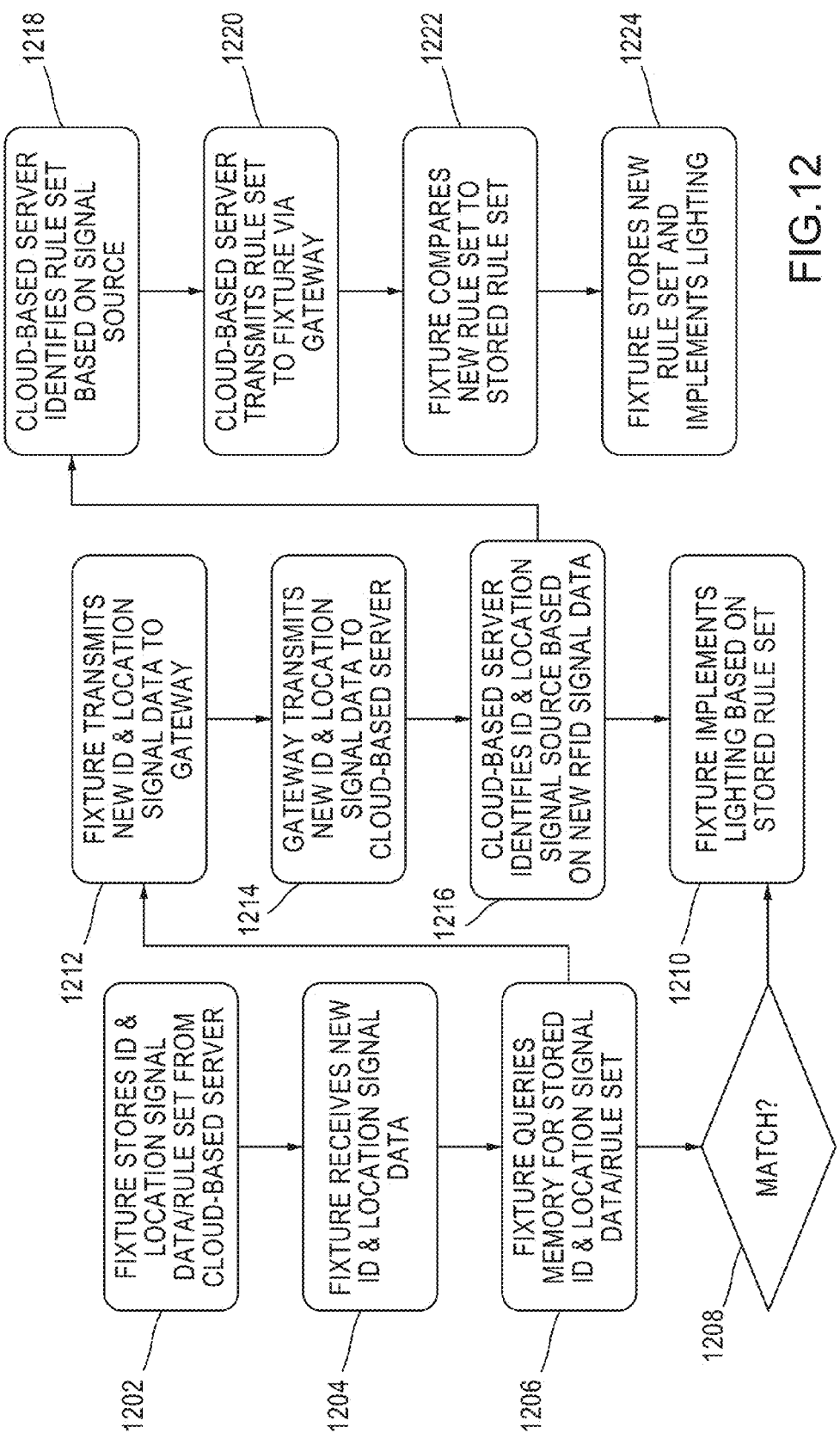
FIG. 12 is a flow chart that illustrates a process for updating a lighting profile associated with a person or object and illuminating an area per the updated lighting profile according to embodiments of the present invention.

FIGS. 11 and 12 are flowcharts that illustrate how the LightWorks architecture employs lighting profiles for providing customized lighting. In the process shown in FIG. 11, a sensor on a lighting fixture, DLA, or other device detects an object or person (step 1102). In some cases, the sensor may also detect the person's smart phone, tablet, laptop, or other device using ultrasonic interrogation of a smartphone, wireless interrogation of a passive or active RFID tag, infrared communication, triangulation based on cellular or WiFi signals, global positioning system (GPS) data from a GPS transceiver, or beacon signal. In other cases, the sensor may acquire visible or thermal imagery of the object or person, e.g., from an imaging sensor or even a passive infrared (PIR) sensor. In other cases, the lighting network may receive an indication of the person or object's presence from a separate data source, such as a security system that uses magnetic badges or biometric identification to admit authorized individuals through doors or entrances in the facility.

The lighting fixture or other device transmits this data representative of the person or object to the gateway (step 1104), which in turn transmits the data to a server in the LightWorks cloud (step 1106). This data includes information about the person or object's identity and about the person or object's location within the environment. The location data may be derived from the sensor measurements and/or other data sources. For instance, image data or wireless beacon signals can be used to locate a person or object with respect to an imaging sensor or wireless beacon receiver, respectively. GPS or inertial measurement unit signals can also be used to locate an object within the environment. Alternatively, one or more of the processors in the lighting fixture, DLA, and gateway may use readings from multiple sensors to locate the person or object using triangulation. These readings may include, but are not limited to, Received Signal Strength Indications (RSSIs) based on cellular or WiFi signal strength. The lighting network may also derive location information from other data sources, including security system (e.g., from badge swipes at portals within the environment) or GPS.

In step 1108, the cloud-based server identifies the person or object; in response to this identification, the cloud-based server identifies a rule set (lighting profile) associated with the person or object (step 1110). The cloud-based server transmits this rule set (lighting profile) to the gateway (step 1112), which in turn pushes the rule set out to the fixtures and DLAs responsible for illuminating the zone or area in which the person or object was detected. The fixtures illuminate the zone or area according to the rule set associated with the person or object and in accordance with the person or object's location, the sensed environmental and operating parameters, and global rules set by the facility operator and/or the lighting system owner.

FIG. 12 illustrates a process by which the LightWorks architecture updates a locally stored lighting profile. In this process, the fixture or an associated gateway or DLA stores light rules, including lighting profiles for frequently and/or recently detected objects and people, in local memory (step 1202). These rules may be pre-programmed, e.g., at the factory or during commissioning, or previously distributed by the LightWorks cloud. A sensor detects and identifies a person or object within the environment as described above with respect to FIG. 11 (step 1204), triggering a query by the fixture, gateway, or DLA of the rules (profiles) stored in the local memory (step 1206). A local processor determines if the local memory stores the corresponding lighting profile (step 1208) and, if so, the fixture implements the lighting profile subject to the person or object's location, any pertinent global rules, and sensed environmental and operating parameters (step 1210).

Regardless of whether the local memory stores the corresponding lighting profile, the fixture also transmits the acquired data about the object or person to a cloud-based server via the gateway (steps 1212 and 1214) as well as any pertinent new information, including manual override data acquired via the manual device controls. As in FIG. 11, the cloud-based server identifies the person or object (step 1216) and the associated lighting profile (step 1218), which may be different than the locally stored lighting profile, e.g., because the user has updated the lighting profile. The cloud-based server transmits the updated lighting profile to the fixture or affiliated DLA via the gateway (step 1220). A local processor in the fixture or affiliated DLA compares the lighting profile from the cloud-based server to the locally stored profile (step 1222), updates the locally stored profile accordingly, and implements the updated, locally stored profile based on the person or object's location, any pertinent global rules, and sensed environmental and operating parameters (step 1224).

In some cases, the user may update his or her lighting profile on the fly using a phone- or tablet-based app or web-based interface that pushes changes to the fixtures and DLAs via the cloud-based processor. In other cases, the phone- or tablet-based app or web-based interface communicates directly with the local gateway, fixtures, and/or DLAs (e.g., if there is limited wide-area network connectivity but strong local-area network connectivity as determined by the phone, tablet, or computer executing the app or other interface software).

Arbitrating Among Lighting Profiles

Figure 13A:
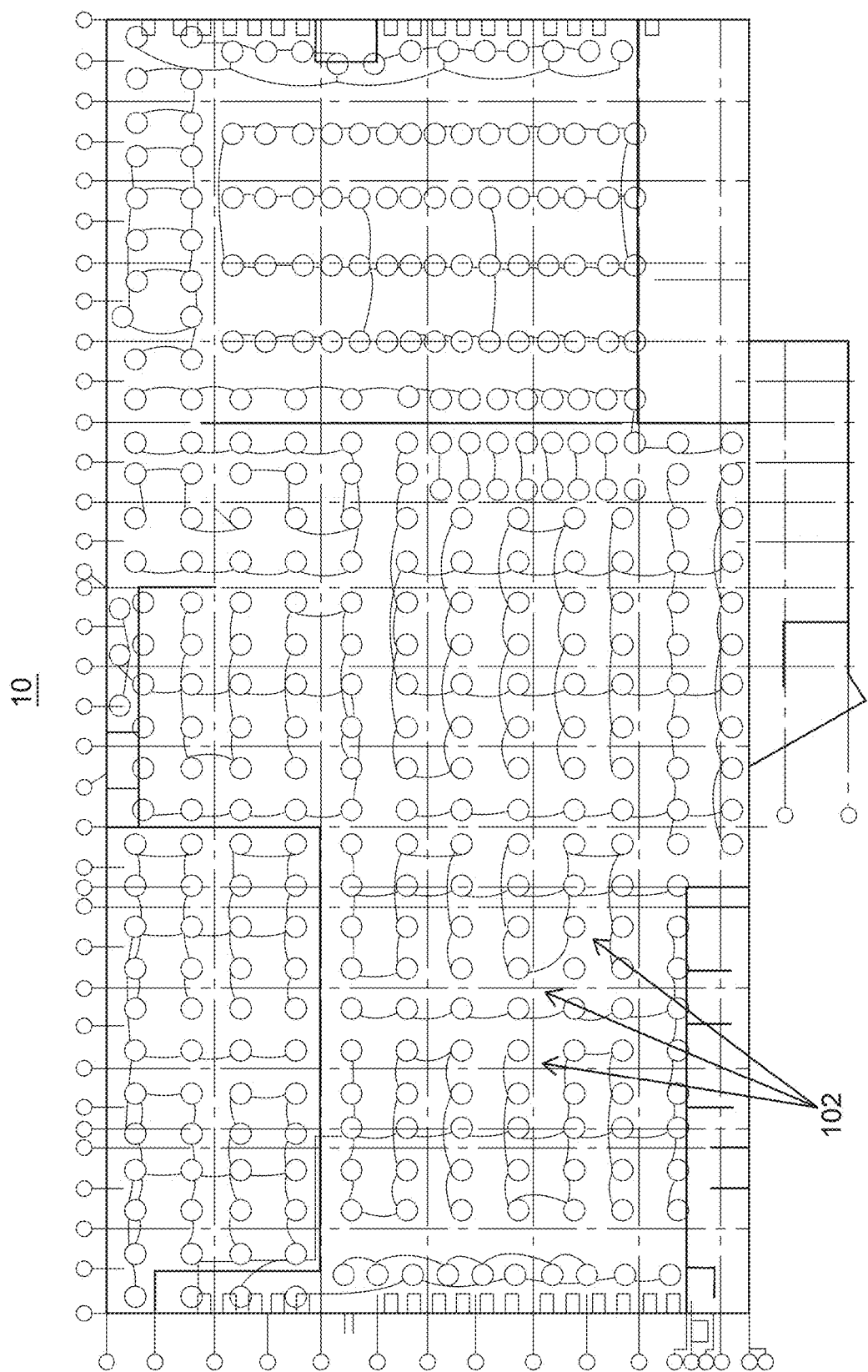
FIGS. 13A-13D illustrate plan views of a facility with intelligent lighting fixtures whose emissions change in response to the presence, absence, and/or locations of people with personal lighting profiles according to embodiments of the present invention.

FIGS. 13A-13D illustrate a scenario in which the LightWorks architecture 100 arbitrates among partially conflicting personal profiles for different users. (Those of skill in the art will readily understand that the principles underlying this example may also apply to conflicts between object lighting profiles and between a personal lighting profile and an object lighting profile.) FIG. 13A shows a floor plan of a facility 10 with multiple intelligent lighting fixtures 102, represented by respective grey circles, that carry a package of sensors, a wireless communication link, memory, and a processor. In FIG. 13A, the building is empty. Every fixture's occupancy sensors show no activity, so all lights are set to the lowest brightness level.

Figure 13B:
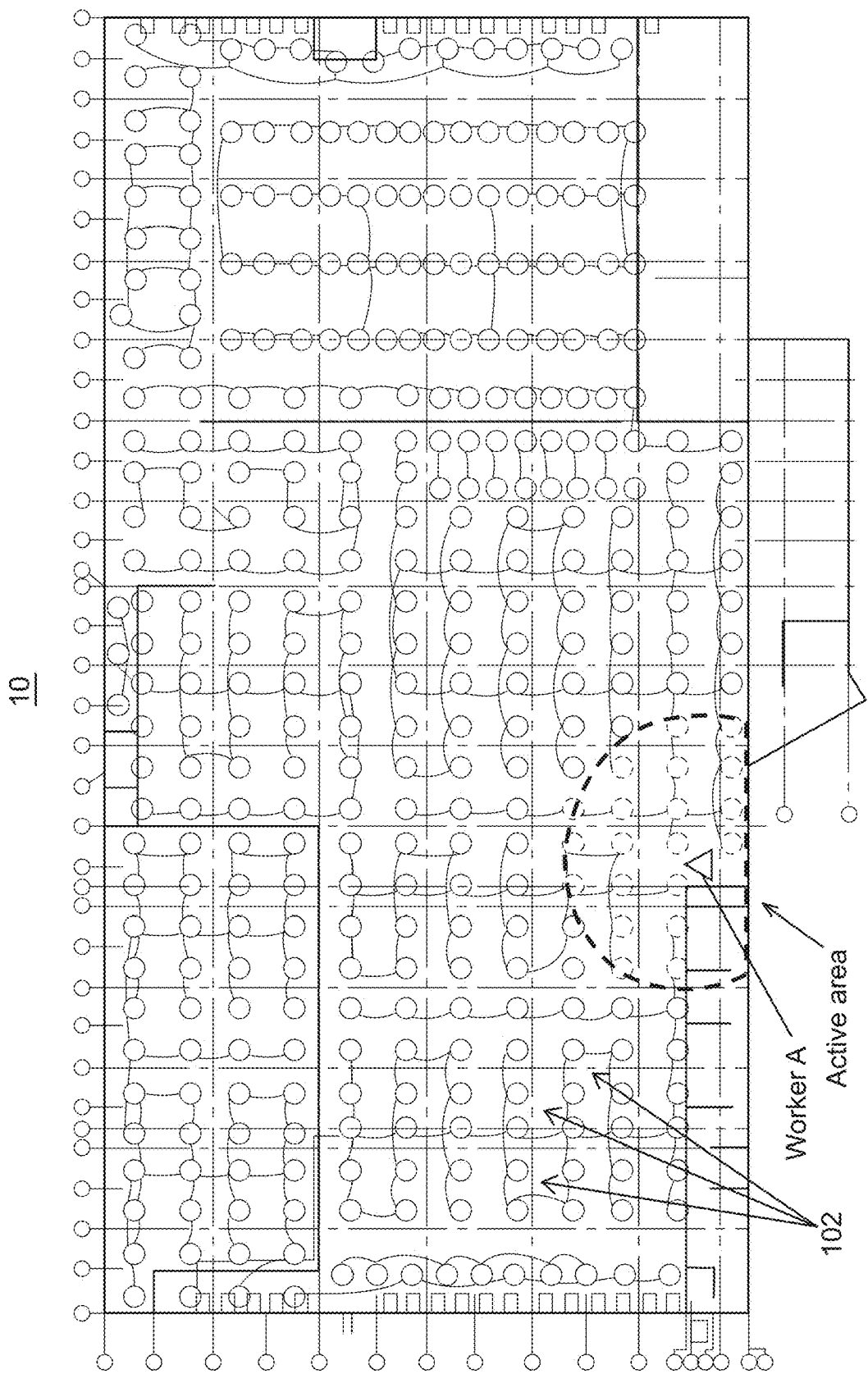

In FIG. 13B, Worker A enters the building. The intelligent fixture nearest the entryway detects her identity using its onboard camera and facial recognition software, and sends her identity and location to its LightWorks Gateway, which relays this data to the LightWorks Server software. In response to this data, the LightWorks Server software looks up Worker A's lighting preferences in its rule database and finds the following entry:

ID: Worker A
Illuminance Target: 50 lux
Preferred Color Temp: 3200 K
Illumination Radius: 10 m
Priority Level: 2

The LightWorks Server relays this preference data (or "rule") back to each of the intelligent fixtures via the LightWorks Gateway. In response, all fixtures within 10 m of Worker A's position turn on, and automatically adjust themselves to produce the illuminance and spectrum of light that Worker A has previously specified, using their built-in sensors to ensure that the desired levels are reached.

Figure 13C:
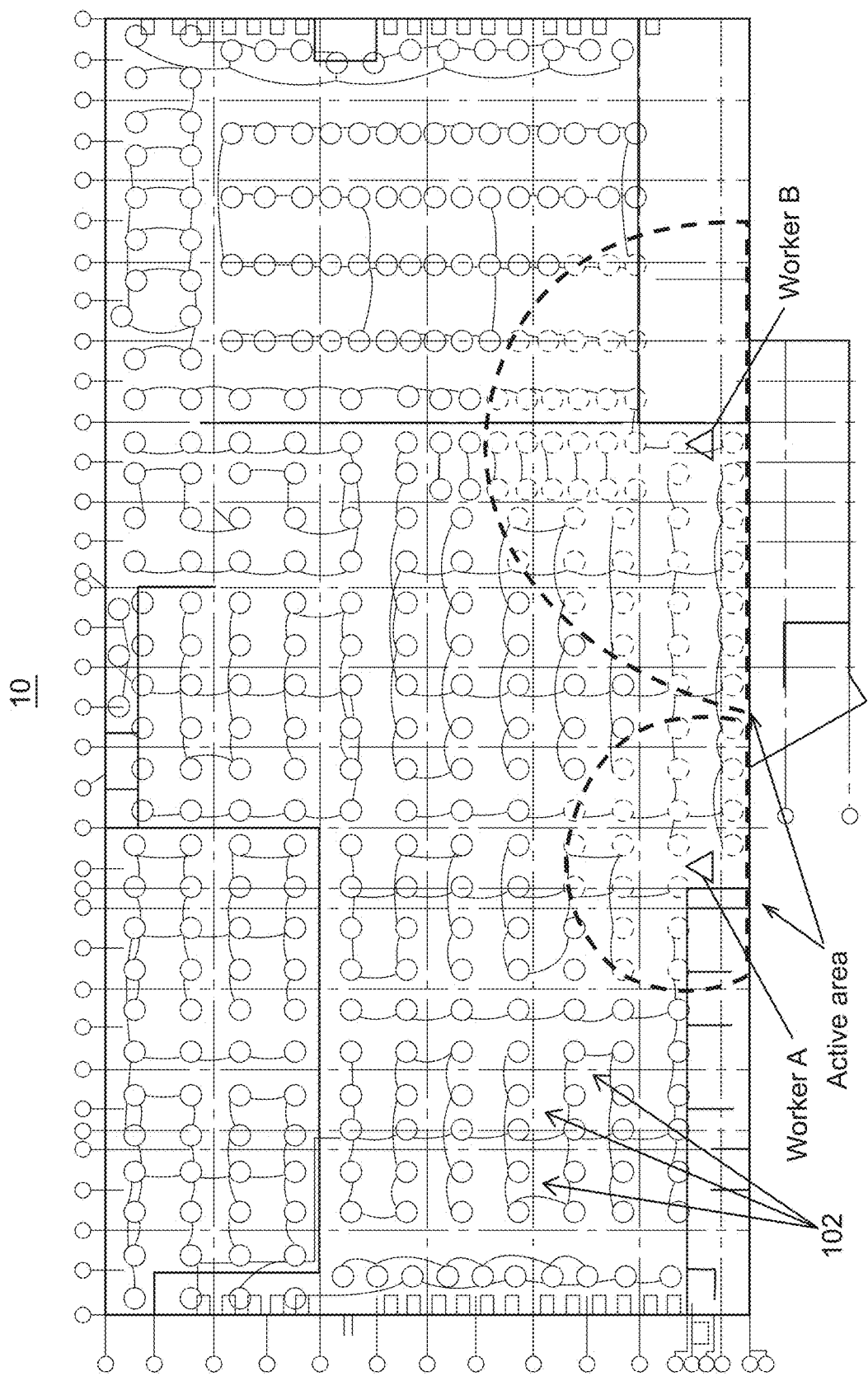

In FIG. 13C, Worker B enters the building via another entrance. A similar process unfolds behind the scenes—the intelligent fixtures identify him (this time by sniffing the Bluetooth ID of his mobile phone before his face is even visible), triangulate his position using RF signal strength, and relay this identification and location data to the Light-Works system, which retrieves his preferences:

ID: Worker B
Illuminance Target: 100 lux
Preferred Color Temp: 4000 K
Illumination Radius: 20 m
Priority Level: 3

Just as with Worker A, the lights within 20 m of Worker B automatically adjust to meet his preferences.

Figure 13D:
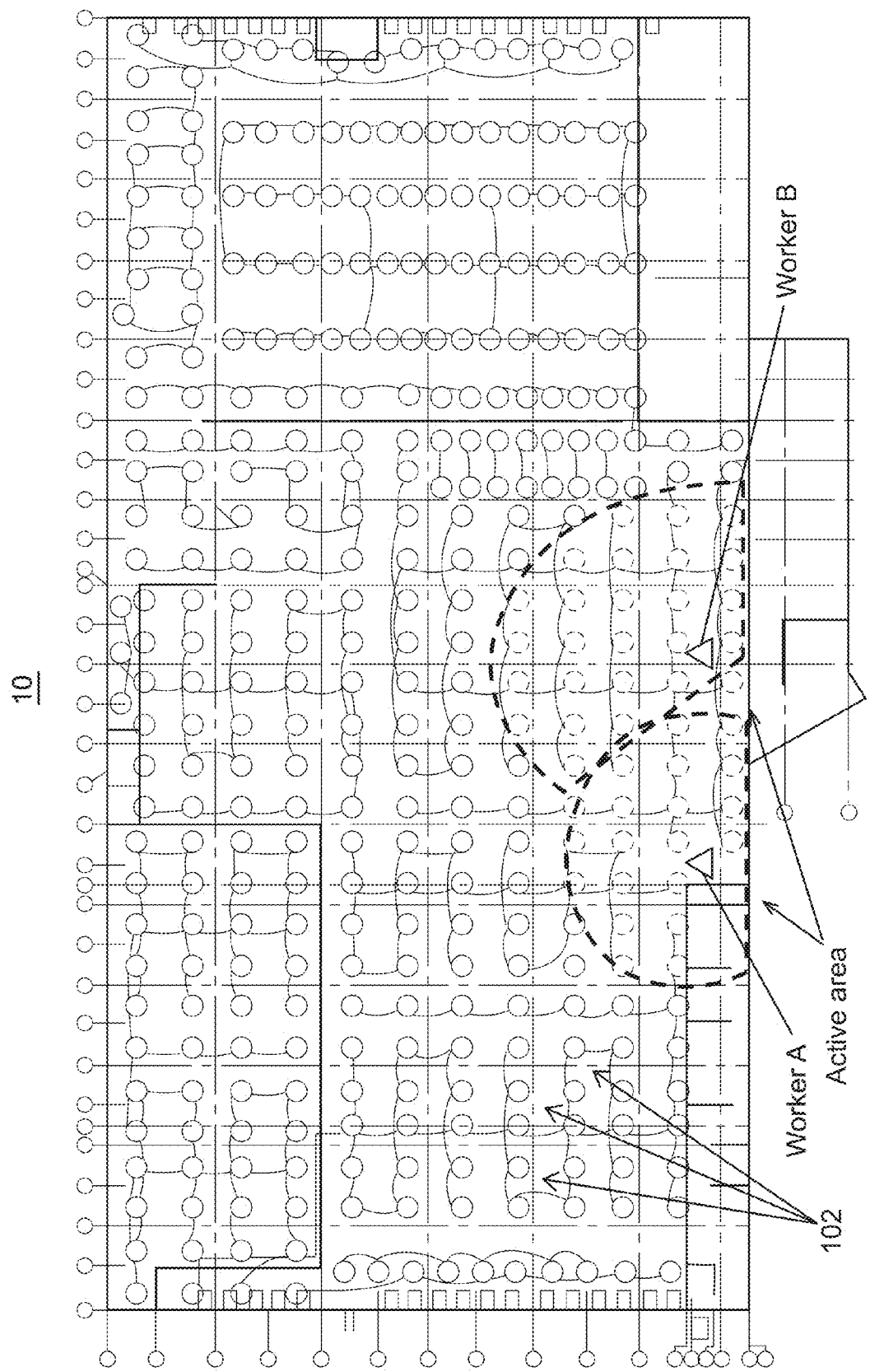

FIG. 13D illustrates what happens as Workers A and B move within the facility 10. As Worker B moves into the are where Worker A is standing, his lighting preferences follow him—to a point. When they are within a short distance of each other, the lights automatically detect a preference conflict—Worker A prefers lower color temperature and illuminance—and adjust themselves based on each worker's Priority Level. In this case, Worker A is higher priority than Worker B (perhaps she is a supervisor, and he a shift worker), so the lights within Worker A's radius stay tuned to her preferences. If the two workers had equal priority level, the processors in the lighting fixtures might split the difference between the profile values, e.g., arriving at a color temperature midway between their two preferences, while keeping illuminance at the maximum of their two preferences. The lighting fixtures might also weight the different profile parameters in response to motion of the workers, frequency with which the workers use the space, relative importance of the profile parameters as assigned by the workers, etc. This multi-user preference arbitration that the lights autonomously carry out in real-time can be generalized to more than two users, and a variety of algorithms can be used to resolve conflicts between preferences (e.g., mean, min, max, median, and so forth).

An individual can also use his or her lighting profiles to customize or tailor aspects of lighting provided in different environments, including but not limited to offices, hotels, cars, and airplanes. If a user works from different offices (e.g., an office in Boston and another in New York), he or she may have a lighting profile that provides the same illumination settings, even accounting for differences in ambient light levels, in both offices. The user might also tailor his or her lighting profile to provide different illumination in different spaces, e.g., warmer color temperatures at home and cooler color temperatures at work. The user could also apply illumination setting used in one environments, such as his or her bedroom, to other environments, such as hotel rooms, on the fly or according to preset preferences.

Personal lighting profiles may also be synchronized with schedules, e.g., to account for early morning meeting or travel between time zones. For instance, if the user travels from Boston to San Francisco for only two days, he or she may maintain a lighting schedule synchronized to Boston time in order to mitigate jet lag. But if the trip is longer, e.g., two weeks, the LightWorks server may automatically (and gradually) shift the user's lighting schedule to account for the three-hour time difference. Such shifts may also occur seasonally, e.g., to provide smoother transitions based on daylight savings or to alleviate seasonal affective disorder. Similarly, the LightWorks server may automatically adjust color temperatures, illumination intensity, and/or illumination spectral distribution to enhance the user's alertness, e.g., by providing blue-tinted light in the car on the ride to work in preparation for an early morning meeting, or to promote relaxation or restfulness.

Lighting profiles can also be used in retail settings to enhance the appearance of the goods for sale or to give shoppers an idea of what the goods will look like in other settings. For instance, consider a jewelry store that sells gold, silver, and platinum jewelry illuminated using a Light-Works lighting network like the ones shown in FIGS. 1 and 2. The correlated color temperature of the illumination provided by the lighting network may be selected to provide warm lighting (e.g., a color temperature of about 2700 K) in order to optimize the appearance of all of the pieces on display. If a shopper looking for platinum jewelry prefers a cooler color temperature (e.g., about 4000 K), then he or she may adjust the lighting in a particular section (zone) of the store by adjusting the local lighting profile based on his or her personal lighting profile to the LightWorks network using a web app (described below). The shopper could also change other lighting parameters, including possibly the intensity and the spectral distribution, in order to emulate sunshine, e.g., in order to assess what the jewelry would look like when worn outdoors.

In other cases, the merchants may adjust illumination parameters in order to make merchandise appear more attractive. Consider, for example, a clothing store whose inventory changes with each season. The merchant may attach RFID or magnetic tags to each piece of clothing to prevent shoplifting and track inventory. These tags may also be used to adjust the lighting, e.g., if they are keyed to the color and texture of the clothing for sale. For example, if the lighting network senses a minimum number or concentration of tags associated with boldly colored clothes in particular section of the store, e.g., indicating a clothing display, it might illuminate the locations containing the tags with illumination at warmer color temperatures. When the boldly colored clothes are moved to a different section of the store (e.g., the sale rack), the lighting network may sense the change in the tags' location and change the illumination accordingly. In other cases, the tags may be affixed to bins or stands; in a grocery store, for instance, bins for produce may be tagged according to the type of produce, and the associated lighting profile may specify that the color temperature changes over the course of the day or week to make the produce appear fresher or riper as it ages.

Keying the illumination parameters to the tags would also make it possible to update lighting profiles for a particular set of tags remotely (e.g., from a central location) and to distribute the updates to lighting fixtures in different stores as described above with respect to FIG. 12. This would especially helpful for implementing chain-wide marketing campaigns or changes in energy usage policies.

In other cases, the articles for sale may have embedded tags associated with "weak" lighting preferences. Consider a print shirt and a solid-color skirt, each of which has a passive RFID tag sewn into the lining or the tag. These RFID tags may be associated with respective lighting profiles, each of which indicates a particular color temperature for a desired appearance. In some cases, the lighting network may arbitrate among the lighting profiles associated with the RFID tags in the clothing and the lighting profile of the person wearing the clothing to produce a desired appearance, e.g., as described above with respect to the arbitration among personal profiles illustrated in FIGS. 13C and 13D.

RFID tags may also be affixed to parts traveling through an assembly line or in a warehouse and used to manipulate illumination of the assembly line or warehouse for increased productivity. For instance, consider a passive RFID tag attached to a particular pallet or item stored in a warehouse. An RFID tag reader that is part of or coupled to the lighting network (e.g., in a lighting fixture, DLA, or separate sensor) may interrogate the RFID tag periodically to ascertain its location. If the warehouse receives an order for the item associated with the RFID tag, the staff may schedule the item for retrieval and shipping. If the LightWorks server is coupled to the shipping database, it may update the RFID tag's lighting profile to indicate that the nearest lighting fixture should transition from an inactive illumination setting (e.g., 10% of maximum) to an active illumination setting (e.g., 90%) the next time that the nearest sensor detects a forklift within a predetermined range (e.g., 25 m) of the RFID tag's location. As a result, the next time a fork lift drives within 25 m of the RFID tag's location, the lighting fixture over the RFID tag switches, indicating to the fork lift driver that a nearby item should be retrieved.

The LightWorks Web-Based Interface (Web App) and Management Features

Figure 14:
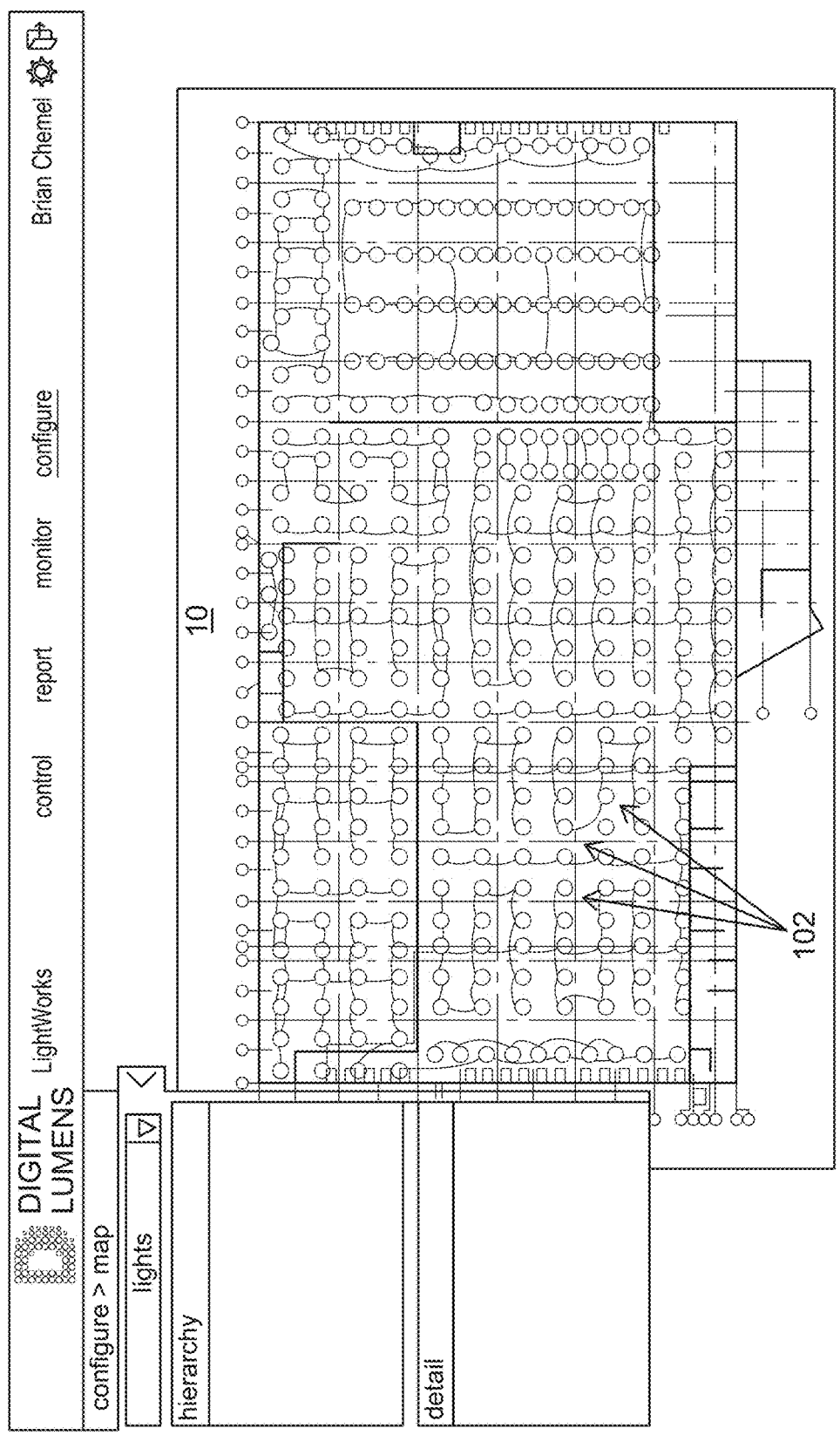
FIG. 14 is a screenshot of a LightWorks web app configure map showing a plan view of a facility illuminated with a lighting network according to embodiments of the present invention.

FIGS. 14-21 illustrates screenshots of the LightWorks web app 548 in various stages of configuration, control, monitoring, and reporting. This web app 54 can execute on any appropriate device, including a computer, tablet, or smartphone. As shown in FIG. 14, the LightWorks web app 548 may load and display facility map data 542 that includes representations of the environment being illuminated such as facility 10 with the locations of the intelligent lighting fixtures 102, standalone DLAs 200, standalone sensors 250, and manual control devices 104 with respect to the environment and each other. These representations may denote physical relationships (e.g., distances and locations in three dimensions), illumination area, network relationships (e.g., hops on the network between devices, received signal strength indications, network (e.g., internet protocol) address, and media access control (MAC) addresses, and identifying information about the networked devices (e.g., manufacturer and model).

Figure 15:
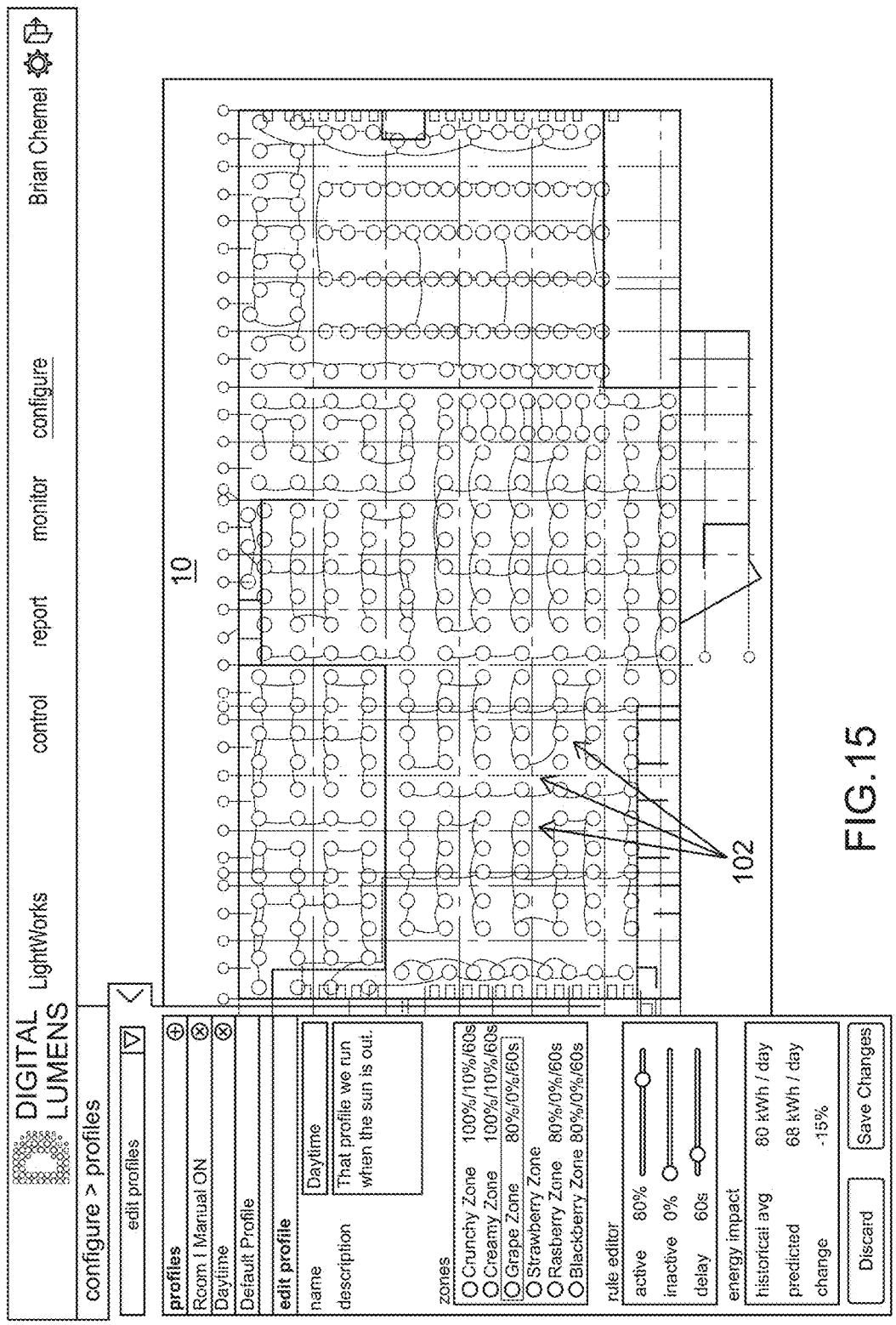
FIG. 15 is a screenshot of the LightWorks web app configure feature showing edits to a "Daytime" lighting profile on a plan view of a facility according to embodiments of the present invention.

FIG. 15 illustrates using the LightWorks Cloud 540 to commission and manage configuration profiles 144, including illumination for spaces within the facility 10 and energy use profiles for lighting fixtures 102 in the network. More specifically, FIG. 15 shows how the facility is divided into different zones (e.g., Crunchy Zone, Creamy Zone, etc.). Using the web app, the user can assign an active level (e.g., 100%), inactive level (e.g., 10%), and sensor timeout (e.g., 60 s) to each zone. The profiles and profile parameters may be varied based on time of day (e.g., daytime), day of the week, time of year, etc. This provides the ability to provide complex commissioning via a separate commissioning tool that downloads map files that is stored and version controlled in the LightWorks cloud.

The web app 540 uses these profiles to generate a facility map that includes the profile information. This facility map may include instructions for using task lighting targets and/or Daylight Harvesting targets to replace or supplement fixed levels. During commissioning and/or during intermittent update processes, the web app 540 divides the map among gateways in the facility. Each gateway may be assigned to a particular zone or set of zones; similarly, each zone may have one or more gateway. This provides a strict hierarchy for control, with each zone have a profile set by the user.

The web app 540 also enables a wide variety of reporting, including the use of groups and/or tags for reporting. In general, the web app 540 may present current and historical usage data stored in the LightWorks Cloud 540, including Watt-Hour odometry readings collected from the LightWorks Gateways 300 on a periodic, pre-determined, and/or as-desired basis. In some cases, reporting may be done according to different tiers, each of which offers a different range of control, reporting, and analysis, possibly according to a subscription model with fees per gateway, per user, etc. in addition to initial fees and/or yearly charges per facility or organization. In this tiered system, a first level of LightWorks web app 548 does not support reporting. This free tier provides some very basic configuration ability in the LightWorks web app 548—e.g., one manually configured profile per zone—and a user identification to use with LightWorks Mobile 524. If the subscriber chooses to stop paying for Pro or Enterprise, the subscription reverts to this level and the lights are automatically reprogrammed to a fixed profile. A second level of LightWorks web app 548 includes all the features of the first level plus basic reporting and configuration. And a third level of LightWorks web app 548 includes all the features of the second level plus advanced reporting, automatic scheduling, multi-site management, and integration features.

FIGS. 16-21 illustrate different reporting interfaces for the web app 540, including usage data and processed data, with access to data controlled according to the reporting tier. Usage data 546 includes all data transmitted over the network and stored in the LightWorks Cloud 540, including but not limited to processed raw data, analytics, metadata, time-stamped data, correlated-data, data supplemented third party data, organized data, etc. The usage data 546 stored in a database can be download and processed depending on the needs of the user. Usage data 546 can be plotted, graphed, and otherwise displayed on a graphical user interface as shown in LightWorks Web App 548.

Figure 16:
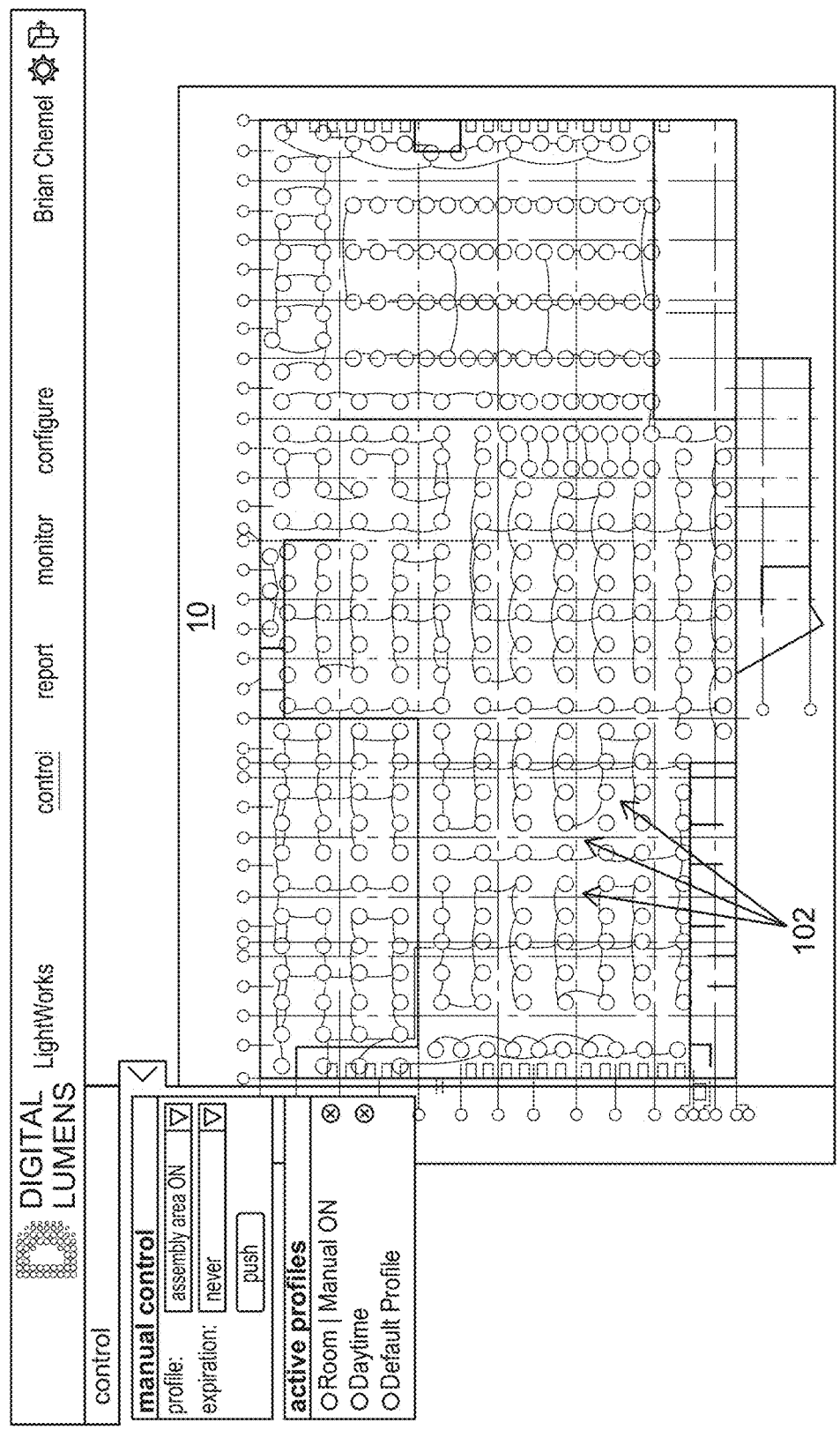
FIG. 16 is a screenshot of the LightWorks web app control feature showing a plan view of a facility with the active profiles running on groups of intelligent lighting fixtures according to embodiments of the present invention.
Figure 17:
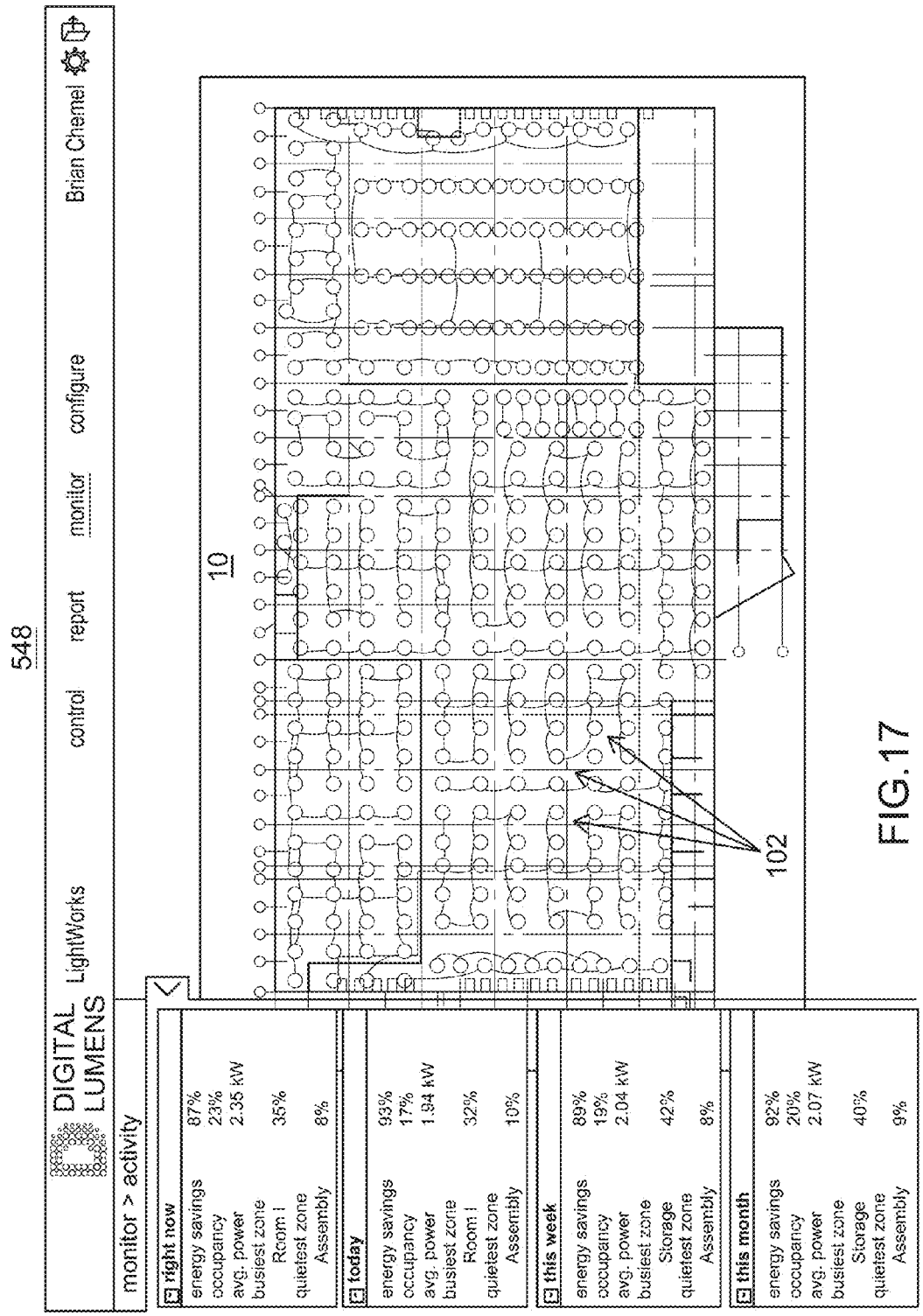
FIG. 17 is a screenshot of the LightWorks web app monitor feature showing energy consumption for a give time period on a plan view of a facility according to embodiments of the present invention.
Figure 18:
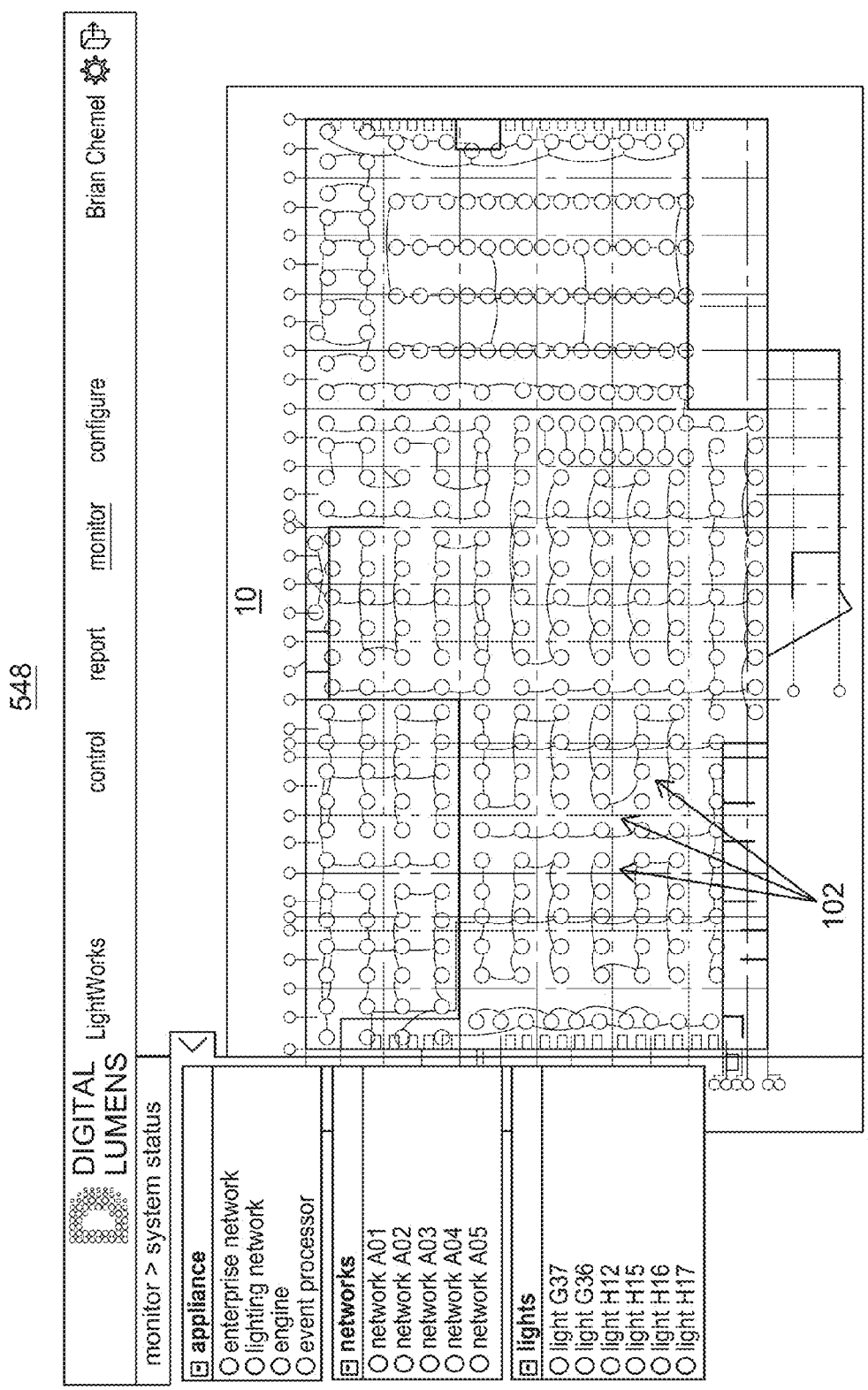
FIG. 18 is a screenshot of the LightWorks web app monitor feature showing the system status on a plan view of a facility according to embodiments of the present invention.
Figure 19:
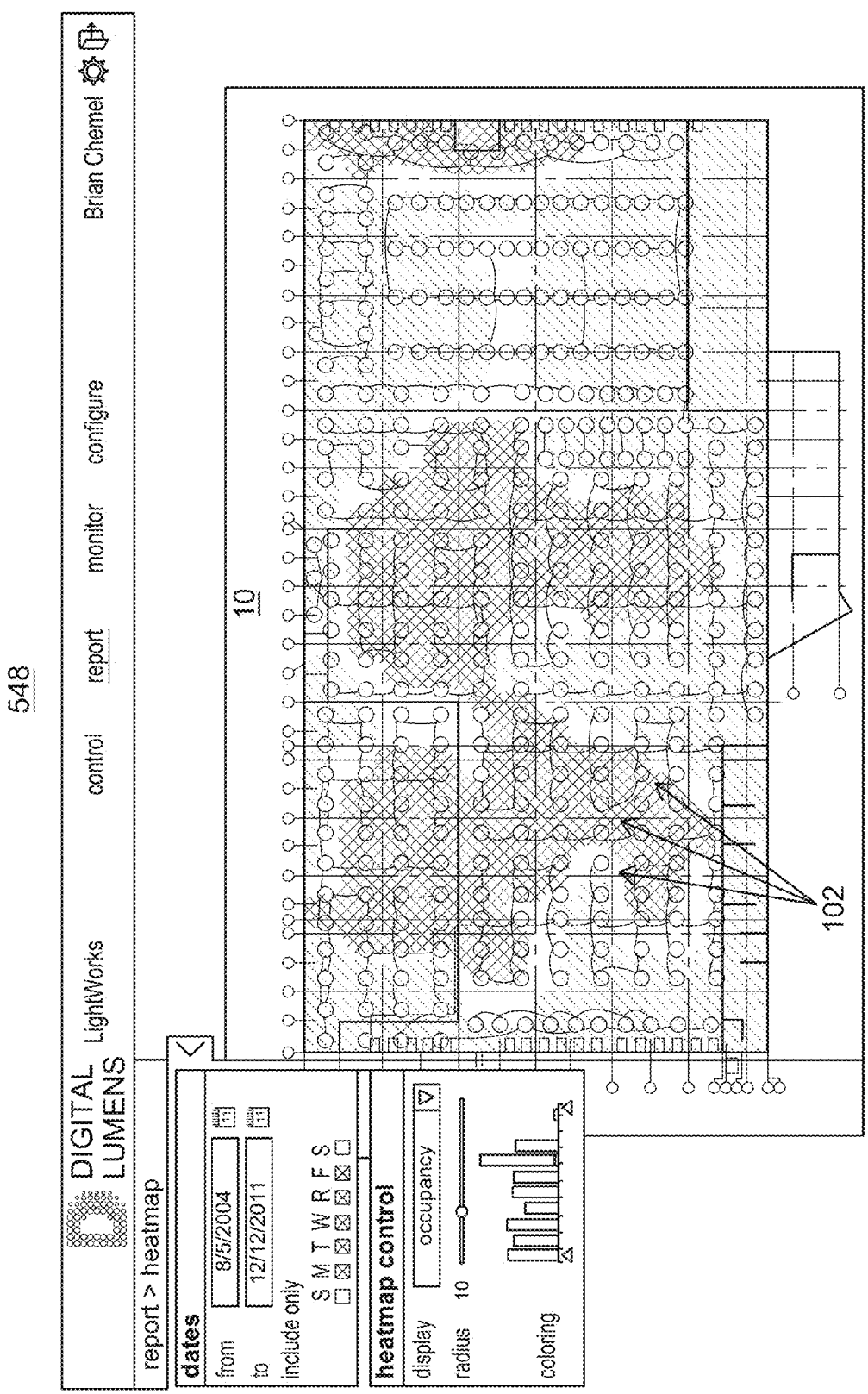
FIG. 19 is a screenshot of the LightWorks web app report feature showing occupancy frequency as a heat map on a plan view of a facility according to embodiments of the present invention.
Figure 20:
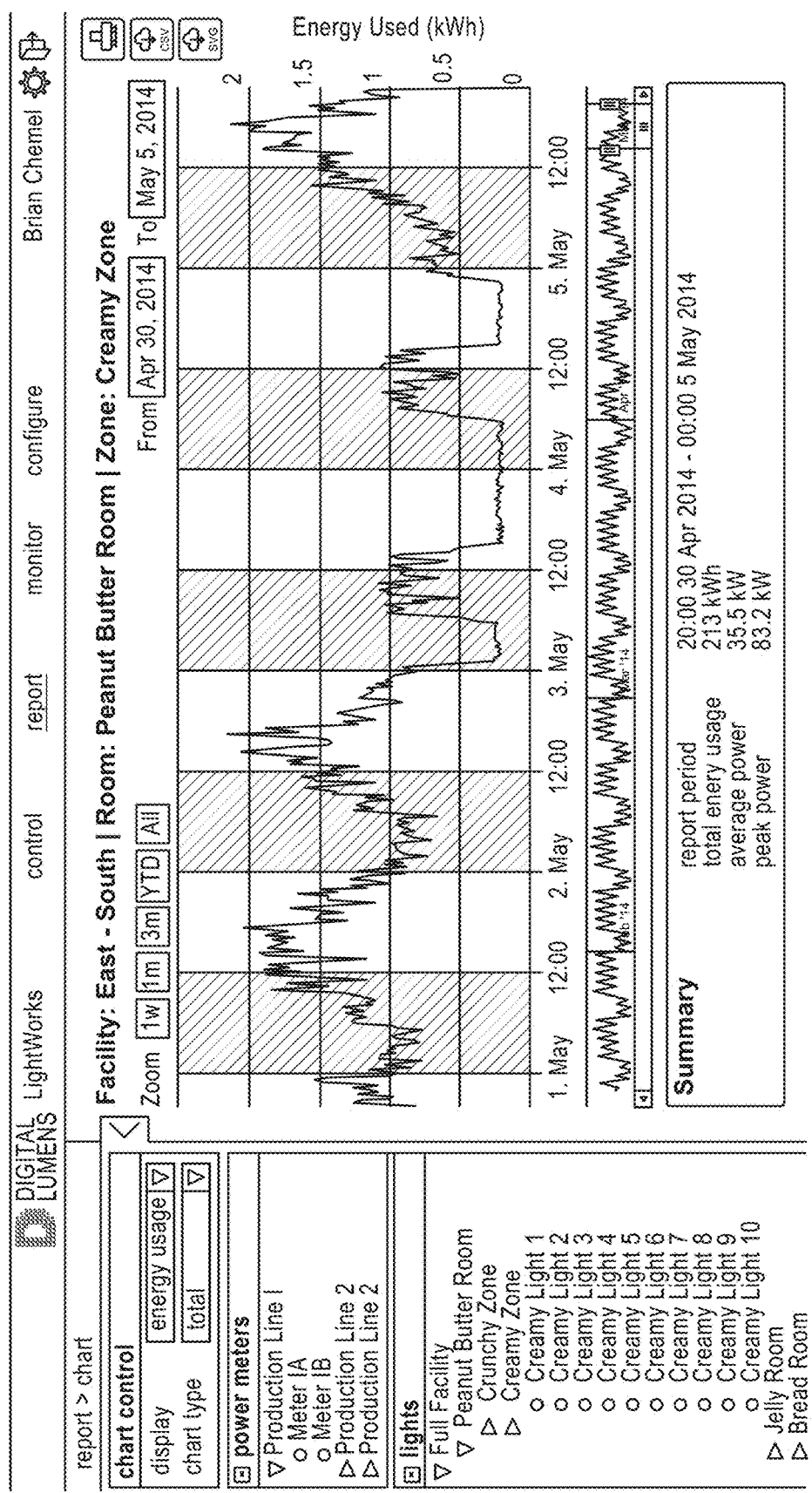
FIG. 20 is a screenshot of the LightWorks web app report feature showing a chart of energy usage over a given period of time according to embodiments of the present invention.

More specifically, FIG. 16 shows the lighting profiles in use by the lighting fixtures at a particular time (e.g., real time or historical). FIG. 17 shows historical energy usage data on instantaneous, daily, weekly, and monthly bases for given fixtures or sets of fixtures. FIG. 18 shows the operating status of each networked device (gateway, lighting fixture, standalone, sensor, manual control, DLA, etc.). FIG. 19 is a heat map of historical occupancy data measured by sensors within the facility. FIG. 20 shows an exemplary display of energy usage over a period of days created by plotting the usage data 546 retrieved from storage media 541. And FIG. 21 shows an exemplary display average and cumulative energy savings calculated from usage data 546 stored in storage media 541.

LightWorks Mobile App

Figure 22C:
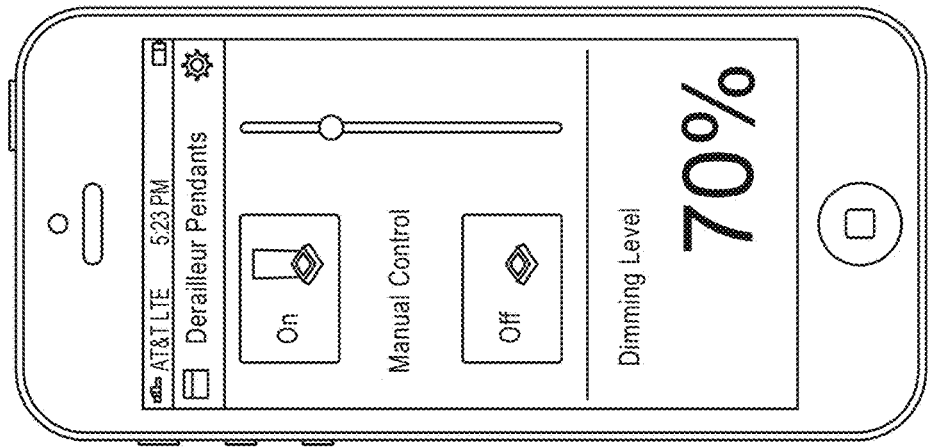
FIGS. 22A-22C show screenshots of a smartphone accessing and controlling an exemplary lighting system via an exemplary LightWorks app according to embodiments of the present invention.
Figure 22B:
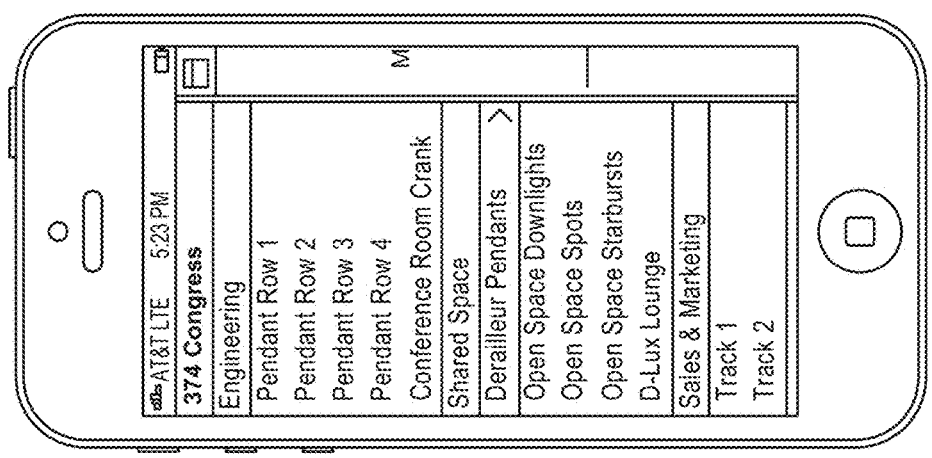
Figure 22A:
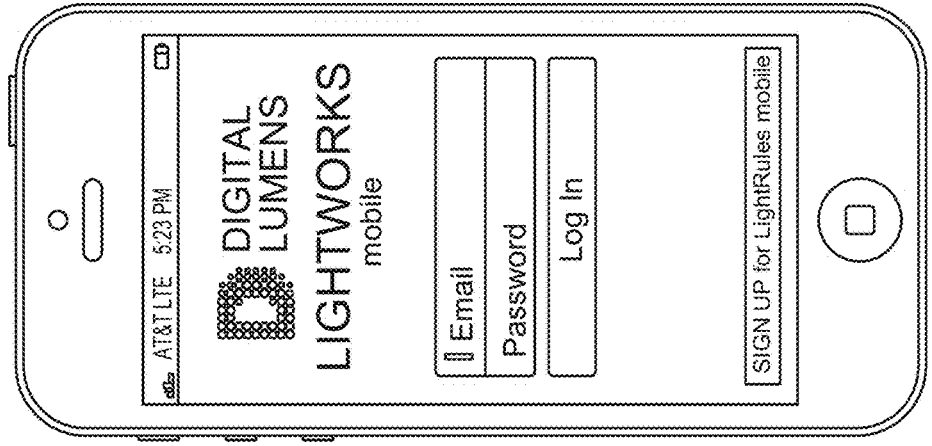

FIGS. 22A-22C are wireframes of the LightWorks mobile app 524 is running on a mobile device. The mobile app 524 can communicate with the light fixtures and DLAs (via the Gateway API), download map data, provide manual lighting control (including manual light level adjustments, profile overrides, and profile changes), and display diagnostic data, including energy usage data. FIG. 22A shows a LightWorks mobile app login screen 524a, which provides security and identifies the user to the LightWorks Server 550, which determines the access level and tracks changes in a change control log stored within the database. FIG. 22B shows a lighting fixture location menu 524b that allows the user to select a specific lighting fixture to control, configure and/or manage. And FIG. 22C shows a manual control 524c that enables to the user to control the dimming level and turn a particular fixture on or off.

The LightWorks mobile app 524 may also allow a user to adjust his or her lighting profile on the fly. Suppose, for instance, the user is in a public space illuminated according to fixed global rules (i.e., rules that override personal lighting profiles). The user may be able to query the LightWorks cloud for one or more of the illumination parameters set by the fixed global rules and, if desired, display and/or import some or all of those settings into his or her own profile using the mobile app 524. The user may also adjust his or her profile manually using the mobile app 524.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The gateways and other electronic devices disclosed herein may each include a memory (e.g., an SD Card as shown in FIG. 3), one or more processing units (also referred to herein simply as "processors"; e.g., processor in FIG. 3), one or more communication interfaces (e.g., wireless module and Ethernet port in FIG. 3), one or more display units (e.g., the liquid-crystal displays (LCD) shown in FIG. 3), and one or more data input devices (e.g., the buttons, wireless module, and Ethernet port shown in FIG. 3). The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the electronic device to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for controlling illumination of an environment, the system comprising:
   (A) at least one lighting fixture disposed to illuminate a first portion of the environment, the lighting fixture comprising:

(A1) a light source to emit illumination;

(A2) a light source driver, operably coupled to the light source, to provide a variable amount of power to the light source;

(A3) a power meter, operably coupled to the light source driver, to measure electrical power supplied to the light source;

(A4) a sensor, to sense the presence of a person and/or object within the first portion of the environment;

(A5) a fixture processor, operably coupled to the light source driver, the energy usage sensor, and the environmental sensor, to determine a location and identity of the person and/or object within the first portion of the environment, to identify a lighting profile associated with the person and/or object within the first portion of the environment, and to adjust the illumination emitted by the light source based at least in part on the lighting profile; and (A6) a fixture memory, operably coupled to the power meter and the sensor, to store an indication of total electrical power supplied to the light source; and (A7) a fixture communications interface, operably coupled to the fixture processor, to transmit an indication of the presence of the person and/or object and the indication of total electrical power supplied to the light source;

(B) at least one gateway, communicatively coupled to the at least one lighting fixture, the at least one gateway comprising:

(B1) a gateway communications interface to receive the indication of the presence of the person and/or object and the indication of total electrical power supplied to the light source;

(B2) a gateway memory, operably coupled to the gateway communications interface, to store the indication of the presence of the person and/or object and the indication of total electrical power supplied to the light source; and (B3) a gateway processor, operably coupled to the gateway communications interface and the gateway memory, to provide an updated lighting profile associated with the person and/or object within the first portion of the environment to the at least one lighting fixture; and (C) at least one server, communicatively coupled to the at least one gateway, the at least one server comprising:

(C1) a server communications interface to transmit the updated lighting profile to the at least one gateway and to receive the indication of total electrical power supplied to the light source from the at least one gateway; and (C2) a server processor, operably coupled to the server communications interface, to determine the updated lighting profile based at least in part on the indication of total electrical power supplied to the light source from the at least one gateway.

2. An apparatus for controlling at least one lighting fixture disposed to illuminate an environment, the apparatus comprising:

a memory to store sensor data associated with the at least one lighting fixture and energy usage data representing energy consumed by the at least one lighting fixture over a given time period, the sensor data including an indication of a presence of a person and/or object in the environment;

a local processor, operably coupled to the memory, to provide an updated lighting profile associated with the person and/or object in the environment from a network-based processor based at least in part on the sensor data and the energy usage data; and a communications interface, operably coupled to the local processor and the memory, to receive the sensor data and the energy usage data from the at least one lighting fixture, to transmit the sensor data and/or the energy usage data to the network-based processor, to receive the updated lighting profile from the network-based processor, and to transmit the updated lighting profile to the at least one lighting fixture.

3. The apparatus of claim 2, wherein the communications interface comprises a wired communications port.

4. The apparatus of claim 3, wherein the wired communications port comprises an Ethernet port.

5. The apparatus of claim 4, wherein the apparatus is configured to receive electrical power via the Ethernet port.

6. The apparatus of claim 2, wherein the communications interface comprises a wireless communications interface, operably coupled to the local processor, to receive the sensor data and the energy usage data from the at least one lighting fixture and to transmit the updated lighting profile from the local processor to the at least one lighting fixture.

7. The apparatus of claim 6, wherein the wireless communications interface comprises at least one of a cellular radio, a wireless mesh network interface, or a point-to-point wireless network interface.

8. The apparatus of claim 6, wherein the wireless communications interface is configured to receive, from at least one sensor, at least one measurement of a parameter associated with the environment, the at least one measurement of the parameter indicating the presence of the person and/or object in the environment, and wherein the local processor is configured to store a representation of the at least one measurement as sensor data.

9. The apparatus of claim 8, wherein the at least one measurement represents at least one of:
   an occupancy of the environment,
   an ambient light level of the environment,
   a spectrum of illumination of the environment,
   a temperature of the environment,
   a sound in the environment,
   an air quality of the environment,
   an amplitude of a radio-frequency wave propagating in the environment,
   a location of the person and/or object in the environment, or
   an identification of the person and/or object in the environment.

10. The apparatus of claim 2, wherein the communications interface comprises:
    a wired communications port in communication with the network-based processor; and
    a wireless communications interface in wireless communication with the at least one lighting fixture.

11. The apparatus of claim 2, wherein the energy usage data comprises at least one of:
    total energy consumed by the at least one lighting fixture over the given period of time,
    instantaneous power consumption by the at least one lighting fixture,
    average power consumption by the at least one lighting fixture over the given period of time,
    maximum and/or minimum power consumption by the at least one lighting fixture over the given period of time,
    a historical log of energy consumption by the at least one lighting fixture, a power factor associated with the at least one lighting fixture, an input voltage to the at least one lighting fixture, or total harmonic distortion of power received by the at least one lighting fixture.

12. The apparatus of claim 2, wherein the updated lighting profile specifies an illumination parameter associated with a specific portion of the environment and/or the person and/or object in the environment.

13. The apparatus of claim 12, wherein the at least one illumination parameter pertains to at least one of:

luminous flux emitted by the at least one lighting fixture, illuminance delivered to a specified surface in the environment, a correlated color temperature of light emitted by the at least one lighting fixture, a spectral power distribution of light emitted by the at least one lighting fixture, a color of light emitted by the at least one lighting fixture, an illumination radius of the at least one lighting fixture, a timing parameter related to a change in lighting emitted by the at least one lighting fixture, or power consumption and/or energy usage of the at least one lighting fixture.

14. A method of controlling illumination of an environment by at least one lighting fixture in a network of lighting fixtures, the method comprising:

(A) receiving, via a communications interface, sensor data associated with the at least one lighting fixture and energy usage data representing energy consumed by the at least one lighting fixture over a given time period, the sensor data including an indication of a presence of a person and/or object in the environment;

(B) storing, in a memory operably coupled to the communications interface, the sensor data and the energy usage data received in (A) and at least one lighting profile for providing a desired lighting level and/or adjusting power consumption by the at least one lighting fixture according to the sensor data and the energy usage data;

(C) transmitting, via the communications interface, the sensor data and/or the energy usage data stored in (B) to a network-based processor;

(D) receiving, via the communications interface, instructions from the network-based processor representative of a change to the at least one lighting profile stored in the memory; and (E) transmitting, via the communications interface, an updated lighting profile to the at least one lighting fixture.

15. The method of claim 14, wherein the at least one lighting profile specifies the desired lighting level and/or power consumption associated with a specific portion of the environment and the person and/or object in the environment.

16. The method of claim 14, wherein the at least one lighting profile includes a first lighting profile associated with a first object and a second lighting profile associated with a second object.

17. The method of claim 16, wherein the first lighting profile includes a first plurality of parameters corresponding to an illumination level at each of a plurality of distances and the second lighting profile includes a second plurality of parameters corresponding to the illumination level at each of the plurality of distances, the desired lighting level, and/or power consumption by the at least one fixture being based on:

a first location of the first object and the corresponding first plurality of parameters, and a second location of the second object and the corresponding second plurality of parameters.

18. The method of claim 14, wherein the at least one lighting profile includes a third lighting profile associated with a first person.

19. The method of claim 18, wherein the third lighting profile is generated based on a preference of the first person.

20. The method of claim 18, wherein the third lighting profile includes a first parameter relating to a location of the first person, a second parameter relating to a time of day, a third parameter relating to a presence of another person in the environment, and a fourth parameter relating to an activity by the first person.

21. A method for controlling illumination of an environment by at least one lighting fixture in a network of lighting fixtures, the method comprising:

receiving, via a communications interface, first sensor data indicating a presence of a first person in a first zone of an environment;

transmitting, via the communications interface, a first lighting profile associated with the first person to the at least one lighting fixture, the at least one lighting fixture providing a first lighting level in the first zone of the environment based on the first lighting profile;

receiving, via the communications interface, second sensor data indicating a presence of a second person in a second zone of the environment;

transmitting, via the communications interface, a second lighting profile associated with the second person to the at least one lighting fixture, the at least one lighting fixture providing a second lighting level in the second zone of the environment based on the second lighting profile;

receiving, via the communications interface, third sensor data indicating the presence of the first person and the second person in a third zone of the environment;

transmitting, via the communications interface, a third lighting level for the third zone to the at least one lighting fixture based on a first plurality of weights and a second plurality of weights, the first plurality of weights being associated with the first lighting profile and the second plurality of weights being associated with the second lighting profile.

22. The method of claim 21, wherein the first lighting profile is generated based on a preference of the first person and the second lighting profile is generated based on a preference of the second person.

23. The method of claim 21, wherein the third lighting level is based on an order of priority for the first person and the second person.

24. The method of claim 21, wherein the third lighting level is based on at least one of a mean, median, maximum, or minimum of the first plurality of weights and the second plurality of weights.

* * * * *